United States Patent
Nishizaki

(10) Patent No.: US 10,789,439 B2
(45) Date of Patent: Sep. 29, 2020

(54) METHOD AND DEVICE FOR GENERATING TWO-DIMENSIONAL BARCODE, PROGRAM, TWO-DIMENSIONAL BARCODE, METHOD AND DEVICE FOR READING TWO-DIMENSIONAL BARCODE, AND ADMINISTRATION SYSTEM FOR 2D BARCODE

(71) Applicant: TOPPAN TDK LABEL CO., LTD., Tokyo (JP)

(72) Inventor: Tsutao Nishizaki, Kanagawa (JP)

(73) Assignee: TOPPAN INFOMEDIA CO., LTD., Tokyo (JP)

( * ) Notice: Subject to any disclaimer, the term of this patent is extended or adjusted under 35 U.S.C. 154(b) by 131 days.

(21) Appl. No.: 15/777,477

(22) PCT Filed: Mar. 4, 2016

(86) PCT No.: PCT/JP2016/056817
§ 371 (c)(1),
(2) Date: May 18, 2018

(87) PCT Pub. No.: WO2017/085940
PCT Pub. Date: May 26, 2017

(65) Prior Publication Data
US 2018/0349660 A1 Dec. 6, 2018

(30) Foreign Application Priority Data

Nov. 20, 2015 (JP) .................................. 2015-227529

(51) Int. Cl.
*G06K 7/10* (2006.01)
*G06K 9/36* (2006.01)
(Continued)

(52) U.S. Cl.
CPC ............. *G06K 7/1417* (2013.01); *G06K 1/12* (2013.01); *G06K 7/14* (2013.01); *G06K 19/06* (2013.01);
(Continued)

(58) Field of Classification Search
CPC ............ G06K 1/12; G06K 7/14; G06K 19/06; G06K 7/1417; G06K 19/06037; G09C 1/00; G09C 5/00; H04L 9/0668; H03M 13/15
See application file for complete search history.

(56) References Cited

U.S. PATENT DOCUMENTS

| 2007/0228171 A1* | 10/2007 | Thiyagarajah | ........... G06K 7/14 235/462.09 |
| 2008/0134000 A1* | 6/2008 | Wiatrowski | ........... H04L 1/0041 714/758 |
| 2018/0349660 A1* | 12/2018 | Nishizaki | ................. G06K 1/12 |

FOREIGN PATENT DOCUMENTS

| CN | 105007155 A | 10/2015 |
| JP | 2009-31969 A | 2/2009 |

(Continued)

OTHER PUBLICATIONS

EPO, WO2005066884 Translation, obtained Dec. 23, 2019, all pages pertinent.*

(Continued)

*Primary Examiner* — Thien T Mai
(74) *Attorney, Agent, or Firm* — Brinks Gilson & Lione; John C. Freeman

(57) ABSTRACT

The invention is characterized in that a protection-encoding pattern is obtained based on an error correction codeword, that a protection-encoded code block is obtained by protection-encoding using the protection-encoding pattern a code block having a data codeword, and that the 2D barcode is generated based on the protection-encoded code block.

22 Claims, 39 Drawing Sheets

(51) Int. Cl.
| | |
|---|---|
| *G06K 9/80* | (2006.01) |
| *G06K 7/14* | (2006.01) |
| *G09C 5/00* | (2006.01) |
| *G06K 19/06* | (2006.01) |
| *G09C 1/00* | (2006.01) |
| *G06K 1/12* | (2006.01) |
| *H03M 13/15* | (2006.01) |
| *H04L 9/06* | (2006.01) |

(52) U.S. Cl.
CPC ......... *G06K 19/06037* (2013.01); *G09C 1/00* (2013.01); *G09C 5/00* (2013.01); *H03M 13/15* (2013.01); *H04L 9/0668* (2013.01)

(56) References Cited

FOREIGN PATENT DOCUMENTS

| | | |
|---|---|---|
| JP | 2009-99091 A | 5/2009 |
| JP | 5827738 | 10/2015 |
| WO | WO2005/066884 A1 | 7/2005 |
| WO | WO 2005/066884 A1 | 7/2005 |
| WO | WO2015/064334 A1 | 5/2015 |

OTHER PUBLICATIONS

International Search Report from corresponding PCT application No. PCT/JP2016/056817 dated Apr. 26, 2016 (2 pgs).
European extended Search Report from corresponding European application No. 16865944.9 dated Jul. 18, 2019 (8 pgs).
International Preliminary Report on Patentability and Written Opinion from corresponding PCT application No. PCT/JP2016/056817 dated May 22, 2018 (6 pgs).
"QR Droid Zapper: Encrypted ZR Codes: Share secret messages", Retrieved from the Internet: URL:http://qrdroid.com/blog/encrypted-qr-codes-share-secret-messages/ [retrieved on Jul. 9, 2019] (6 pgs).

* cited by examiner

METHOD AND DEVICE FOR GENERATING TWO-DIMENSIONAL BARCODE, PROGRAM, TWO-DIMENSIONAL BARCODE, METHOD AND DEVICE FOR READING TWO-DIMENSIONAL BARCODE, AND ADMINISTRATION SYSTEM FOR 2D BARCODE

RELATED APPLICATIONS

This application is a 35 U.S.C. § 371 national phase filing of International Patent Application No. PCT/JP2016/056817, filed Mar. 4, 2016, through which and to which priority is claimed under 35 U.S.C. § 119 to Japanese Patent Application No. 2015-227529, filed Nov. 20, 2015, the entire disclosure of which is hereby expressly incorporated by reference.

TECHNICAL FIELD

The invention relates to a method and a device for generating a two-dimensional barcode, a program, a two-dimensional barcode, a method and a device for reading a two-dimensional barcode, and an administration system for a 2D barcode.

BACKGROUND ART

As a technique of a two-dimensional (2D) barcode, by which a graphic code is read and information contained in the code is retrieved, there is Japanese Industrial Standards (JIS) X 0510:2004 "Two dimensional symbol—QR code—". In addition, a technique for concealing hidden-object information (which is not information to be displayed) into such a 2D barcode is developed.

CITATION LIST

Patent Literature

[PTL 1] Japanese Patent Application Publication No. 2009-31969

SUMMARY OF INVENTION

Technical Problem

As a method for concealing hidden-object information, encrypting information itself can be considered. However, in case of encrypting information, it is possible to at least read the 2D barcode. In this case, there is a possibility that, after the 2D barcode has been read, the encrypted codewords of encrypted information are acquired and decrypted. And, there is a possibility that a third party finally extracts the content of the information and the hidden-object information is read-out. Accordingly, there is demand for more appropriately protecting hidden-object information using a 2D barcode.

The invention has been made in view of such conventional problems, and an aspect of the invention is to appropriately protect hidden-object information using a 2D barcode.

Solution to Problem

A main aspect of the invention is a method for generating a 2D barcode, including:

obtaining a protection-encoding pattern based on an error correction codeword;

obtaining a protection-encoded code block by protection-encoding using the protection-encoding pattern a code block having a data codeword; and generating the 2D barcode based on the protection-encoded code block.

Other features of this invention will become apparent from the description in this specification and the attached drawings.

DESCRIPTION OF EMBODIMENTS

Figure 1:
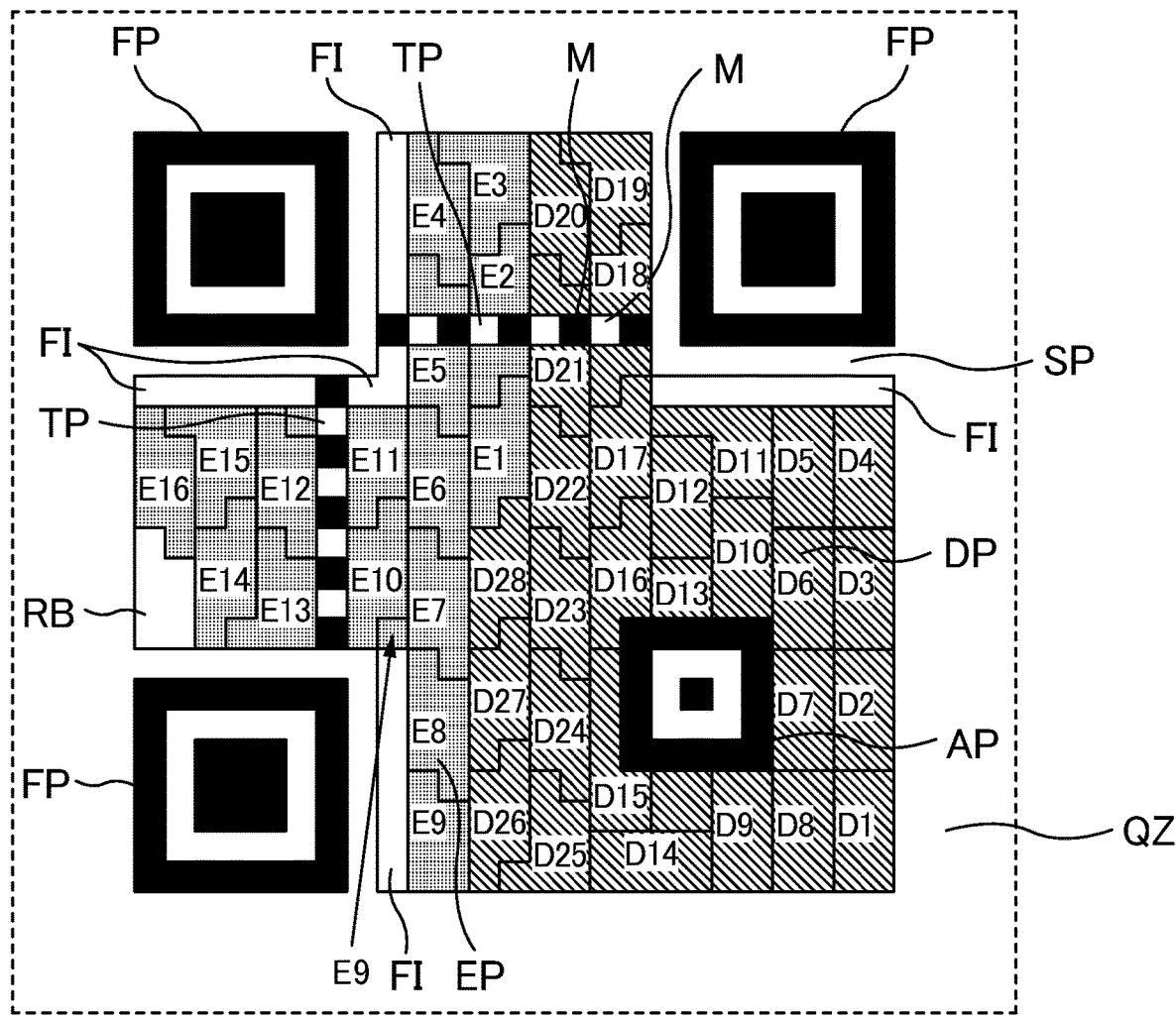
FIG. 1 is a diagram illustrating a QR code symbol 1.

With the description and the accompanied drawings, at least the following matters will be apparent.

A method for generating a 2D barcode including: obtaining a protection-encoding pattern based on an error correction codeword;

obtaining a protection-encoded code block by protection-encoding using the protection-encoding pattern a code block having a data codeword; and generating the 2D barcode based on the protection-encoded code block.

With such a method for generating a 2D barcode, it is possible to appropriately protect hidden-object information using a 2D barcode.

In such a method for generating a 2D barcode, it is desirable that the protection-encoding is a step of XORing the code block with the protection-encoding pattern on a bit-by-bit basis.

With such a method for generating a 2D barcode, even if there is a reading error of the 2D barcode caused by contamination, the error does not affect on the other parts after protection-decoding.

In such a method for generating a 2D barcode, it is desirable that, in obtaining the protection-encoding pattern, the protection-encoding pattern is obtained based on the error correction codeword and a reference, the reference being different from the error correction codeword, that, in obtaining the protection-encoded code block, an unreplaced-and-protection-encoded code block is obtained by protection-encoding using the protection-encoding pattern the code block having the data codeword, a replaced-and-protection-encoded code block is obtained by replacing a part of the unreplaced-and-protection-encoded code block with a reference block containing the reference, that, in generating the 2D barcode based on the protection-encoded code block, the 2D barcode is generated based on the replaced-and-protection-encoded code block.

With such a method for generating a 2D barcode, it is possible to more appropriately protect hidden-object information using a 2D barcode.

In such a method for generating a 2D barcode, it is desirable that, in obtaining the replaced-and-protection-encoded code block, a part of the unreplaced-and-protection-encoded code block is replaced with the reference block at a replacement position determined according to the error correction codeword.

With such a method for generating a 2D barcode, it is possible to more appropriately protect hidden-object information using a 2D barcode.

In such a method for generating a 2D barcode, it is desirable that the method further includes obtaining a replaced code block, the replaced code block being obtained by replacing a part of an unreplaced code block that has an public data codeword and the error correction codeword with a private data codeword, and that the code block is the replaced code block.

With such a method for generating a 2D barcode, it is possible to more appropriately protect hidden-object information using a 2D barcode.

In such a method for generating a 2D barcode, it is desirable that, in obtaining the replaced code block, the part of the unreplaced code block is replaced with the private data codeword at a replacement position determined according to the error correction codeword.

With such a method for generating a 2D barcode, it is possible to more appropriately protect hidden-object information using a 2D barcode.

In such a method for generating a 2D barcode, it is desirable that, in obtaining the replaced code block, a part of the unreplaced code block is replaced with a header data codeword that contains the private data codeword and the placement information of the private data codeword, and that the replacement with the header data codeword is performed at a replacement position determined according to the error correction codeword.

With such a method for generating a 2D barcode, it is possible to more appropriately protect hidden-object information using a 2D barcode.

In such a method for generating a 2D barcode, it is desirable that the method further comprises obtaining a replaced code block, the replaced code block being obtained by replacing a part of an unreplaced code block that has a public data codeword and the error correction codeword with a private data codeword, that the code block is the replaced code block, and that the reference block contains placement information of the private data codeword.

With such a method for generating a 2D barcode, it is possible to more appropriately protect hidden-object information using a 2D barcode.

Next, a device for generating a 2D barcode, including: an encoder in which a protection-encoding pattern is obtained based on an error correction codeword, in which a protection-encoded code block is obtained by protection-encoding using the protection-encoding pattern a code block having a data codeword, and in which the 2D barcode is generated based on the protection-encoded code block.

With such a device for generating a 2D barcode, it is possible to appropriately protect hidden-object information using a 2D barcode.

Next, a program causing a computer to perform the following processes: obtaining a protection-encoding pattern based on an error correction codeword; obtaining a protection-encoded code block by protection-encoding using the protection-encoding pattern a code block having a data codeword; and generating a 2D barcode based on the protection-encoded code block.

With such a program, it is possible to appropriately protect hidden-object information using a 2D barcode.

Next, a 2D barcode characterized in that: a protection-encoding pattern is obtained based on an error correction codeword, that a protection-encoded code block is obtained by protection-encoding using the protection-encoding pattern a code block having a data codeword, and that the 2D barcode is generated based on the protection-encoded code block.

With such a 2D barcode, it is possible to appropriately protect hidden-object information using a 2D barcode.

Next, a method for reading a 2D barcode, including:
reading a 2D barcode,
the 2D barcode being generated by a method
in which a protection-encoding pattern is obtained based on an error correction codeword,
in which a protection-encoded code block is obtained by protection-encoding using the protection-encoding pattern a code block having a data codeword, and
in which the 2D barcode is generated based on the protection-encoded code block;
obtaining the protection-encoded code block from the 2D barcode;
obtaining the protection-encoding pattern based on the error correction codeword contained in the 2D barcode;
obtaining the code block by protection-decoding the protection-encoded code block using the protection-encoding pattern; and
extracting the data codeword from the code block.

With such a method for reading a 2D barcode, it is possible to appropriately protect hidden-object information using a 2D barcode.

In such a method for reading a 2D barcode, it is desirable that the protection-decoding is a step of XORing the protection-encoded code block with the protection-encoding pattern on a bit-by-bit basis.

With such a method for reading a 2D barcode, even if there is a reading error of the 2D barcode caused by contamination, the error does not affect on the other parts after protection-decoding.

In such a method for reading a 2D barcode, it is desirable that, in reading the 2D barcode, the 2D barcode being generated by a method
in which the protection-encoding pattern is obtained based on the error correction codeword and a reference different from the error correction codeword,
in which an unreplaced-and-protection-encoded code block is obtained by protection-encoding using the protection-encoding pattern the code block having the data codeword,
in which a replaced-and-protection-encoded code block is obtained by replacing a part of the unreplaced-and-protection-encoded code block with a reference block containing the reference, and
in which the 2D barcode is generated based on the replaced-and-protection-encoded code block,
that, in obtaining the protection-encoded code block, the replaced-and-protection-encoded code block is obtained from the 2D barcode,
that, in obtaining the protection-encoding pattern, the protection-encoding pattern is obtained based on the error correction codeword and the reference that are contained in the 2D barcode,
that, in obtaining the code block, the code block is obtained by protection-decoding using the protection-encoding pattern the replaced-and-protection-encoded code block,
that, in extracting the data codeword, the data codeword is extracted from the code block using the error correction codeword.

With such a method for reading a 2D barcode, it is possible to more appropriately protect hidden-object information using a 2D barcode.

In such a method for reading a 2D barcode, it is desirable that
that a part of the unreplaced-and-protection-encoded code block is replaced with the reference block at a replacement position,
that the replacement position is determined according to the error correction codeword, and
that, in obtaining the protection-encoding pattern,
the replacement position is identified based on the error correction codeword, acquiring the reference.

With such a method for reading a 2D barcode, it is possible to more appropriately protect hidden-object information using a 2D barcode.

In such a method for reading a 2D barcode, it is desirable
that the code block obtained by protection-decoding the protection-encoded code block is a replaced code block obtained by replacing a part of an unreplaced code block that has a public data codeword and the error correction codeword with a private data codeword,
that, in extracting the data codeword, the public data codeword is extracted as the data codeword from the replaced code block using the error correction codeword, and the private data codeword is extracted from the replaced code block.

With such a method for reading a 2D barcode, it is possible to more appropriately protect hidden-object information using a 2D barcode.

In such a method for reading a 2D barcode, it is desirable
that the part of the unreplaced code block is replaced with the private data codeword at a replacement position,
that the replacement position is determined according to the error correction codeword, and
that, in extracting the private data codeword, the replacement position is identified based on the error correction codeword, acquiring the private data codeword.

With such a method for reading a 2D barcode, it is possible to more appropriately protect hidden-object information using a 2D barcode.

In such a method for reading a 2D barcode, it is desirable
that the code block is a replaced code block obtained by replacing the part of the unreplaced code block with a header data codeword, the header data codeword containing the private data codeword and the placement information of the private data codeword,
that the part of the unreplaced code block is replaced with the header data codeword at a replacement position, that the replacement position is determined according to the error correction codeword, that the replacement position is identified based on the error correction codeword, acquiring the header data codeword, that, in extracting the private data codeword, the private data codeword is extracted from the replaced code block based on the placement information contained in the header data codeword.

With such a method for reading a 2D barcode, it is possible to more appropriately protect hidden-object information using a 2D barcode.

In such a method for reading a 2D barcode, it is desirable that the code block obtained by protection-decoding the protection-encoded code block is a replaced code block obtained by replacing a part of an unreplaced code block that has a public data codeword and the error correction codeword with a private data codeword, that the reference block contains the placement information of the private data codeword, that, in extracting the data codeword, the public data codeword is extracted as the data codeword from the replaced code block using the error correction codeword, and the private data codeword is extracted from the replaced code block based on the placement information which is contained in the reference block.

With such a method for reading a 2D barcode, it is possible to more appropriately protect hidden-object information using a 2D barcode.

Next, a device for reading a 2D barcode, including: a decoder in which a 2D barcode is read, the 2D barcode being generated by the following steps: obtaining a protection-encoding pattern based on an error correction codeword; obtaining a protection-encoded code block by protection-encoding using the protection-encoding pattern a code block having a data codeword; and generating the 2D barcode based on the protection-encoded code block, in which the protection-encoded code block is obtained from the 2D barcode, in which the protection-encoding pattern is obtained based on the error correction codeword contained in the 2D barcode, in which the code block is obtained by protection-decoding the protection-encoded code block using the protection-encoding pattern, and in which the data codeword is extracted from the code block.

With a device for reading a 2D barcode, it is possible to appropriately protect hidden-object information using a 2D barcode.

Next, a program causing a computer to perform the following processes: reading a 2D barcode, the 2D barcode being generated by a method in which a protection-encoding pattern is obtained based on an error correction codeword, in which a protection-encoded code block is obtained by protection-encoding using the protection-encoding pattern a code block having a data codeword, and in which the 2D barcode is generated based on the protection-encoded code block; obtaining the protection-encoded code block from the 2D barcode; obtaining the protection-encoding pattern based on the error correction codeword contained in the 2D barcode; obtaining the code block by protection-decoding the protection-encoded code block using the protection-encoding pattern; and extracting the data codeword from the code block.

With such a program, it is possible to appropriately protect hidden-object information using a 2D barcode.

Next, an administration system for a 2D barcode, including: a device for generating a 2D barcode, in which a protection-encoding pattern is obtained based on an error correction codeword, in which a protection-encoded code block is obtained by protection-encoding using the protection-encoding pattern a code block having a data codeword, and in which the 2D barcode is generated based on the protection-encoded code block; and a device for reading a 2D barcode, in which the generated 2D barcode is read, the protection-encoded code block is obtained from the 2D barcode, the protection-encoding pattern is obtained based on the error correction codeword contained in the 2D barcode, the code block is obtained by protection-decoding the protection-encoded code block using the protection-encoding pattern, and the data codeword is extracted from the code block.

With such an administration system for a 2D barcode, it is possible to appropriately protect hidden-object information using a 2D barcode.

First Embodiment

A 2D barcode used in the first embodiment will be described below. Unless otherwise stated, the following description is in conformance with Japanese Industrial Standards X 0510:2004 "Two dimensional symbol—QR code—" (hereinafter merely referred to as "JIS"). An encoder in conformance with JIS is referred to as a standard encoder, and a decoder in conformance with JIS is referred to as a standard decoder. An encoder which can perform protection-encoding is referred to as an enhanced encoder, and such a decoder is referred to as an enhanced decoder. These apparatuses will be distinguished below.

In the description below, a "protection-encoding pattern" is a so-called protection mask pattern which is used in a protection-encoding using XORing for the purpose of preventing reading-out. And, the protection-encoding pattern is different from a standard mask pattern in conformance with JIS. The mask patterns set forth in JIS are referred to as "standard mask patterns" in order to distinguish them from the "protection-encoding pattern".

In the following description, a "codeword" is eight bits long. But, the bit length of a "codeword" may be different such as 16 bits, one bit, or the like, depending on a system.

FIG. 1 is a diagram illustrating a QR code symbol 1. The QR code symbol 1 (hereinafter also merely referred to as a "QR code") has various sizes which range from version 1 to version 40. In this example, functions of version "2" QR code will be described.

The QR code symbol 1 has a function pattern and an encoding region. The function pattern is a pattern required to identify the position of the QR code symbol and to identify the characteristics of the same; the identifying and the identifying are necessary to assist in decoding the modules of the QR code. The encoding region is a region in which necessary information is written.

The function pattern includes finder patterns FP, separators SP, timing patterns TP, alignment patterns AP and a quiet zone QZ.

The finder patterns FP are respectively placed at least at three corners of a QR code symbol. At the time of reading, identifying three finder patterns FP makes it possible to exactly specify the orientation and position of the QR code symbol 1.

The separators SP are each light modules of one module width, and are each located around each finder pattern FP. This makes it possible to separate the finder patterns FP from the rest of the QR code symbol 1.

The module M is a unit cell constituting the QR code symbol 1. In principle, one bit is equivalent to one module.

Here, a set of a plurality of modules M, each of which is a unit cell constituting a QR code, is referred to as a module group.

The timing patterns TP are each a pattern in which dark and light modules are placed in line alternately one by one. With the timing patterns TP, it is possible to identify the number of the modules of the QR code symbol 1. Accordingly, the version of the QR code can be identified.

The alignment patterns AP are patterns placed in the defined locations according to the version of the QR code. In a case of large modules, the alignment patterns AP assist in identifying the position of the QR code symbol 1.

The quiet zone QZ is a light module zone of at least 4 module width, and is located around the QR code.

The encoding region includes data, error correction codewords (hereinafter also merely referred to as "correction codewords"), and format information FI. And, an encoding region of a large version number includes version information VI. The format information FI contains information of error correction level and information of the standard mask pattern. The information of the standard mask pattern is expressed as a mask pattern reference. Protection-encoding using a standard mask pattern or a protection-encoding pattern (this process will be described later) is applied to only an area within the encoding region and except the format information FI and the version information VI.

In this example, the data is actual data, and the error correction codewords are those for correcting an error which is caused when the data have not been able to be read-out. The format information contains information on the error correction level applied to the QR code symbol 1 and information on the standard mask pattern used to the QR code symbol 1. The format information FI is an encoding pattern which is required to decode the encoding region.

Figure 2:
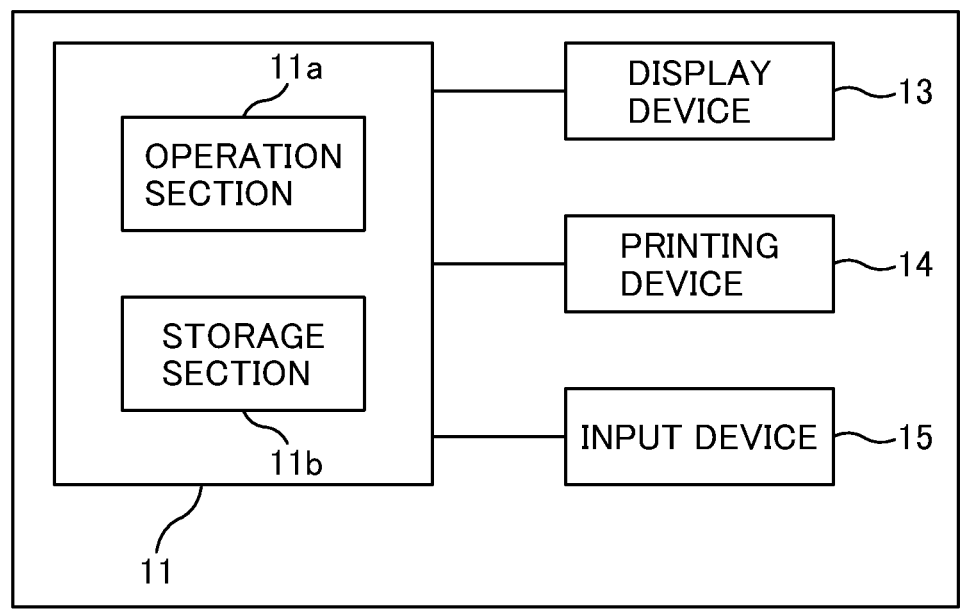
FIG. 2 is a block diagram of an enhanced encoder 10.

FIG. 2 is a block diagram of an enhanced encoder 10 (corresponding to a device for generating a 2D barcode). The enhanced encoder 10 is an apparatus for generating the QR code symbol 1, which can execute a process of generating a QR code symbol (to be described later). The enhanced encoder 10 includes a control section 11, a display device 13, a printing device 14 and an input device 15.

The control section 11 includes an operation section 11a and a storage section 11b. The operation section 11a includes units such as a Central Processing Unit, and serves as executing programs and performing various operations. The storage section 11b stores data necessary to execute programs. In particular, the storage section 11b stores a program for executing a process of generating a QR code symbol (to be described later).

The display device 13 has a display function necessary at the time of inputting data or the like. The display device 13 outputs by displaying a generated QR code symbol 1. And, the printing device 14 also outputs by printing a generated QR code symbol 1. The input device 15 is used for inputting data and is also used for operating the enhanced encoder 10.

The configuration of the enhanced encoder 10 can be realized by installing to a common device (e.g., a computer, a mobile phone or a smartphone) a program being for executing a program for performing the protection-encoding step (to be described later).

Figure 3:
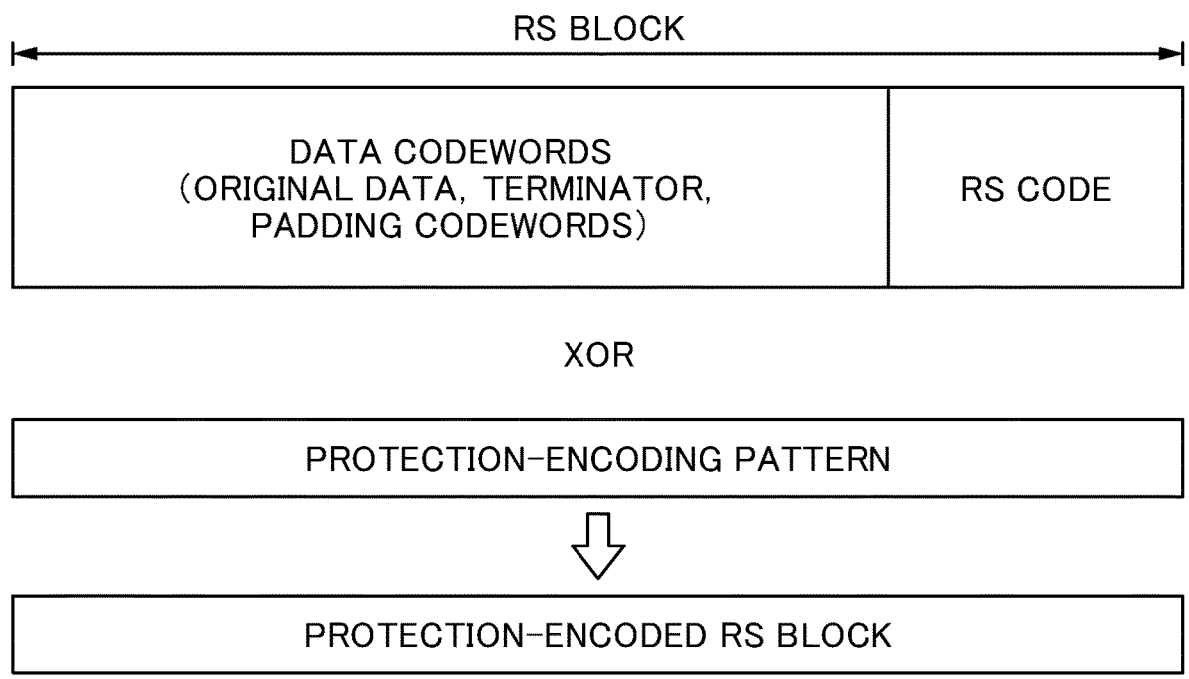
FIG. 3 is a diagram illustrating a process of generating a QR code symbol according to the first embodiment.
Figure 4:
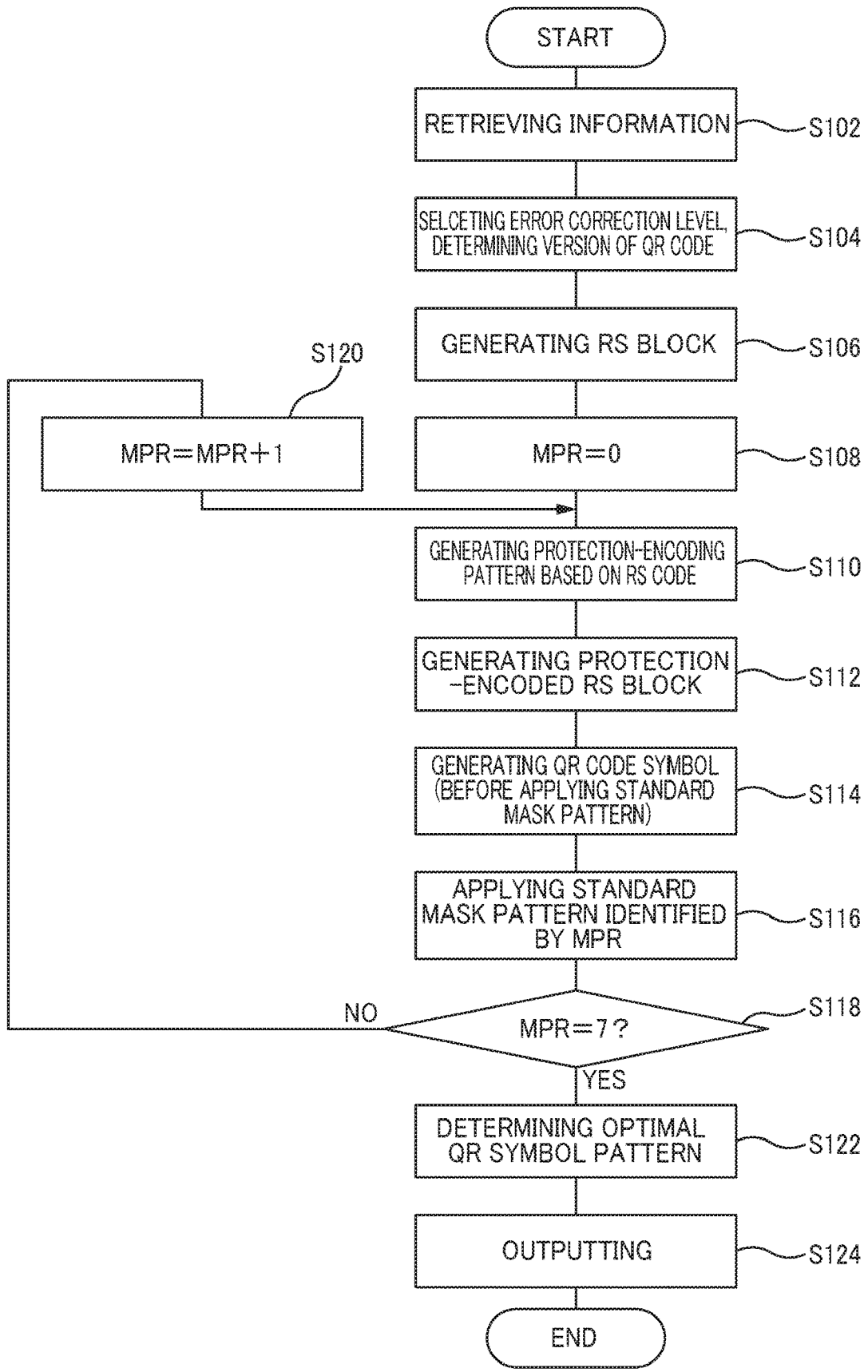
FIG. 4 is a flow chart of a method of generating a QR code symbol according to the first embodiment.

FIG. 3 is a diagram illustrating a process of generating an enhanced QR code according to the first embodiment. FIG. 4 is a flow chart of a process of generating an enhanced QR code symbol according to the first embodiment. Here, as will be described later, protection-encoding of a RS block (corresponding to a "code block") makes it difficult for a third party to read information. Accordingly, a QR code symbol which is generated in the embodiments is referred to as an enhanced QR code symbol (also merely referred to as a QR code symbol). With reference to these figures, the process of generating an enhanced QR code will be described below.

First, original data which are embedded in the QR code symbol 1 are retrieved (S102). Retrieving the original data may be performed via the input device 15, and also, information stored in advance in the storage section 11b may be used.

Next, the error correction level is selected, and the version of the QR code symbol 1 is determined according to the original data (S104). According to its version, the total number of the codewords in the QR code symbol 1 is determined. The total number of the codewords is the sum of the number of the correction codewords corresponding to the selected error correction level and the number of the data codewords; the number of the data codewords includes the number of the codewords of the original data. Also, according to the version of the QR code symbol 1, the size and the number of the RS blocks, consisting of the data codewords and the correction codewords, are determined. Error correction is made for each of the RS blocks.

For example, if error correction is "level H" and version is "4", the total number of the codewords is determined "100". It is also determined that a QR code symbol 1 includes four RS blocks. The number of the data codewords per RS block is "9", and the number of the correction codewords per RS block is "16".

In one RS block, the sum of the number of data codewords "9" and the number of correction codewords "16" is "25". Since there are four RS blocks, a QR code symbol of version "4" has 100 codewords in total: 25×4=100.

In this case, the number of words whose error can be corrected by one RS block is "8". This means that one RS block has a capacity of correcting "8" data codewords of total "9" data codewords. Since there are four RS blocks, the QR code symbol has a correcting capacity for 32 words in total: 4×8=32. It is possible to correct 32 words of 100 words, and this means that the QR code symbol has correcting capacity of 32% in total.

Next, RS blocks are generated according to the codewords of the original data (S106). A RS block is a block composed of data codewords and Reed-Solomon codes (hereinafter also referred to as "RS codes"), as set forth in JIS. The data codewords contain original data, a terminator and padding codewords. Other information set forth in JIS is contained in some cases. The RS code is a correction code for performing error correction of RS blocks. The RS code used in this example is prescribed in JIS. In order to generate RS blocks, the codewords of the original data are divided into a plurality of blocks. Error correction codewords are generated for each of the blocks, and the generated correction codewords are added next to the corresponding codewords, generating RS blocks.

Next, the value of the mask pattern reference MPR is reset to "0" (S108). With a mask pattern reference MPR in conformance with JIS, the value of the mask pattern reference MPR ranges from 0 to 7 (from "000" to "111"). In this example, the value of the mask pattern reference MPR changes from 0 to 7, and the processes from step S110 to step S116 (to be described later) are repeated. In order to repeating the processes, the value of the mask pattern reference MPR is reset to "0".

Next, using the RS code, a protection-encoding pattern is generated (S110). The protection-encoding pattern is a pattern used for protection-encoding the RS block mentioned above. The RS block is protection-encoded using the protection-encoding pattern, and becomes a protection-encoded RS block. The protection-encoding pattern is used for XORing with a sequence of bits of a RS block in a process to be described later. That is, the protection-encoding pattern is a pattern composed of a sequence of bits.

Table 1 shows an example of a function that generates the protection-encoding pattern using the RS code. In the present embodiment, the protection-encoding pattern is generated based on Table 1 and the last three bits of RS code of the initial RS block of a plurality of RS blocks. More specifically, the last three bits is obtained, and based on the obtained three bits, a function is selected from Table 1. Based on the function, the protection-encoding pattern is generated.

TABLE 1

| RS code | Functions that are used for Generating Protection-encoding pattern |
| --- | --- |
| 000 | Function #0 (RSA2048, Key value Ks#0) passcode required: to be entered as data to be encrypted |
| 001 | Function #1 (AES, Key value K#1) passcode required: to be entered as data to be encrypted |
| 010 | Function #2 (3DES, Key value KE#2, value to be encrypted #2) passcode required: to be entered as key KD |
| 011 | Function #3 (R5A2048, Key value Ks#3) passcode required: to be entered as data to be encrypted |
| 100 | Function #4 (AES, Key value K#4) passcode required: to be entered as data to be encrypted |
| 101 | Function #5 (3DES, Key value KE#5, value to be encrypted #5) passcode required: to be entered as key KD |
| 110 | Function #6 (RSA2048, Key value Ks#6) passcode required: to be entered as data to be encrypted |
| 111 | Function #7 (AES, Key value K#7) passcode required: to be entered as data to be encrypted |

It should be noted that the foregoing procedure for generating the protection-encoding pattern using the RS code (error correction codewords) is an example. The invention is not limited to the foregoing procedure as long as the protection-encoding pattern is generated using the RS code (error correction codewords). For example, the following procedure is also acceptable: three bits are obtained by performing a predetermined operation by which numbers for three bits are calculated, using all bits of all of the plurality of RS blocks.

It goes without saying that the functions of Table 1 are not limited to those based on three bits. For example, if based on four bits, the function to be used is selected from 16 choices.

Depending on the RS code, the functions shown in the foregoing table are employed to generate the protection-encoding pattern. And, a passcode may be used if necessary. Also, if necessary, a passcode (password), which is to be entered voluntarily, may be used as data to be encrypted which is an input value of the function. Or, if necessary, the passcode may be used as a piece of cryptographic key information which is used in the calculation of an encryption function.

Next, using the generated protection-encoding pattern, a RS block is protection-encoded. Then, the protection-encoded RS block (corresponding to a "protection-encoded code block") is generated (S112). FIG. 3 shows XORing a RS block with a protection-encoding pattern on a bit-by-bit, generating a protection-encoded RS block. Thus, a RS block is protection-encoded using a protection-encoding pattern.

When a plurality of RS blocks exist, the plurality of RS blocks are protection-encoded. But, the RS code (error correction codewords) which is used for generating the protection-encoding pattern is not subject to protection-encoding. In the present embodiment, a part except at least the last three bits of the RS code of the initial RS block is subject to protection-encoding.

Since XORing is executed on a bit-by-bit basis as mentioned above, both of the protection-encoding step and the protection-decoding step (to be described later) are able to be the same type of processing (XORing).

Next, using the protection-encoded RS block, a QR code symbol is generated in conformance with the structure set forth by JIS (S114). But, a QR code symbol which has been generated in this step is one to which a standard mask pattern in conformance with JIS has not been applied yet. The procedure for generating a QR code symbol to which the standard mask pattern has not been applied is in conformance with JIS, and the description will be omitted. Each bit of the protection-encoded RS block is converted to a module, and these modules are placed in corresponding positions. The plurality of modules constitute a module group, and a standard mask pattern (to be described later) is applied to the module group.

Next, to the generated QR code symbol, a standard mask pattern is applied, the standard mask pattern being identified by the mask pattern reference MPR (S116). Applying a standard mask pattern is in conformance with JIS, and the description will be omitted. Consequently, a standard mask pattern is applied to the module group as mentioned above.

Next, it is judged whether the value of the mask pattern reference MPR is 7 or not (S118). That is, whichever value between 0 and 7 is taken as the value of the mask pattern reference MPR, it is judged whether the processes from step S110 to step S114 have been performed or not. In step S118, if the value of the mask pattern reference MPR is not "7", the value of the mask pattern reference MPR increments (S120).

On the other hand, in step S118, if the value of the mask pattern reference MPR reaches to "7", all types of QR code symbol have been generated which respectively correspond to the value of the mask pattern reference MPR from 0 to 7. And, these eight QR code symbols are evaluated and the optimal pattern of the QR code symbol is determined (S122).

Concerning evaluation of QR code symbols in step S122, "Evaluation of masking result" of JIS is applied thereto, and the description thereof will be omitted. By this evaluation, it is possible to specify a QR code symbol whose modules scatters reasonably.

In the foregoing method, eight types of QR code symbols are stored together, and in step S122, these QR code symbols are evaluated. However, the evaluation may be performed each time when each type of QR code symbol is generated. That is, it is acceptable that the evaluation value is obtained for a QR code symbol which has been currently generated, and is compared with the evaluation value of the QR code symbol which has previously generated according to the value of the previous mask pattern reference MPR. Only a QR code symbol having a better evaluation value may be stored. And then, generating a next QR code symbol based on the value of the subsequent mask pattern reference MPR, the next QR code symbol may be evaluated and the evaluation value of the next QR code symbol may be compared with that of the foregoing QR code symbol having the best evaluation value so far. This makes it possible to save storage capacity.

Next, the QR code symbol which has been identified in step S122 is outputted (S124). The outputted QR code symbol may be displayed by the display device 13, and may be printed by the printing device 14.

A standard mask pattern can be applied before the process for generating a protection-encoded RS block in step S112. However, in terms of scattering modules in QR code symbol, it is desirable that a standard mask pattern is applied after the process for generating a protection-encoded RS block in step S112.

Next, a process for reading an enhanced QR code will be described.

Figure 5:
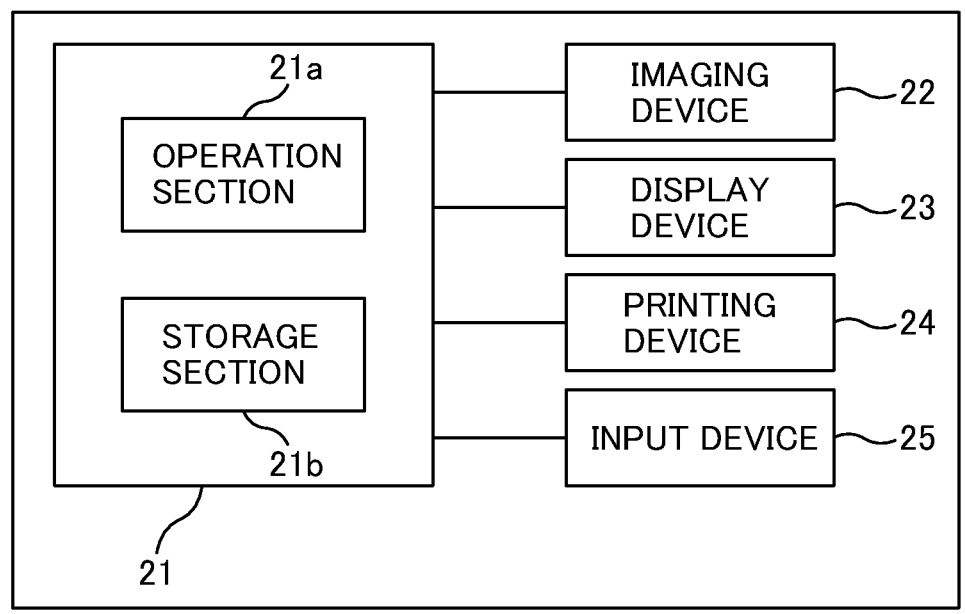
FIG. 5 is a block diagram of an enhanced decoder 20.

FIG. 5 is a block diagram of an enhanced decoder 20 (corresponding to the device for reading a 2D barcode). The enhanced decoder 20 is an apparatus which can read the enhanced QR code symbol 1. The enhanced decoder 20 includes a control section 21, an imaging device 22, a display device 23, a printing device 24 and an input device 25. A common device for reading a QR code cannot execute the protection-decoding step (to be described later), and therefore such a device cannot appropriately read an enhanced QR code symbol 1. This enhanced decoder 20 and the foregoing enhanced encoder 10 constitute an administration system for a 2D barcode. Note that the administration system for a 2D barcode may include an management computer having a database for managing codes and/or customers.

The control section 21 includes an operation section 21a and a storage section 21b. The operation section 21a is composed of units such as Central Processing Unit, and serves as executing programs and performing various operations. The storage section 21b stores data necessary to execute programs. In particular, the storage section 21b stores a program for executing the reading process of a QR code symbol (to be described later).

The imaging device 22 is a device for imaging the enhanced QR code symbol such as CCD camera or the like.

The display device 23 has a display function necessary at the time of inputting data or the like. The display device 23 outputs by displaying information expanded from a QR code. The printing device 24 outputs by printing such expanded information. The input device 25 is used for inputting data and is also used for operating the enhanced decoder 20.

The configuration of the enhanced decoder 20 can be realized by installing a program to a common device (a dedicated device is not needed; e.g., a computer, a mobile phone or a smartphone) having the imaging device 22, the program being for executing the reading process of an enhanced QR code symbol (to be described later). Also, the enhanced decoder 20 may be combined with the foregoing enhanced encoder 10.

Figure 6:
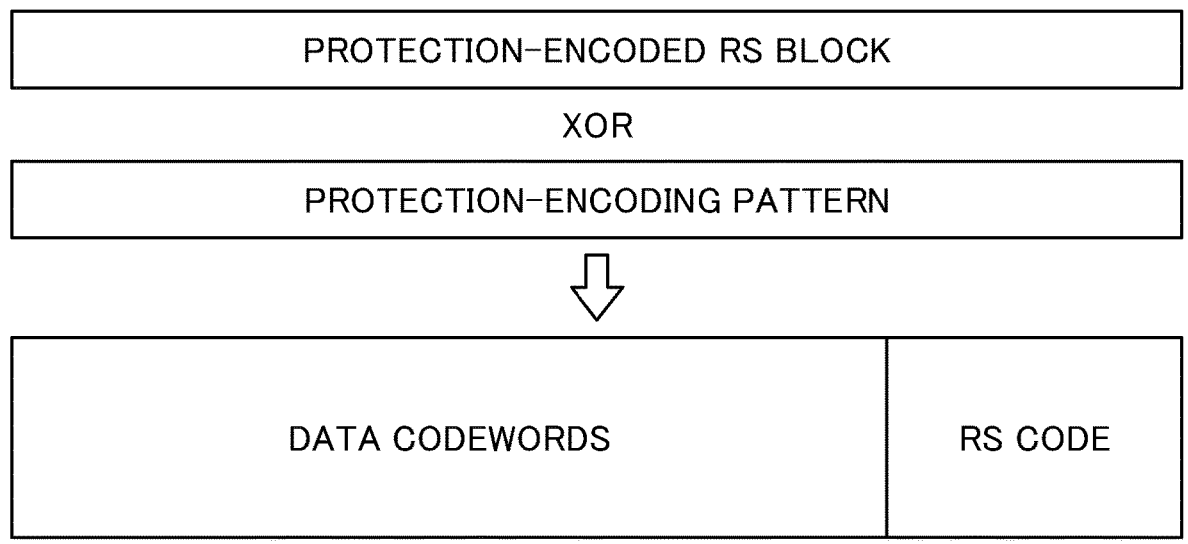
FIG. 6 is a diagram illustrating a process of reading a QR code symbol according to the first embodiment.
Figure 7:
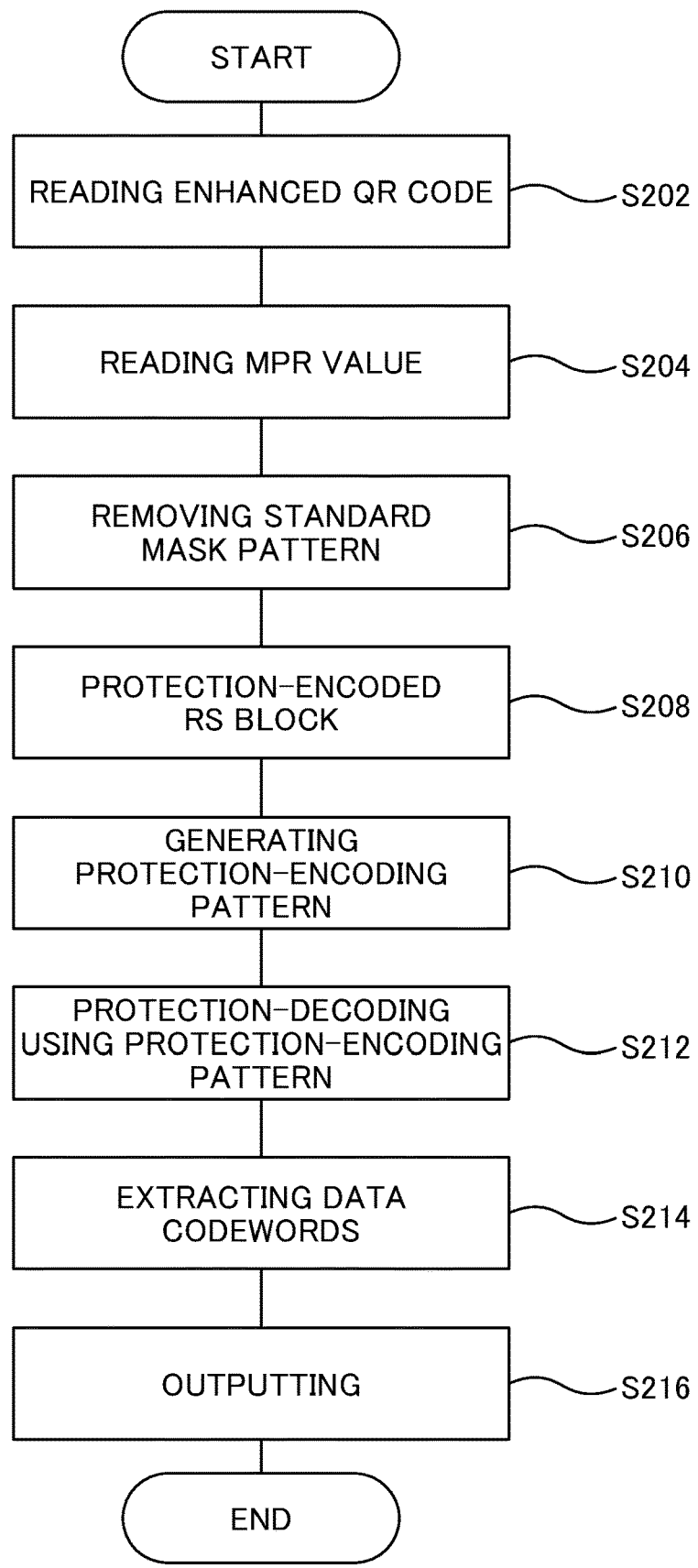
FIG. 7 is a flow chart of a process of reading a QR code symbol according to the first embodiment.

FIG. 6 is a diagram illustrating a process of reading an enhanced QR code symbol according to the first embodiment. FIG. 7 is a flow chart of the process of reading an enhanced QR code symbol according to the first embodiment. With reference to these figures, the process of reading a QR code symbol will be described below.

First, the enhanced QR code symbol 1 is read (S202). Then, from the format information FI of the enhanced QR code symbol which has been read, a mask pattern reference MPR is read-out (S204). Next, the standard mask pattern which has been applied is identified based on the value of the mask pattern reference MPR. Using this identified standard mask pattern, removal of the standard mask pattern (unmasking) is performed (S206). The method for identifying and removing the standard mask pattern are in conformance with JIS, and the description thereof will be omitted. Thus, the foregoing module group is obtained.

Next, from the module group of the enhanced QR code symbol 1 from which the standard mask pattern has been removed, a plurality of protection-encoded RS blocks are expanded (S208). Concerning expansion of the plurality of protection-encoded RS blocks, a method in conformance with JIS for expanding RS blocks may be employed. Thus, for example, a protection-encoded RS block shown in FIG. 6 is acquired.

Next, the protection-encoding pattern is generated based on the value of the RS code (S210). That is, a RS code contained in the enhanced QR code symbol is acquired, and based on the acquired RS code, the protection-encoding pattern is obtained. Note that the RS code is able to be acquired without troubles since a RS code (error correction codewords) used for generating the protection-encoding pattern is not subject to protection-encoding as mentioned above. Concerning the protection-encoding pattern, it is possible to employ a method similar to the process for generating the protection-encoding pattern in step S110 of the foregoing method for generating an enhanced QR code symbol, and therefore, the description thereof will be omitted. This step S210 is performed when the data codewords of the read QR code symbol cannot be extracted in the standard decoding process. As a matter of course, in this case, the data codewords of the QR code symbol cannot be extracted by a normal decoder (standard decoding means). That is, only if attempting to read a QR code symbol which has been protection-encoded using a protection-encoding pattern as in the present embodiment, the processes of and after step S210 are performed. Otherwise, the standard decoding process is performed.

Next, the protection-encoded RS blocks are protection-decoded using the generated protection-encoding pattern (S212). FIG. 6 shows XORing a protection-encoded RS block with a protection-encoding pattern, generating a protection-decoded RS block (that is, a RS block before protection-encoding). In most cases, there are a plurality of protection-encoded RS blocks, and all of the protection-encoded RS blocks are protection-decoded.

Next, the data codewords are extracted from the RS block (S214). At the time of extracting the data codewords, error correction using a RS code is performed. Due to this error correction, even if data codewords are contaminated, original data codewords can be recovered. Then, the data codewords which have been recovered are extracted. This is because, even if there is a reading error caused by contamination, the error is appropriately corrected using a correction code due to a characteristic of XORing: the error remains in a bit located at the same position in the original codeword even if being protection-decoded using a protection-encoding pattern.

Next, outputted is the original data which is contained in the extracted data codewords (S216). Concerning outputting methods, it may be displayed on the display device 23 or may be printed by the printing device 24.

As mentioned above, a method for generating a 2D barcode according to the present embodiment includes: obtaining a protection-encoding pattern based on error correction codewords (a RS code); obtaining a protection-encoded code block (a protection-encoded RS block) by protection-encoding using the protection-encoding pattern a code block (a RS block) having data codewords; and generating a 2D barcode based on the protection-encoded code block (the protection-encoded RS block).

In the enhanced encoder 10 according to the present embodiment, a protection-encoding pattern is obtained based on error correction codewords (a RS code), a protection-encoded code block (a protection-encoded RS block) is obtained by protection-encoding using the protection-encoding pattern a code block (a RS block) having data codewords, and a 2D barcode is generated based on the protection-encoded code block (the protection-encoded RS block).

A program according to the present embodiment causes a computer to perform the following processes: obtaining a protection-encoding pattern based on error correction codewords (a RS code); obtaining a protection-encoded code block (a protection-encoded RS block) by protection-encoding using the protection-encoding pattern a code block (a RS block) having data codewords; and generating a 2D barcode based on the protection-encoded code block (the protection-encoded RS block).

A 2D barcode according to the present embodiment is generated by the following processes: obtaining a protection-encoding pattern based on error correction codewords (a RS code); obtaining a protection-encoded code block (a protection-encoded RS block) by protection-encoding using the protection-encoding pattern a code block (a RS block) having data codewords; and generating the 2D barcode based on the protection-encoded code block (the protection-encoded RS block).

A method for reading a 2D barcode according to the present embodiment includes: reading a 2D barcode, the 2D barcode being generated by a method in which a protection-encoding pattern is obtained based on error correction codewords (a RS code), in which a protection-encoded code block (a protection-encoded RS block) is obtained by protection-encoding using the protection-encoding pattern a code block (a RS block) having data codewords, and in which the 2D barcode is generated based on the protection-encoded code block (the protection-encoded RS block); obtaining the protection-encoded code block (protection-encoded RS block) from the 2D barcode; obtaining the protection-encoding pattern based on the error correction codewords (the RS code) contained in the 2D barcode; obtaining the code block (the RS block) by protection-decoding the protection-encoded code block using the protection-encoding pattern; and extracting the data codewords from the code block (the RS block).

In the enhanced decoder 20 according to the present embodiment, a 2D barcode is read, the 2D barcode being generated by the following steps: obtaining a protection-encoding pattern based on error correction codewords (a RS code); obtaining a protection-encoded code block (a protection-encoded RS block) by protection-encoding using the protection-encoding pattern a code block (a RS block) having data codewords; and generating the 2D barcode based on the protection-encoded code block (the protection-encoded RS block). And, the protection-encoded code block (the protection-encoded RS block) is obtained from the 2D barcode. The protection-encoding pattern is obtained based on the error correction codewords (the RS code) contained in the 2D barcode. The code block (the RS block) is obtained by protection-decoding the protection-encoded code block using the protection-encoding pattern, and the data codewords are extracted from the code block (the RS block).

A program according to the present embodiment causes a computer to perform the following processes: reading a 2D barcode, the 2D barcode being generated by a method in which a protection-encoding pattern is obtained based on error correction codewords (a RS code), in which a protection-encoded code block (a protection-encoded RS block) is obtained by protection-encoding using the protection-encoding pattern a code block (a RS block) having data codewords, and in which the 2D barcode is generated based on the protection-encoded code block (the protection-encoded RS block); obtaining the protection-encoded code block (the protection-encoded RS block) from the 2D barcode; obtaining the protection-encoding pattern based on the error correction codewords (the RS code) contained in the 2D barcode; obtaining the code block (the RS block) by protection-decoding the protection-encoded code block using the protection-encoding pattern; and extracting the data codewords from the code block (the RS block).

An administration system for a 2D barcode according to the present embodiment includes: an enhanced encoder 10 in which a protection-encoding pattern is obtained based on error correction codewords (a RS code), in which a protection-encoded code block (a protection-encoded RS block) is obtained by protection-encoding using a protection-encoding pattern a code block (a RS block) having data codewords, and in which the 2D barcode is generated based on the protection-encoded code block (the protection-encoded RS block); and an enhanced decoder 20 in which the generated 2D barcode is read, in which the protection-encoded code block (the protection-encoded RS block) is obtained from the 2D barcode, in which the protection-encoding pattern is obtained based on error correction codewords (RS code) contained in the 2D barcode, in which the code block (the RS block) is obtained by protection-decoding the protection-encoded code block using the protection-encoding pattern, and in which the data codewords are extracted from the code block (the RS block).

Accordingly, it is possible to appropriately protect hidden-object information using a 2D barcode.

As a method for concealing hidden-object information, encrypting information itself can be considered. However, in case of encrypting information, it is possible to at least read the 2D barcode. In this case, there is a possibility that, after the 2D barcode has been read, the encrypted codewords of encrypted information are acquired and decrypted. And, there is a possibility that a third party finally extracts the content of the information and the hidden-object information is read-out.

As opposed thereto, in the present embodiment, the protection-encoding pattern is applied to the generated 2D barcode (enhanced QR code symbol). Accordingly, a common device for reading a QR code cannot perform the protection-decoding step of the 2D barcode, and cannot even read the 2D barcode (enhanced QR code symbol). That is, the generated 2D barcode (enhanced QR code symbol) has the same appearance as that of an ordinary (non-enhanced) QR code, but an ordinary decoder cannot read it. This makes it possible to more appropriately protect hidden-object information compared to a case where information codewords themselves are encrypted.

Since the protection-encoding pattern is obtained based on the error correction codewords (the RS code), it is possible to more appropriately protect hidden-object information. That is, the error correction codewords (the RS code) are not things to be displayed, and therefore they are information which is difficult to acquire. Further, the error correction codewords (the RS code) is obtained by complicated computations based on the data codewords, and therefore it is difficult to estimate the codewords as a result of the computations. This characteristic of the error correction codewords (the RS code) enables to make it difficult to identify the protection-encoding pattern.

In the present embodiment, protection-encoding (protection-decoding) is performed by XORing a code block (a protection-encoded code block) with a protection-encoding pattern on a bit-by-bit basis. This achieves an advantage that, even if there is a reading error of the 2D barcode caused by contamination, the error does not affect on the other parts after protection-decoding (that is, adverse affects are limited to the bits in which the error occurs).

Second Embodiment

Figure 8A:
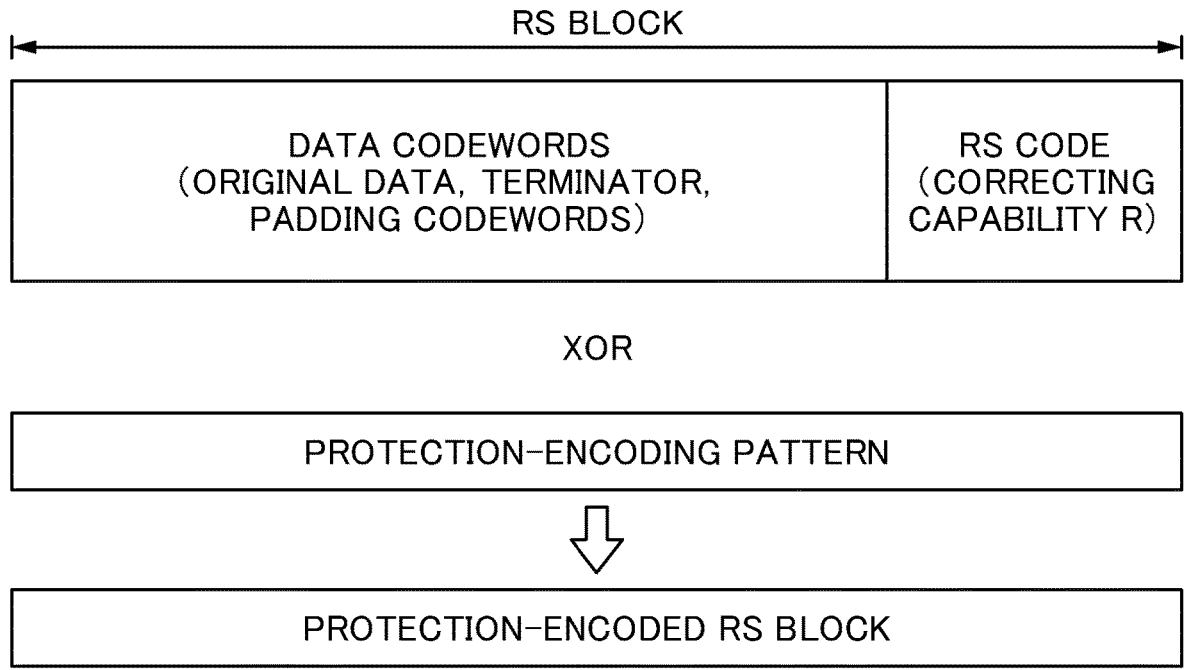
FIG. 8 is a diagram illustrating a process of generating a QR code symbol according to the second embodiment.
Figure 8B:
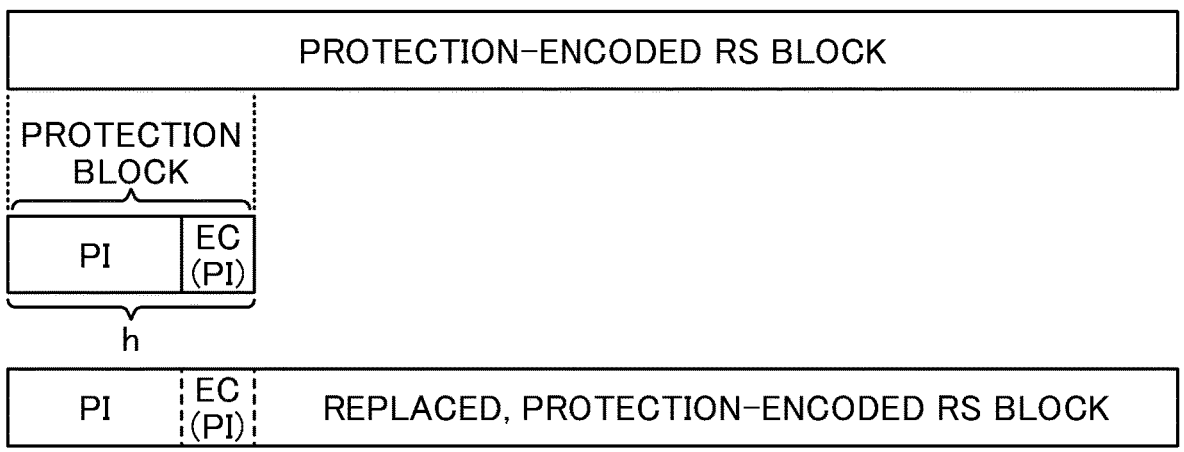

FIG. 8A is a first diagram illustrating a process of generating an enhanced QR code symbol according to the second embodiment. FIG. 8B is a second diagram illustrating the process of generating an enhanced QR code symbol according to the second embodiment.

In the process of generating an enhanced QR code according to the second embodiment, the difference from the first embodiment is that protection-encoding is made using not only a RS code but also a protection ID (indicated by the symbols "PI" in the figures; corresponding to the "other reference"). A part of a protection-encoded RS block is replaced with the protection ID (in other words, a protection block containing the protection ID; corresponding to the "reference block").

A method for generating an enhanced QR code symbol according to the second embodiment will be described below based on a flow chart, which is partly different from a flow chart used in the first embodiment (FIG. 4).

Processes from step S102 to step S108 are the same as in the first embodiment. The description thereof will therefore be omitted. In the second embodiment, in step S110, using not only the RS code but also the protection ID as mentioned above, the protection-encoding pattern is generated.

In the Table 2, several functions corresponding to the protection IDs are shown. These functions can be an encryption function such as RSA, AES or 3DES. And, a predetermined key value is used for these functions. Also, if necessary, a passcode (password), which is to be entered voluntarily, may be used as data to be encrypted which is an input value of the function. Or, if necessary, the passcode may be used as a piece of cryptographic key information which is used in the calculation of an encryption function.

TABLE 2

| PI | Generating temporary pattern |
|---|---|
| 0 | Function #0 (RSA2048, Key value Ks#0, value to be encrypted #0) No passcode * |
| 1 | RFU |
| 2 | RFU |
| 3 | Function #1 (AES, Key value K#1) passcode required: to be entered as data to be encrypted |
| 4 | Function #1 (AES, Key value K#1, value to be encrypted #1) No passcode * |
| ... | |
| 27 | RFU |
| 28 | RFU |
| 29 | Function #5 (3DES, Key value KE#5, value to be encrypted #5) passcode required: to be entered as key KD |
| 30 | Function #5 (3DES, Key value KE#5, KD#5, value to be encrypted #5) No passcode * |
| 31 | Function #0 (RSA2048, Key value Ks#0) passcode required: to be entered as c-ita to be encrypted |

In the present embodiment, a protection ID has a value ranging from 0 to 31. However, some of the protection IDs (e.g., 1, 2, 27 and 28) is in a state of RFU (Reserved For Future Use), and therefore they are currently unavailable. These protection IDs will be used for future specification extension. Among currently-available protection IDs, one protection ID is designated (selected) by a user. The designated protection ID are retrieved together with the original data in step S102, for example (the retrieving may be performed via the input device 15 in a similar manner to original data, or information stored in advance in the storage section 11*b* may be used). Also, the retrieving may be performed in other steps except step S102.

A function in Table 2 is used according to the retrieved protection ID, generating a temporary pattern. A pattern which has been generated using a protection ID in the foregoing manner is also subject to a bit manipulation which is identified by a RS code. Then, a protection-encoding pattern is generated. In Table 3, shown is bit manipulations corresponding to the values of the RS codes.

TABLE 3

| RS code | Bit manipulations used in Generating Protection-encoding pattern (Bit manipulations applied to Temporary patterns) |
|---|---|
| 000 | Bit flipping |
| 001 | Left circular shift by one bit on a bite-by-bite basis |
| 010 | Right circular shift by one bit on a bite-by-bite basis |
| 011 | Left circular shift by two bits on a bite-by-bite basis |
| 100 | Right circular shift by two bits on a bite-by-bite basis |
| 101 | Left circular shift by three bits on a bite-by-bite basis |
| 110 | Right circular shift by three bits on a bite-by-bite basis |
| 111 | Left nibble (four bits) bit flipping |

It should be noted that the foregoing procedure for generating the protection-encoding pattern using the protection ID and the RS code is an example. The invention is not limited to the foregoing procedure as long as the protection-encoding pattern is generated using the protection ID and the RS code.

Next, using the protection-encoding pattern which has been generated as mentioned above, a protection-encoded RS block (corresponding to the unreplaced-and-protection-encoded code block) is generated. The method for generating a protection-encoded RS block is as shown in FIG. 8A. As in the description of step S112 in the first embodiment, XORing a RS block with the protection-encoding pattern is executed on a bit-by-bit basis, generating a protection-encoded RS block.

In the second embodiment, as shown in FIG. 8B, a part of the protection-encoded RS block is also replaced with a protection block containing the protection ID, generating the protection-encoded RS block that has been replaced (corresponding to replaced-and-protection-encoded code block). The protection block is one obtained by adding to the foregoing protection ID a correction code for correcting it (e.g., a BCH code or a RS code; EC (PI) in the figure: EC means "error correction"). As shown in FIG. 8B, the initial part of the protection-encoded RS block is replaced with a protection block in this example.

In the second embodiment, the number of the words of a protection block is h as shown in FIG. 8B. In this case, the RS code of the RS block can correct up to R words as shown in FIG. 8A. The relation "R is equal to or larger than h" exists. That is, correcting capacity of the RS code (error correction codewords) associated with the RS block is equal to or more than the number of words of the protection block.

Due to this relation, even if a part of a protection-encoded RS block is replaced with a protection block, it is possible to correct the replaced part using a RS code. Accordingly, in a step of reading an enhanced QR code symbol (to be described later), data codewords can be extracted appropriately.

When the previous processes are completed, the processes from step S114 to step S124 are performed. The processes from step S114 to step S124 are the same as in the first embodiment, and the description thereof will be omitted.

Figure 9A:
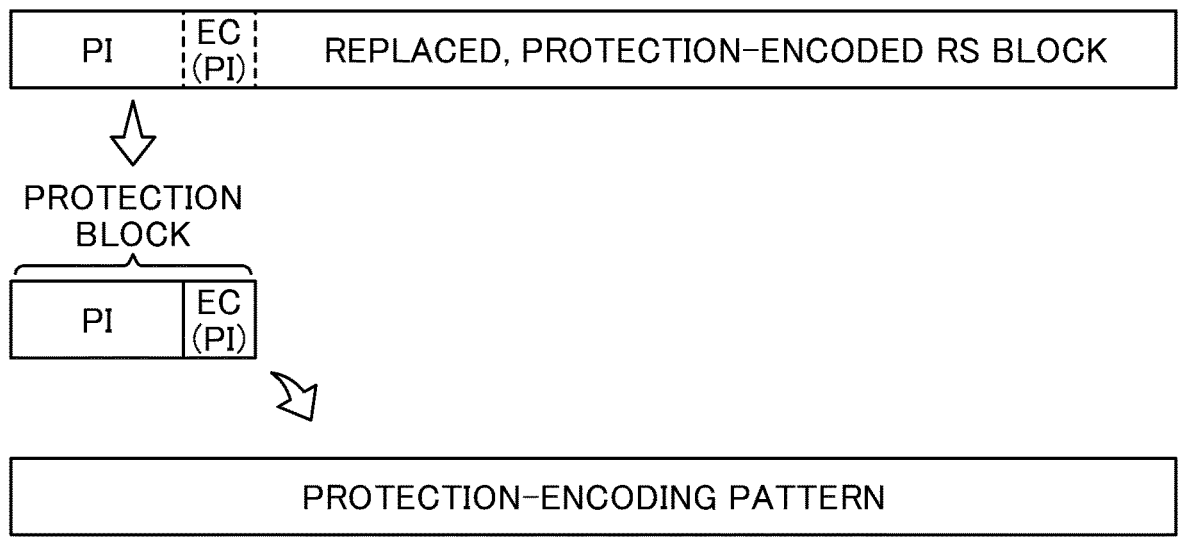
FIG. 9 is a diagram illustrating a process of reading a QR code symbol according to the second embodiment.
Figure 9B:
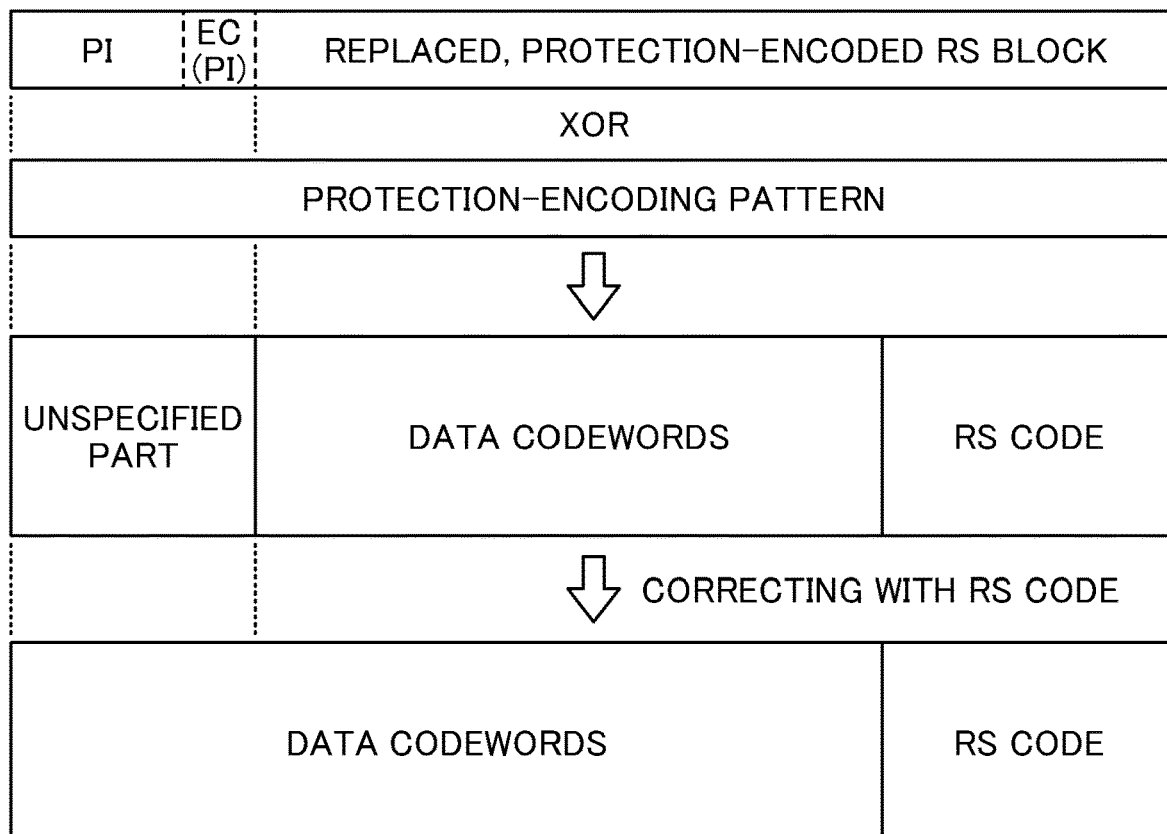

FIG. 9A is a first diagram illustrating a process of reading a QR code symbol according to the second embodiment. FIG. 9B is a second diagram illustrating a process of reading an enhanced QR code symbol according to the second embodiment. Regarding the process of reading an enhanced QR code symbol, the second embodiment are partially common with the first embodiment. A method for reading an enhanced QR code symbol according to the second embodiment will be described below based on a flow chart, which is partly different from a flow chart used in the first embodiment (FIG. 7).

The processes from step S202 to step S208 are the same as in the first embodiment. The description thereof will therefore be omitted. The processes from step S210 to step S214 are replaced to the processes to be described below.

When step S208 is completed, a plurality of protection-encoded RS blocks (partly replaced) are obtained. As mentioned above, each of the protection-encoded RS blocks (partly replaced) is a protection-encoded RS block a part of which is replaced with a protection block. Then, the protection block is extracted from the protection-encoded RS block (partly replaced).

Next, using the correction code contained in the protection block, the protection ID is corrected if necessary. The protection-encoding pattern is generated using the corrected protection ID and the RS code (FIG. 9A). The procedure for generating the protection-encoding pattern using the protection ID and the RS code is the same as mentioned above, and the description thereof will be omitted.

Next, as shown in FIG. 9B, XORing with the protection-encoding pattern the protection-encoded RS block that has been replaced is executed on a bit-by-bit basis. Then, as shown in FIG. 9B, generated is a RS block in which a part corresponding to the position where the protection block has existed becomes an unspecified part. Using the RS code of the RS block, the RS block is corrected. As a result of correcting the RS block using the RS code, the unspecified part is corrected appropriately, and data codewords are recovered.

As mentioned above, the number of words R which a RS code can correct is equal to or larger than the number of the words h of a protection block. Accordingly, using the RS code, it is possible to recover appropriately the unspecified part, which corresponds to the number of the words h of the protection block.

The data codewords which have been recovered in this manner are extracted and outputted (S216). The output method is the same as in the first embodiment, and the description thereof will be omitted.

In the second embodiment, a protection-encoding pattern is obtained based on error correction codewords (a RS code) and based on a reference (a protection ID), which is different from the error correction codewords (the RS code). Then, using the protection-encoding pattern, a code block having data codewords (a RS block) is protection-encoded, obtaining an unreplaced-and-protection-encoded code block (a protection-encoded RS block). A part of the unreplaced-and-protection-encoded code block (protection-encoded RS block) is replaced with a reference block (a protection block) containing the reference (the protection ID), obtaining a replaced-and-protection-encoded code block (a protection-encoded RS block that has been replaced). Based on the replaced-and-protection-encoded code block, a 2D barcode is generated.

The generated 2D barcode is read, and from the 2D barcode, the replaced-and-protection-encoded code block (the protection-encoded RS block that has been replaced) is obtained. And, the protection-encoding pattern is obtained based on the correction codewords (the RS code) and the reference (the protection ID) which are contained in the 2D barcode. The replaced-and-protection-encoded code block is protection-decoded using the protection-encoding pattern, obtaining the code block (the RS block). From the code block (the RS block), the data codewords are extracted using the correction codewords (the RS code).

Thus, the protection-encoding pattern is generated using not only the correction codewords (the RS code) but also the reference (the protection ID). Accordingly, it can make it more difficult for a third party to extract the data codewords. Consequently, it is possible to more appropriately protect hidden-object information using a 2D barcode.

Third Embodiment

Figure 10:
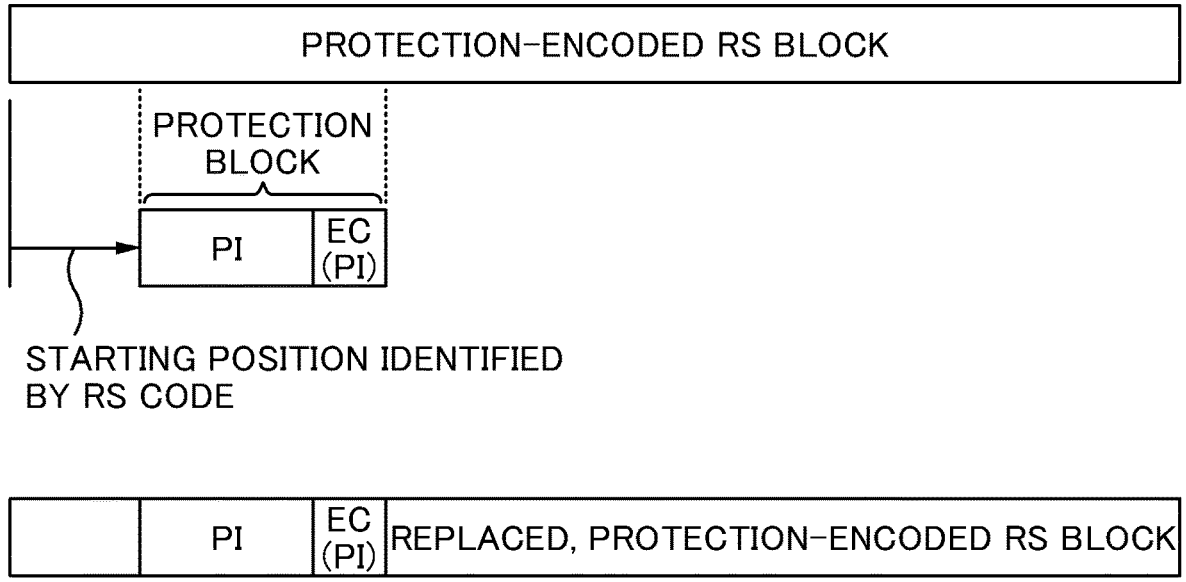
FIG. 10 is a diagram illustrating a process of generating a QR code symbol according to the third embodiment.

FIG. 10 is a diagram illustrating a process of generating a QR code symbol according to the third embodiment. In the foregoing second embodiment, a position at which the protection-encoded RS block is replaced with a protection block is the initial position of the protection-encoded RS block. In the third embodiment, the protection-encoded RS block is replaced with a protection block at a replacement position determined according to a RS code.

Though the beginning position of replacement with a protection block may be predetermined appropriately, it is also possible to predetermine the beginning position of replacement, as shown in Table 4, for example.

TABLE 4

| RS code | Beginning position of replacement with protection block |
|---------|---------------------------------------------------------|
| 000 | Initial end of second RS block |
| 001 | 10th byte of first RS block |
| 010 | Initial end of second last RS block |
| 011 | 10th byte of second RS block |
| 100 | 4th byte of first RS block |
| 101 | Initial end of 3rd RS block |
| 110 | 9th byte of first RS block |
| 111 | 9th byte of last RS block |

Note that replacement with the protection block may be conducted at a plurality of positions (an identical protection block is placed at a plurality of positions). In this case, the plurality of positions may be correlated to each of RS codes (each set of three bits).

In the third embodiment, when generating a 2D barcode, a part of an unreplaced-and-protection-encoded code block (a protection-encoded RS block) is replaced with a reference block (a protection block) at a replacement position determined according to error correction codewords (a RS code).

When reading a 2D barcode, the replacement position where a part of the unreplaced-and-protection-encoded code block (protection-encoded RS block) is replaced with the reference block (the protection block) is determined according to the error correction codewords (the RS code). And, the replacement position is identified based on the error correction codewords (the RS code), acquiring the reference (the protection ID).

Accordingly, it can make it more difficult for a third party to extract the data codewords. Consequently, it is possible to more appropriately protect hidden-object information using a 2D barcode.

Fourth Embodiment

Figure 11A:
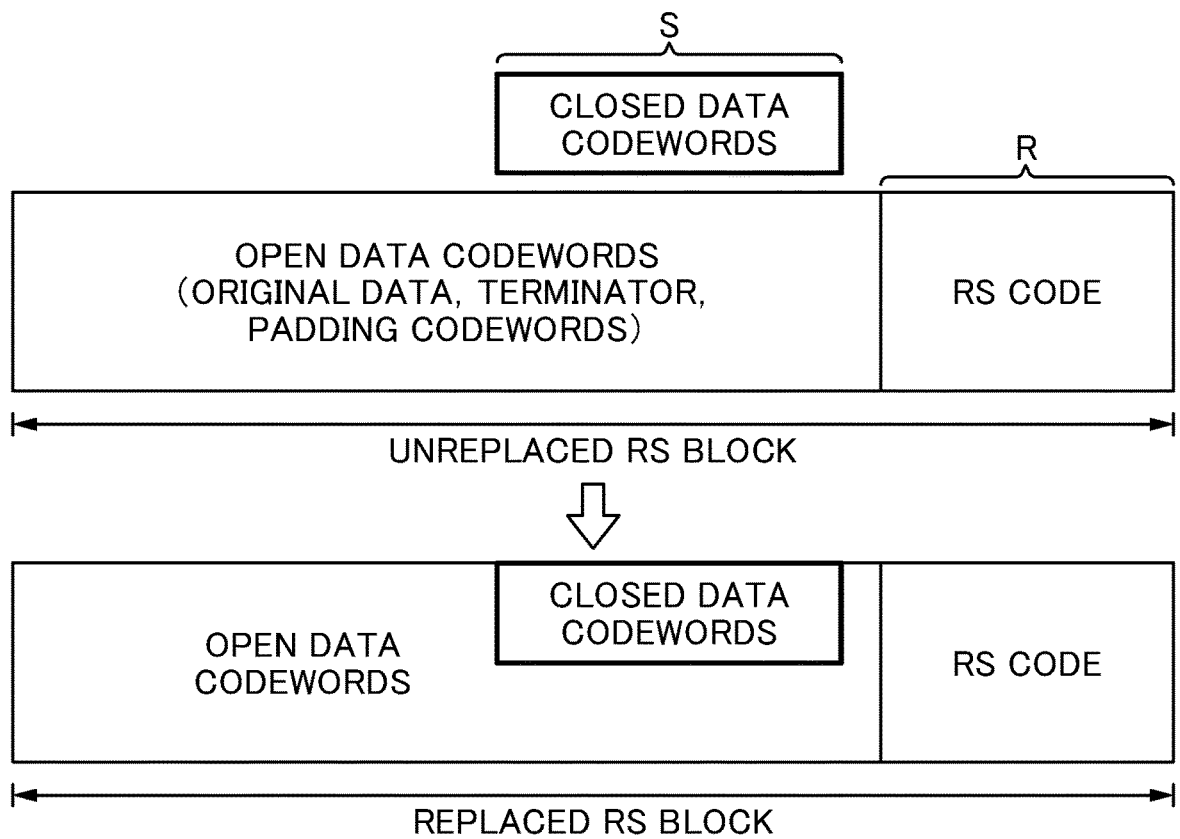
FIG. 11A is a first diagram illustrating a protection-encoding step according to the fourth embodiment.
Figure 11B:
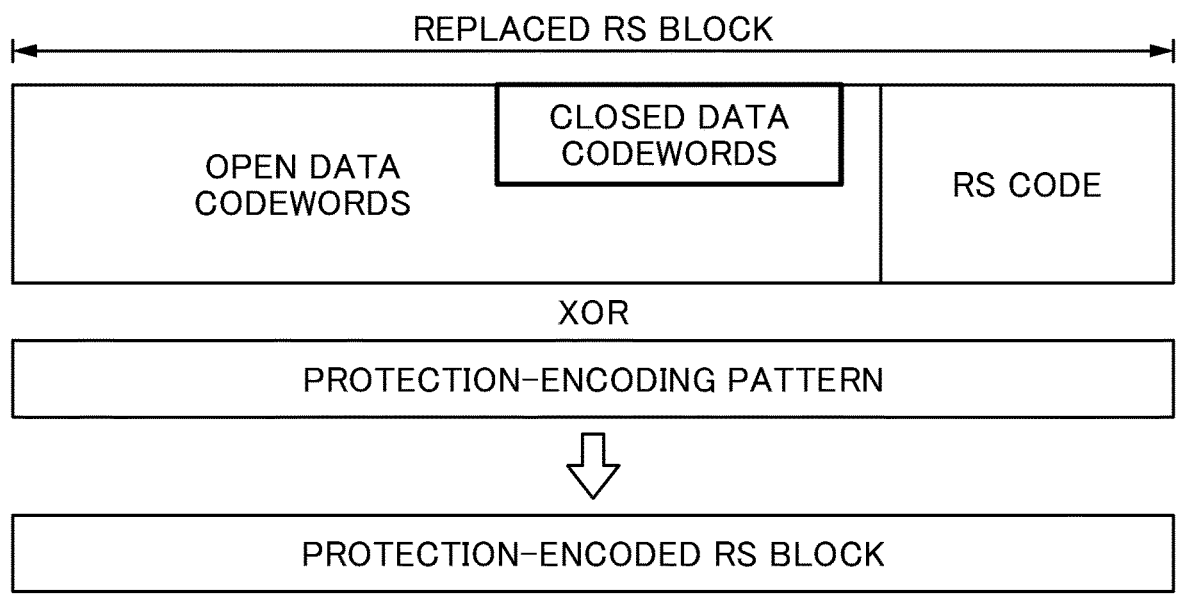
FIG. 11B is a second diagram illustrating the protection-encoding step according to the fourth embodiment.

FIG. 11A is a first diagram illustrating a protection-encoding step according to the fourth embodiment. FIG. 11B is a second diagram illustrating the protection-encoding step according to the fourth embodiment.

In the fourth embodiment, the difference from the first embodiment is that a part of a RS block (an unreplaced RS block) is replaced with private data codewords to generate a replaced RS block (FIG. 11A).

FIG. 11A shows an unreplaced RS block and private data codewords. The unreplaced RS block contains public data codeword s and a RS code, which serves as correction codewords. In the fourth embodiment, a part of an unreplaced RS block is replaced with private data codewords. In this case, the number of words which the RS code can correct is defined as R and the number of words of the private data codewords is defined as S, R is equal to or greater than S. This makes it possible to appropriately recover public data codewords by conducting correction using the RS code even if a part of the public data codewords is replaced with private data codewords.

In the fourth embodiment, a replaced RS block in which a part of the public data codewords is replaced with private data codewords is protection-encoded using the protection-encoding pattern (FIG. 11B). Then, a protection-encoded RS block is generated. The processes for protection-encoding are the same as in the first embodiment, and the description thereof will be omitted.

Figure 12:
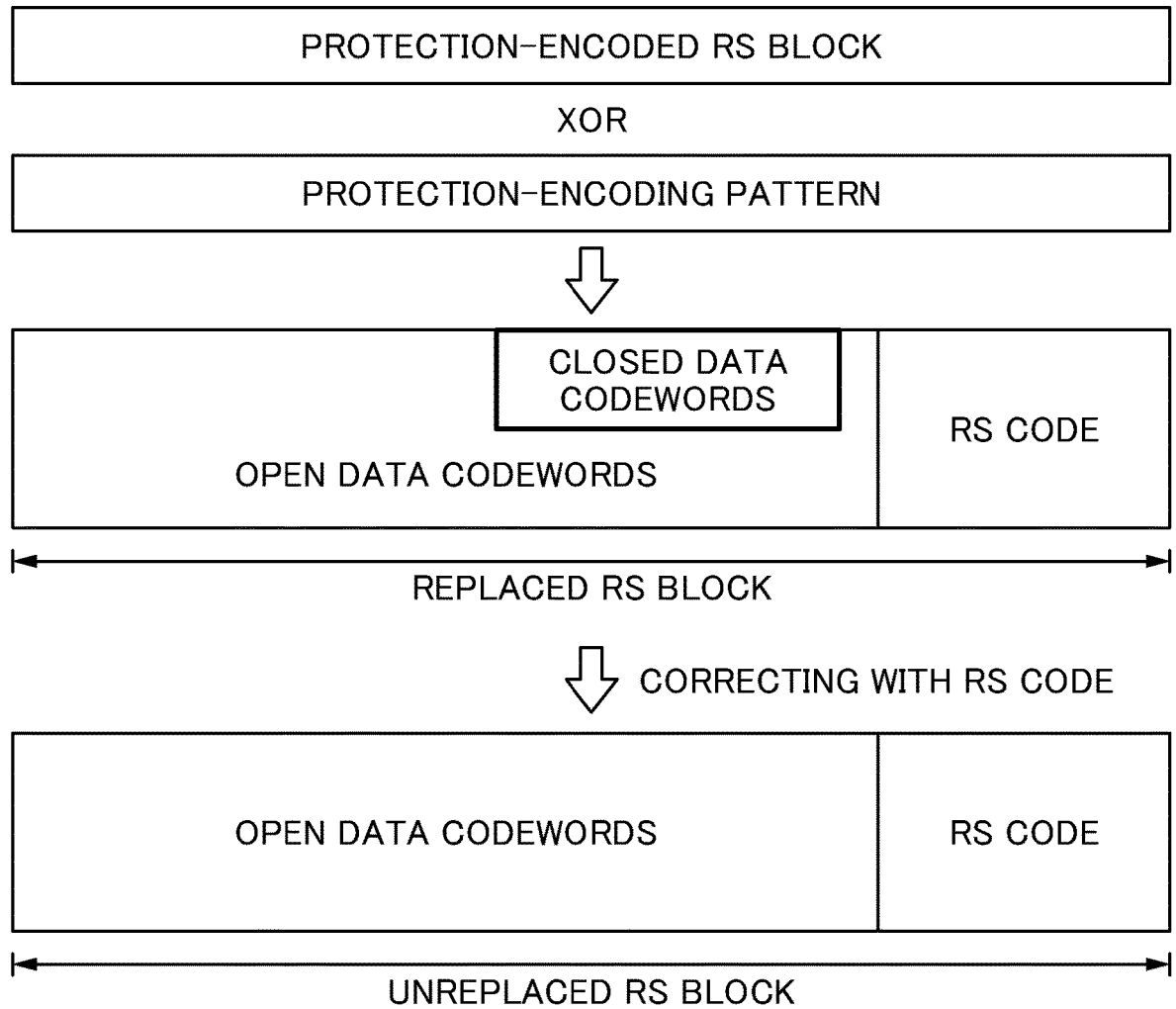
FIG. 12 is a diagram illustrating a protection-decoding step according to the fourth embodiment.

FIG. 12 is a diagram illustrating a protection-decoding step according to the fourth embodiment. FIG. 12 shows how a replaced RS block is obtained by XORing the generated protection-encoded RS block with the protection-encoding pattern as mentioned above.

When the replaced RS block is obtained in the foregoing manner, the private data codewords are emerged. Accordingly, it is possible to appropriately extract the private data codewords from the replaced RS block. Then, the replaced RS block is corrected using the RS code, and the public data codewords having a part which has been replaced with the private data codewords is restored appropriately to its state before replacement. This makes it possible to appropriately extract the public data codewords.

In the fourth embodiment, a part of an unreplaced code block (an unreplaced RS block) that has public data codewords and error correction codewords is replaced with private data codewords, obtaining a replaced code block (a replaced RS block). And, the replaced code block (the replaced RS block) undergoes protection-encoding. Then, the private data codewords are extracted from the replaced code block (the replaced RS block), extracting the public data codewords from the replaced code block (the replaced RS block) using the error correction codewords.

Accordingly, a 2D barcode is able to contain private data codewords in addition to public data codewords. And, it is possible to appropriately protect not only the public data codewords but also private data codewords. Consequently, it is possible to more appropriately protect hidden-object information using a 2D barcode.

===Private Data Codeword===

Here, a concrete method for handling private data codewords described in the fourth embodiment will be described.

<First Manner Using Private Data Codewords>

Figure 13:
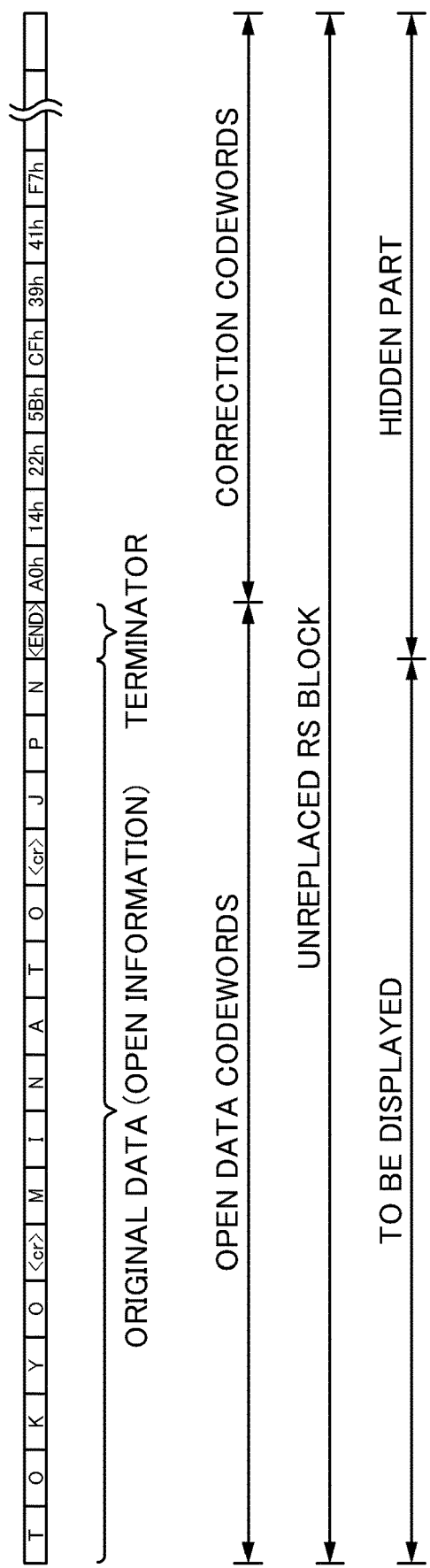
FIG. 13 is a diagram illustrating a RS block.
Figure 14:
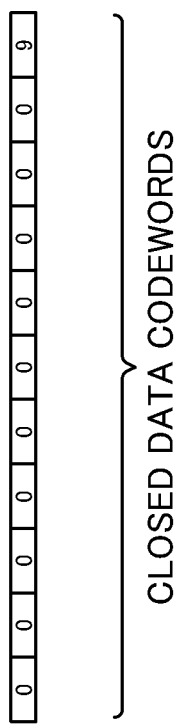
FIG. 14 is a diagram illustrating private data codewords.

FIG. 13 is a diagram illustrating a RS block. FIG. 14 is a diagram illustrating private data codewords. In the following description, unless otherwise stated, procedures in conformance with JIS are employed. Though a common QR code symbol 1 is constituted by a plurality of RS blocks, one RS block will be described in this example for the purpose of explanation. Since the following description is given as examples in order to simplify the explanation, the lengths of the sets of codewords will be, in some cases, different from those of actual QR code symbols. Also, information contained therein will be, in some cases, different from that of actual QR code symbols.

The first manner using private data codewords assumes that the storage section 11b stores: "offset information" indicating the beginning position of replacement with private data codewords (to be described later); and "length (the number of words) information" of the private data codewords.

In this example, the codewords of the original data is "TOKYO<cr>MINATO<cr>JPN" (FIG. 13), private data codewords are "00000000009" (FIG. 14). Retrieving the original data and the private data codewords may be performed via the input device 15, and may also be performed using information pre-stored in the storage section 11b.

If the codewords (the length) of the original data is long, the codewords of the original data is divided into a plurality of blocks. Error correction codewords are generated for each of the blocks, and the generated correction codewords are added next to the corresponding codewords. Then, RS blocks are generated. A procedure for generating correction codewords can be in conformance with JIS.

FIG. 13 shows an example of correction codewords and data codewords, the data codewords constituted by the original data and a terminator (corresponding to the public data codeword). In this example, plain-text information is illustrated as the codewords of the original data. As the terminator, a sequence of bits "0000" may be employed, for example. A RS code which has been generated according to codewords including the original data is added, generating a RS block.

A part of the RS block generated as mentioned above is replaced with private data codewords.

Figure 15:
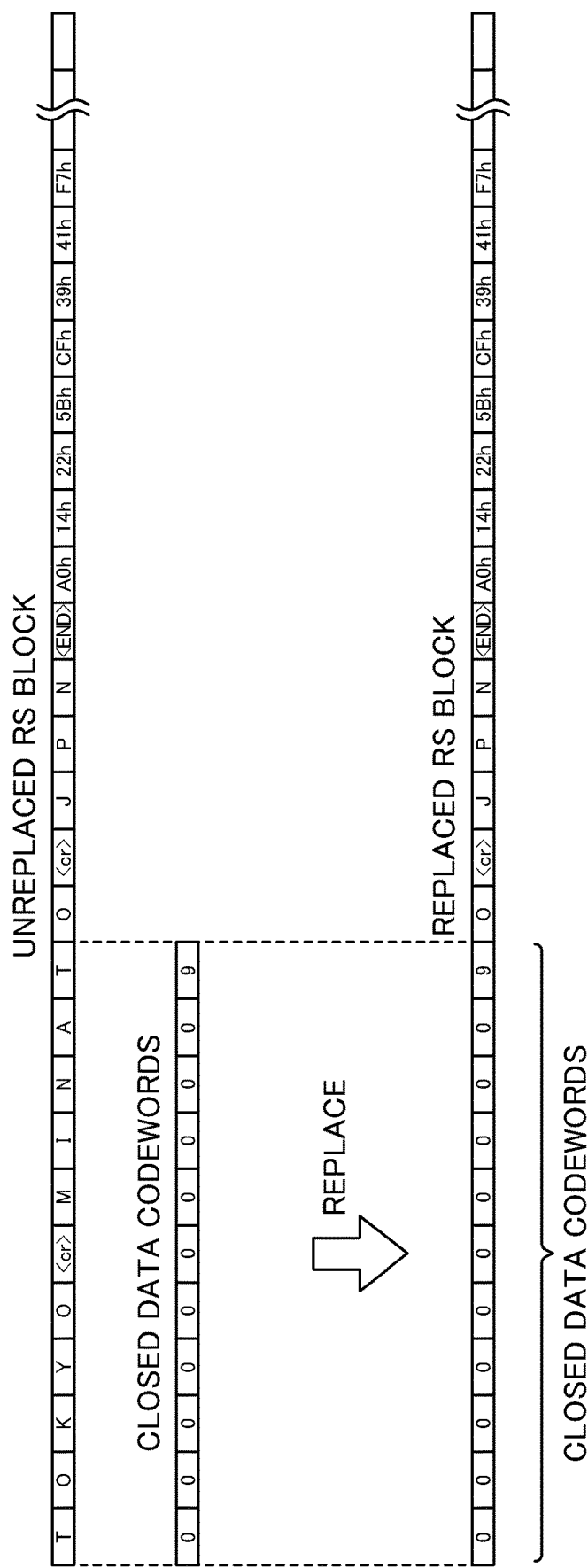
FIG. 15 is a first diagram illustrating how to replace a part of a RS block.

FIG. 15 is a first diagram illustrating how to replace a part of a RS block. FIG. 15 shows the foregoing RS block and the private data codewords. As shown in FIG. 15, the RS block is replaced from its initial word with the private data codewords.

If a part of a RS block is replaced with private data codewords as mentioned above, a part of the original data is lost. But, correction can be made for each of the RS blocks. Accordingly, as mentioned above, after the private data codewords are extracted, the original-data section which has been replaced can be corrected using a RS code. And, the original-data section can be appropriately read-out.

Though, for the purpose of explanation, original data is plain-text data in the foregoing example, the data codewords of the original data themselves may be interleaved or encrypted. An unreplaced RS block may be generated by adding correction codewords to the original data which has been interleaved or to the original data which has been encrypted. Interleaving and encrypting mentioned above may be performed for each bit of the original data, not for each codeword of the original data.

Also, the private data codewords may be interleaved or encrypted. The private data codewords may be encoded for the purpose of error detection or error correction (for example, coded into a RS code).

Next, a procedure for obtaining private data codewords and public data codewords. The present embodiment assumes that the storage section 21b of the decoder 20 stores the "length (the number of words) information" of private data codewords.

Figure 16:
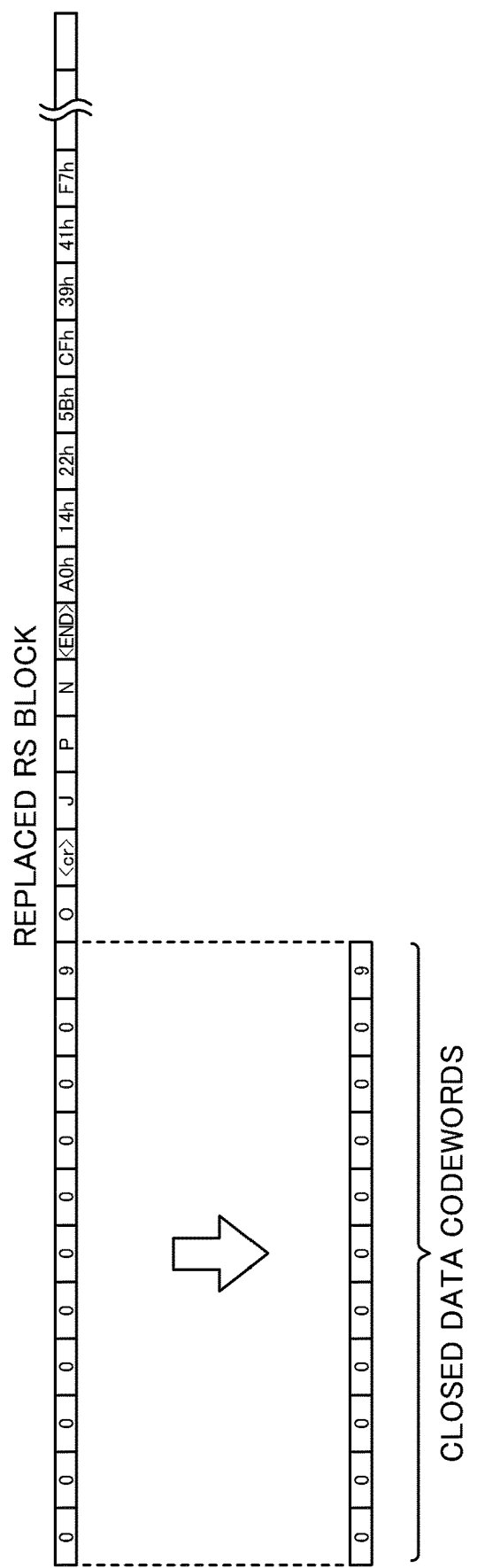
FIG. 16 is a diagram illustrating reading-out method for extracting private data codewords.

FIG. 16 is a diagram illustrating reading-out method for extracting private data codewords. FIG. 16 shows a replaced RS block and private data codewords.

The replaced RS block in FIG. 16 is able to be acquired by reading and expanding the QR code symbol in conformance with JIS. The enhanced decoder 20 extracts the private data codewords based on the length information of the private data codewords, the information being stored in the storage section 21b.

Figure 17:
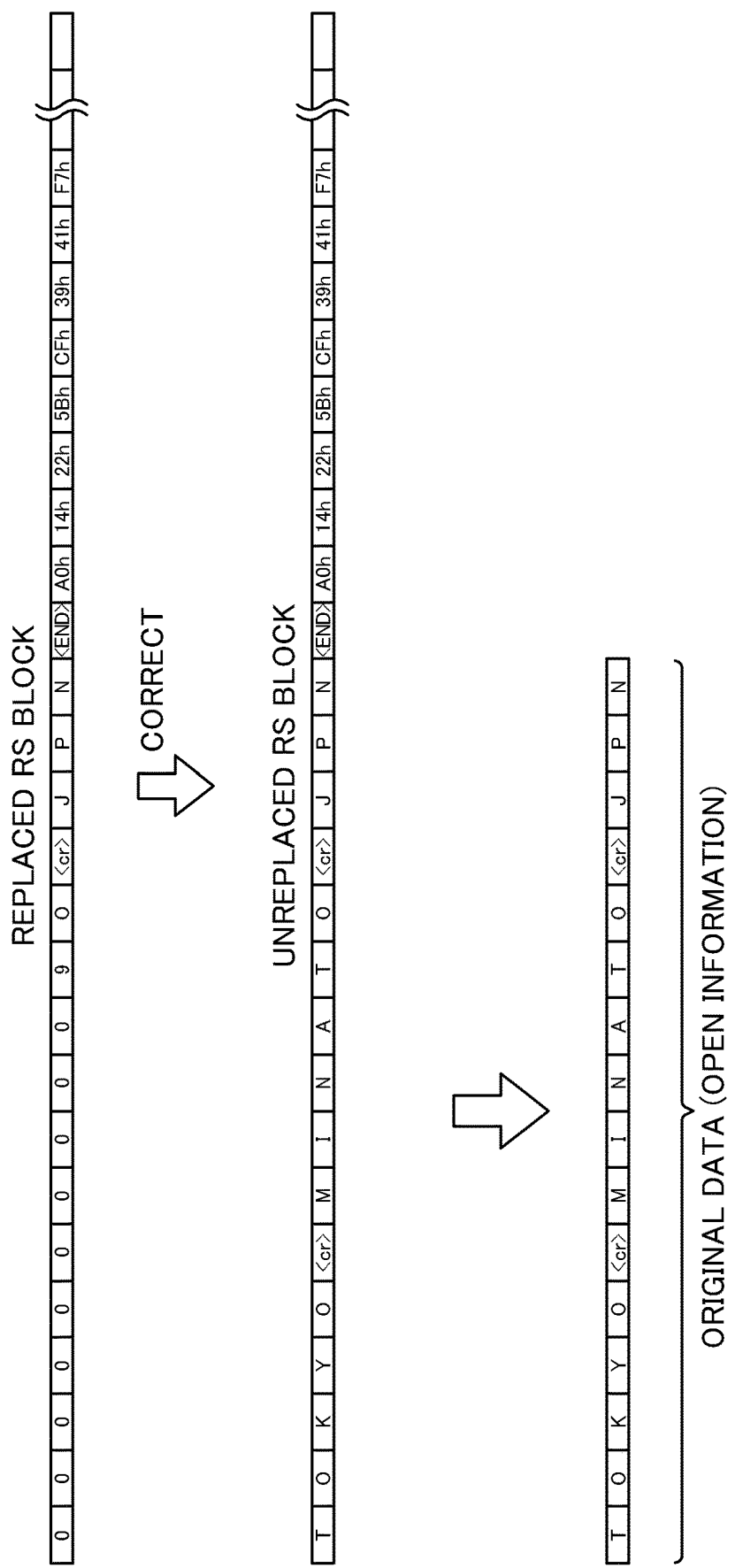
FIG. 17 is a diagram illustrating a method for reading-out original data.

FIG. 17 is a diagram illustrating a method for reading-out original data. The decoder 20 acquires an unreplaced RS block by performing error correction of the replaced RS block. The enhanced decoder 20 reads-out information which is located from the initial end of the unreplaced RS block to a terminator, and the data which has been read-out will be treated as the original data.

If the data codewords of the original data themselves are interleaved as mentioned above, the data codewords are subsequently sorted in a certain procedure so as to be in its original order. If the data codewords of the original data are encrypted, the original data is decoded in a certain decoding method.

Figure 18:
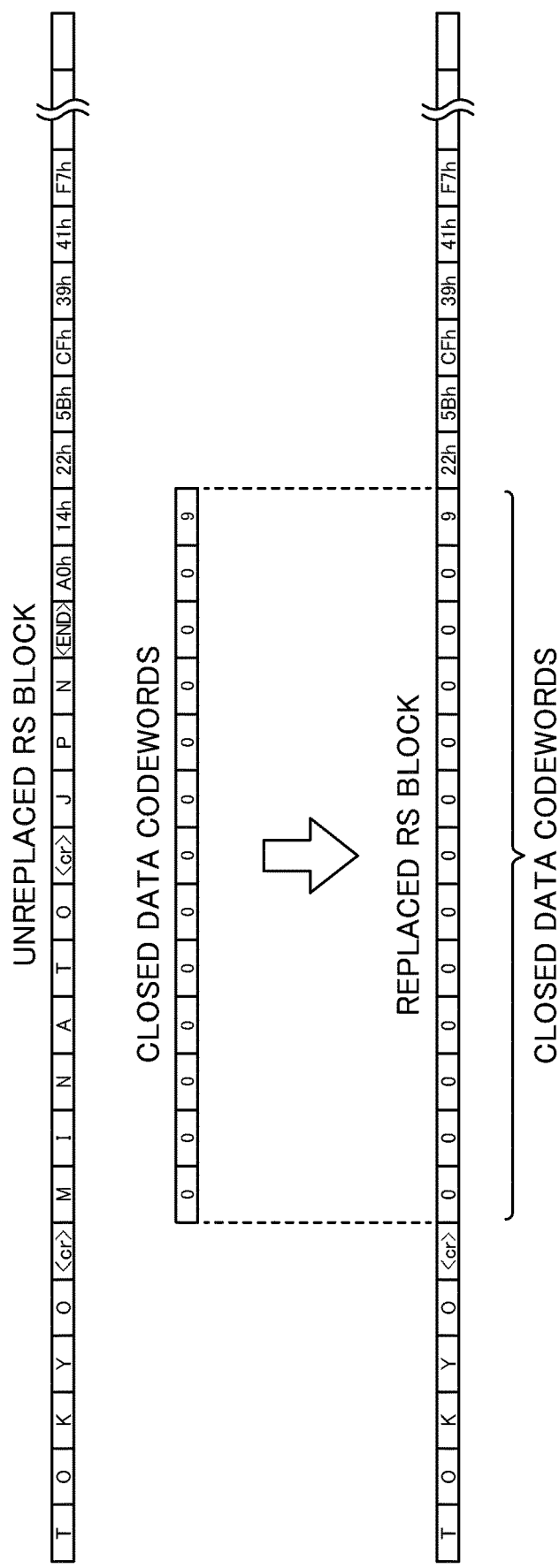
FIG. 18 is a second diagram illustrating how to replace a part of a RS block.

FIG. 18 is a second diagram illustrating how to replace a part of a RS block. Taking into consideration the correcting capacity of Reed-Solomon code, replacement with private data codewords may be performed at any position in the RS block.

In this case, it is possible to predetermine a position of the RS block at which replacement with the private data codewords starts (how many words from the initial word to the position). For example, as shown in FIG. 18, a RS block may be replaced with 13 words of private data codewords starting at the 7th word from the initial word. In this case, the storage section 11b of the enhanced encoder 10 and the storage section 21b of the enhanced decoder 20 store the offset information that the private data codewords start at 7th word (the predetermined position) in the replaced RS block. Also, these storage sections store length information that the length of the private data codewords is 13 words. In this case, since the number of private data codewords is smaller than the number of words which can be corrected with the RS code, correcting makes it possible to appropriately acquire an unreplaced RS block. It is possible to read-out the original data from the unreplaced RS block.

In this case, a certain separator may be added to the final word of the private data codewords with which the RS block has been replaced, defining the final end of the private data codewords.

Figure 19:
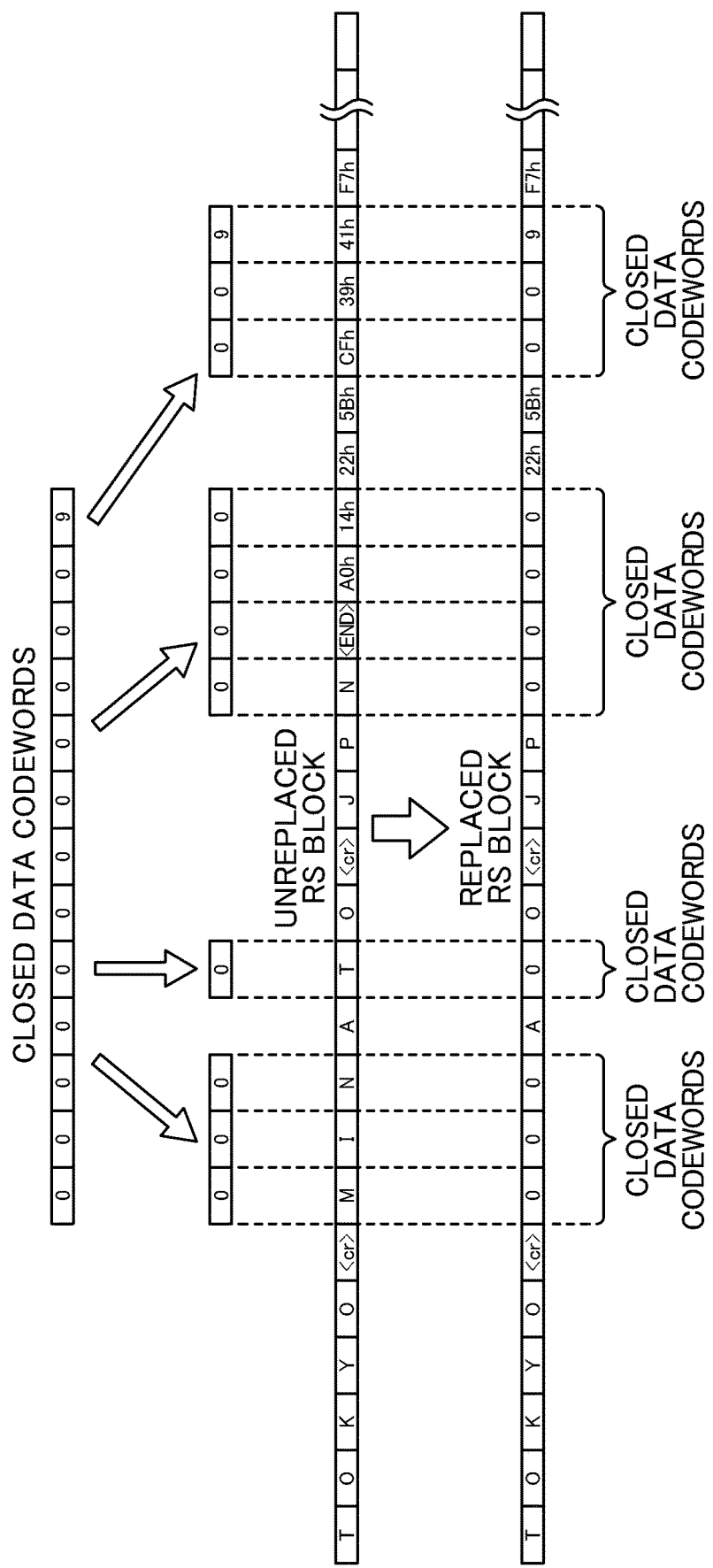
FIG. 19 is a third diagram illustrating how to replace a part of a RS block.

FIG. 19 is a third diagram illustrating how to replace a part of a RS block. In this example, parts of a RS block are replaced with private data codewords which are divided into multiple parts.

In this case, it is possible to predetermine a plurality of positions from which the RS block is to be replaced with the parts of private data codewords. For example, as shown in FIG. 19, the following replacements are acceptable. The RS block is replaced with three words of the private data codewords starting at 7th word from the initial word. And, the RS block is replaced with one word of the private data codewords starting at 11th word from the initial word. And, the RS block is replaced with four words of the private data codewords starting at 16th word from the initial word. And, the RS block is replaced with three words of the private data codewords starting at 22th word from the initial word.

In this case, the storage section 11b of the enhanced encoder 10 and the storage section 21b of the enhanced decoder 20 stores the foregoing information as the offset information and as the length information. Accordingly, the enhanced decoder 20 can extract each part of the private data codewords from the corresponding, pre-identified positions. Also in this case, since the number of private data codewords is smaller than the number of words which can be corrected with the RS code, correction allows the unreplaced RS block to be appropriately acquired. It is possible to read-out the original data from the unreplaced RS block.

<Second Manner Using Private Data Codewords>

In the foregoing the first manner, information of the positions (e.g. The offset information and the length information of private data codewords; hereinafter referred to as placement information) is stored in advance in the storage section 11b of the enhanced encoder 10 and in the storage section 21b of the enhanced decoder 20. In the second manner, the placement information is stored in header data codewords (a "header" in the drawings). In addition, the header data codewords are contained in a replaced RS block in the second embodiment.

Figure 20:
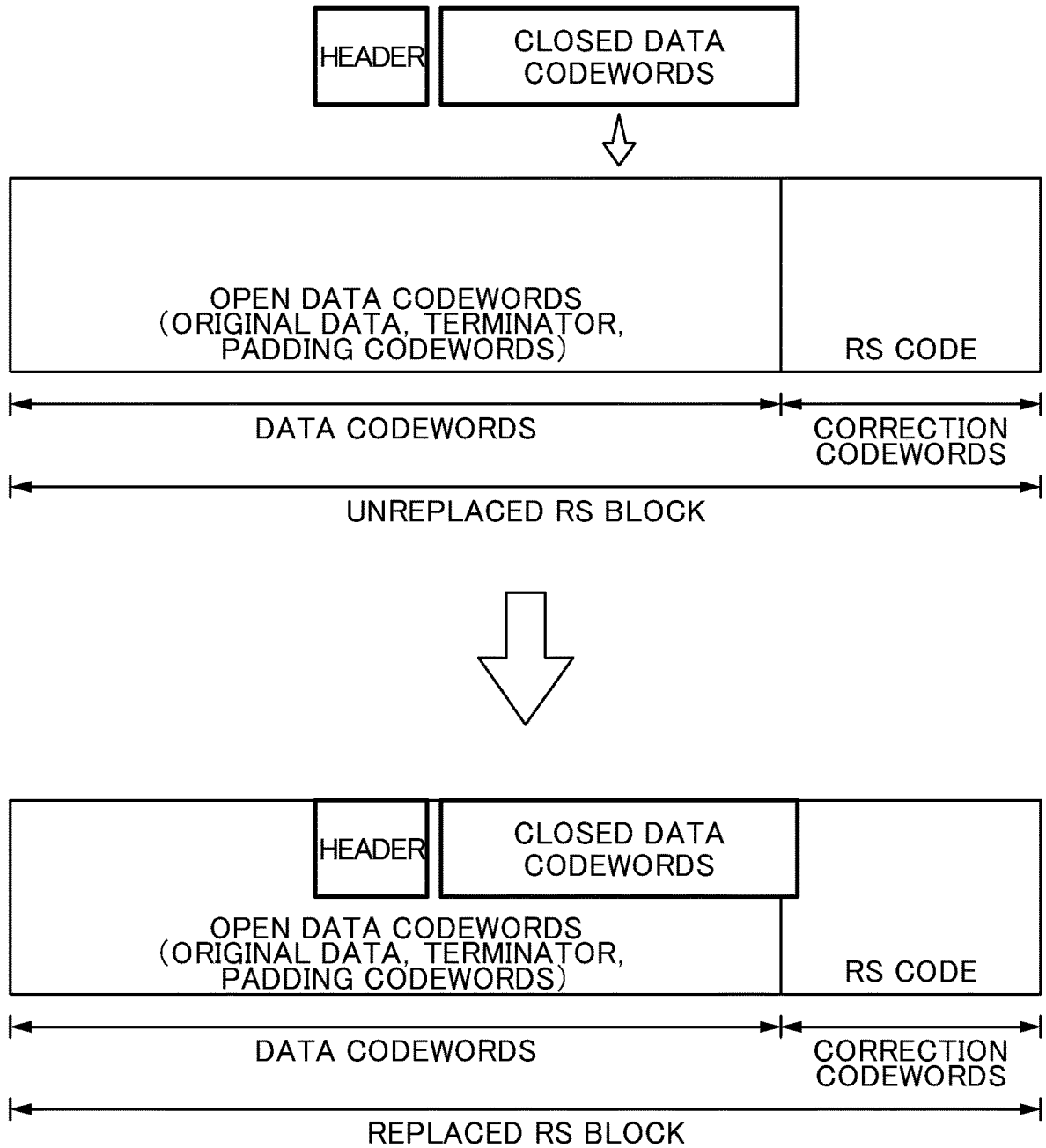
FIG. 20 is a conceptual diagram of a RS block according to the second manner using private data codewords.

FIG. 20 is a conceptual diagram of a RS block according to the second manner using private data codewords. In the second manner, the enhanced encoder 10 replaces a part of an unreplaced RS block with header data codewords and private data codewords, and generates a replaced RS block.

In the second manner, the replacement with the header data codewords and the replacement with the private data codewords, both are performed so that the number of the replaced words does not exceed the number of error-correctable words in the RS block. That is, the total number of the header data codewords and the private data codewords does not exceed the number of error-correctable words in the RS block.

The header data codewords shown in FIG. 20 contain the placement information of the private data codewords, as mentioned above. Accordingly, referring to the header data codewords, it is possible to identify the beginning position of the private data codewords and its length (the number of words). The position of the header data codewords are predetermined. In addition, the header data codewords can contain information related to the format of the private data codewords. Information related to the format of the private data codewords contains the following types of information: information of a cryptographic key which is used if the private data codewords are encrypted; and information of sorting which is performed if the private data codewords are interleaved. If the private data codewords are encoded for the purpose of error detection or error correction, information of a procedure for error detection or error correction is also contained.

Figure 21:
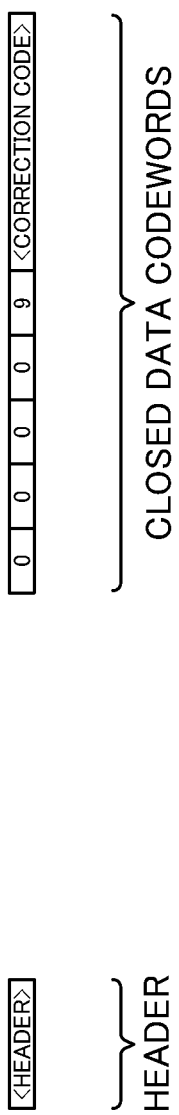
FIG. 21 is a diagram illustrating a header data codeword and private data codewords according to the second manner using private data codewords.

FIG. 21 is a diagram illustrating header data codewords and private data codewords according to the second manner using private data codewords. FIG. 21 shows the header data codewords and the private data codewords, and also shows that the private data codewords contain correction-code words.

Figure 22:
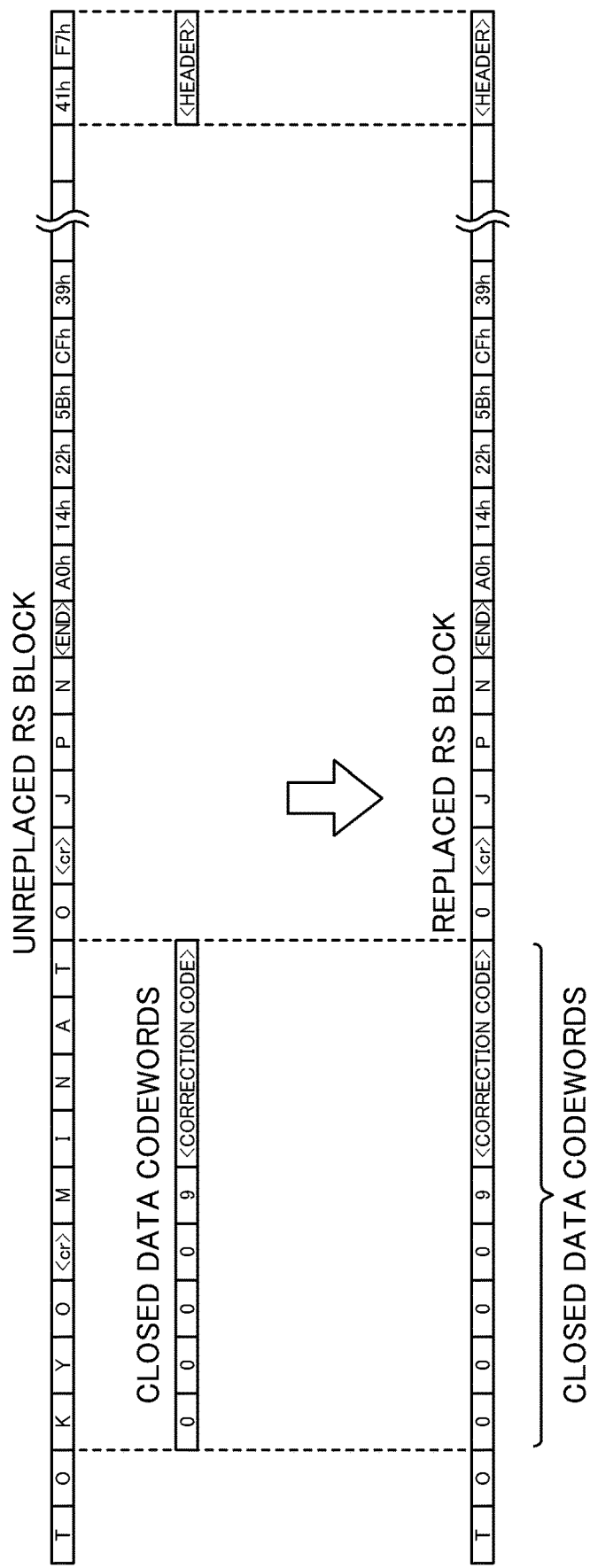
FIG. 22 is a first diagram illustrating how to replace a part of a RS block in a procedure according to the second manner using private data codewords.

FIG. 22 is a first diagram illustrating how to replace a part of a RS block in a procedure according to the second manner using private data codewords. FIG. 22 shows a RS block, private data codewords, and header data codewords. In this example, as shown in FIG. 22, the RS block is replaced from the third word from its initial end with the private data codewords by the enhanced encoder 10. The final end part of the RS block is replaced with the header data codewords. The header data codewords contain the placement information of the private data codewords (in this case, information that the private data codewords start at the third word from the initial end of the RS block, and information that the length of the private data codewords is 9 words).

If a part of the RS block is replaced with the private data codewords as mentioned above, a part of the original data and a part of the correction codewords are lost. However, correction can be made for each of RS blocks. Accordingly, using a RS code, the standard decoder can correct the original-data section which has been replaced. And, the standard decoder can appropriately read-out and display the original-data section. The part which is replaced with the private data codewords is treated as information which is considered as an error and which is discarded, the error being an error caused by contamination of the QR code symbol 1 or the like. Consequently, the standard decoder cannot display the private data codewords.

On the other hand, the enhanced decoder 20 extracts the private data codewords from the replaced RS block. And, the enhanced decoder 20 acquires from the header data codewords, placement information which is for identifying the positions of the private data codewords. Based on the placement information, the private data codewords are extracted. Since the correction-code words are added to the private data codewords, the contaminated private data codewords can be corrected using the correction-code words.

If the private data codewords are interleaved, the private data codewords can be sorted in its original order, based on the information of an interleaving procedure contained in the header data codewords. Also, if the original data is interleaved, the original data can be sorted in its original order, based on the information of an interleaving procedure contained in the header data codewords. If the private data codewords are encrypted, the private data codewords can be decoded based on information such as a cryptographic key contained in the header data codewords. As mentioned above, if the private data codewords are encoded for the purpose of error detection or error correction (for example, coded into a RS code), a procedure for correcting an error can be specified based on information contained in the header data codewords.

After the private data codewords are extracted as mentioned above, the enhanced decoder 20 corrects the replaced RS block and obtains an unreplaced RS block. Then, the original-data section contained in the unreplaced RS block is read-out. And, the private data codewords and the original-data section which have been read-out are displayed.

Figure 23:
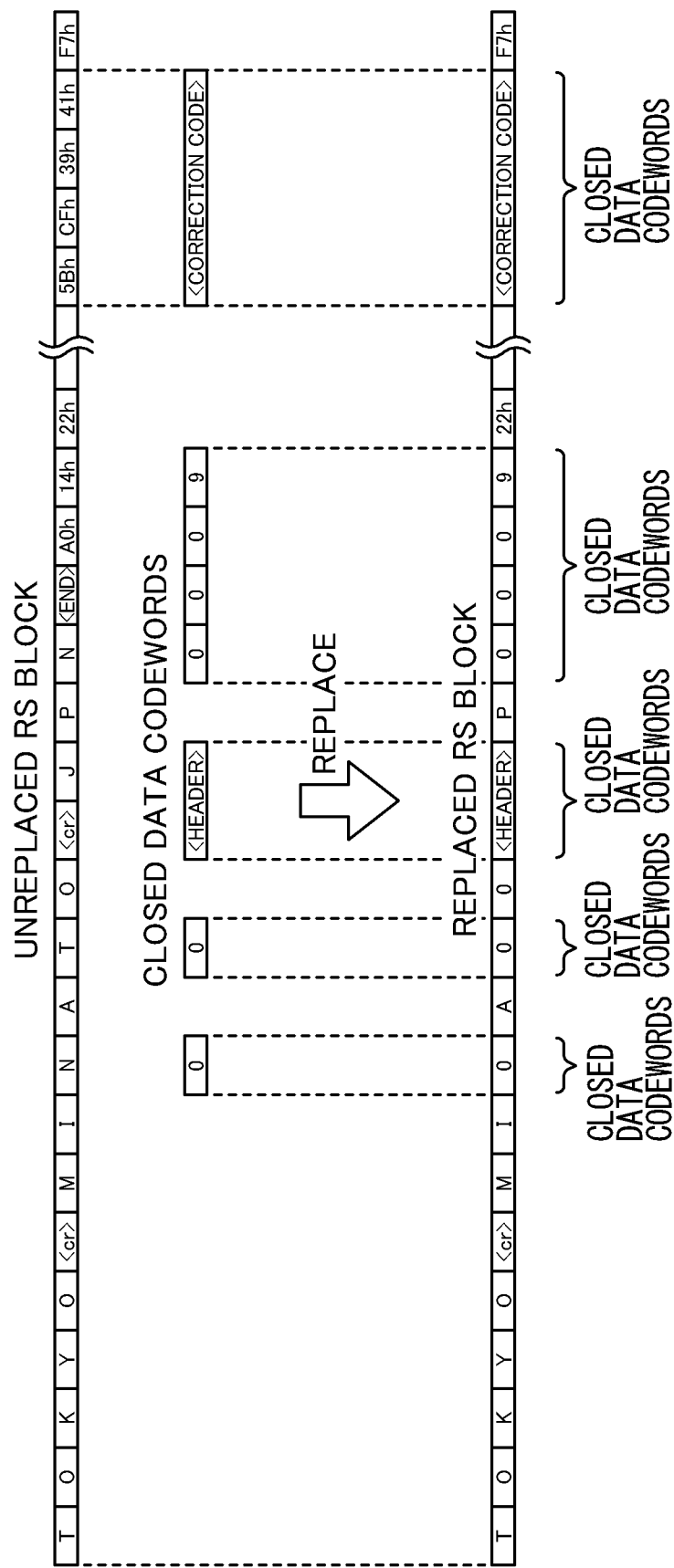
FIG. 23 is a second diagram illustrating how to replace a part of a RS block in a procedure according to the second manner using private data codewords.

FIG. 23 is a second diagram illustrating how to replace a part of a RS block in a procedure according to the second manner using private data codewords. In this example, it is predetermined that the header data codewords start at the 13th word of the RS block and that the length of the header data codewords is two words. If the RS block is replaced with the separated private data codewords as mentioned above, the header data codewords contain a plurality of pieces of placement information of the private data codewords. This makes it possible to appropriately extract the private data codewords with reference to the header data codewords.

In the foregoing description, the position of the header data codewords is predetermined. However, the position of the header data codewords may be indicated by miters which are respectively placed adjacent to the header data codewords on both sides of the header data codewords.

Concerning whether the read QR code symbol is a common QR code symbol or is a QR code symbol according to the second manner, the judgment can be made based on whether or not the extracted private data codewords include header data codewords. That is, since a QR code symbol according to the second manner contains header data codewords, the enhanced decoder 20 can display private data codewords. On the other hand, since a common QR code symbol does not contain a header data codeword, the enhanced decoder 20 can display only information to be displayed, but not display the private data codewords.

<Third Manner Using Private Data Codewords>

Figure 24:
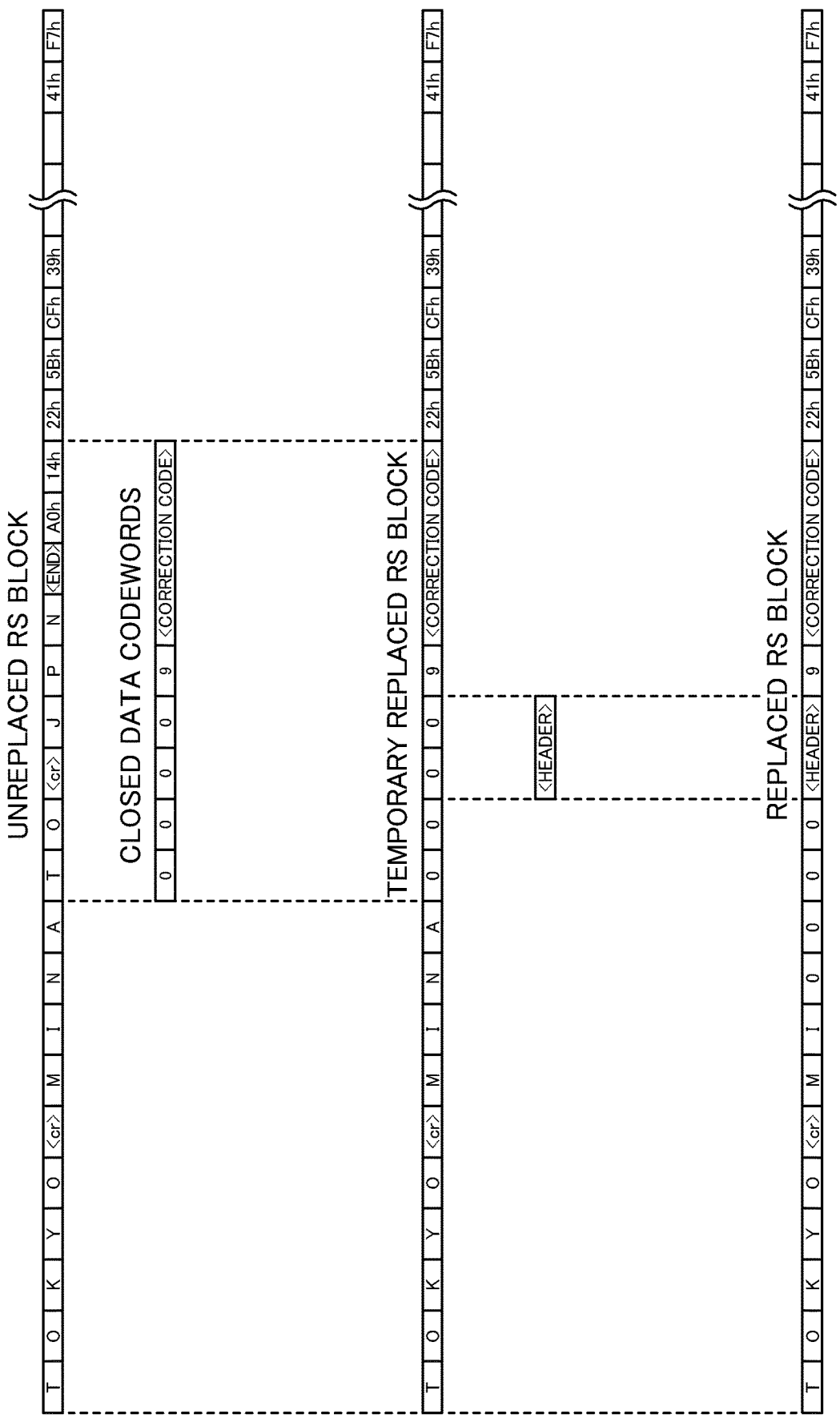
FIG. 24 is a diagram illustrating how to replace a part of a RS block in a procedure according to the third manner using private data codewords.

FIG. 24 is a diagram illustrating how to replace a part of a RS block in a procedure according to the third manner using private data codewords. FIG. 24 shows an unreplaced RS block, private data codewords, a temporary replaced RS block, header data codewords and a replaced RS block.

In the third manner, the enhanced encoder 10 replaces a part of the unreplaced RS block with the private data codewords, and generates the temporary replaced RS block. The private data codewords include the correction-code words, which have a correcting capacity sufficiently to correct words replaced with the header data codewords, as described later.

Next, the enhanced encoder 10 replaces a part of the temporary replaced RS block with the header data codewords, the part of the temporary replaced RS block being a part of the words which have been replaced with the private data codewords. And, the enhanced encoder 10 generates the replaced RS block. Subsequently, the enhanced encoder 10 generates a QR code symbol based on the generated replaced RS block.

Next, a decoding procedure will be described. The enhanced decoder 20 according to the third manner reads a QR code symbol generated as mentioned above, and expands a replaced RS block. Then, the enhanced decoder 20 reads-out the header data codewords. The position of the header data codewords may be predetermined as in the first embodiment and the second embodiment. Also, the position of the header data codewords may be indicated by delimiters which are respectively placed adjacent to the header data codewords on both sides of the header data codewords.

Based on the placement information contained in the header data codewords which have been read-out as mentioned above, the positions of the private data codewords are identified, and then the private data codewords are extracted. Since the private data codewords contain correction-code words as mentioned above, correction based on the correction-code words allows to appropriately correct a part which has been replaced with the header data codewords. Thus, the private data codewords before being replaced with header data codewords are appropriately extracted.

This makes it possible to acquire the temporary replaced RS block. Next, the decoder 20 performs a correcting operation using correction-code words, the correction-code word being included in the unreplaced RS block. Thus, a part replaced with the private data codeword is appropriately corrected, acquiring the unreplaced RS block. Then, the enhanced decoder 20 can read-out the original data from the unreplaced RS block.

In the third manner, the number of private data codewords does not exceed the number of words which can be corrected with correction-code words included in the unreplaced RS block. In the third manner, the number of header data codewords does not exceed the number of words which can be corrected with correction-code words contained in the private data codewords. This makes it possible to read-out appropriately the private data codewords and the original data.

In the third manner, a part of the words which have been replaced with the private data codewords is replaced with the header data codewords. For this reason, the header data codewords overlap the private data codewords, reducing the total length of the header data codewords and the private data codewords. This makes it possible to increase reserve capability for detecting and correcting an error of the QR code symbol.

In the third manner, as in the second manner, concerning whether the read QR code symbol is a common QR code symbol or is a QR code symbol according to the third embodiment, the judgment can be made based on whether or not the extracted private data codewords include header data codewords. That is, since a QR code symbol according to the third manner contains header data codewords, the enhanced decoder 20 can display private data codewords. On the other hand, since a common QR code symbol does not contain header data codewords, the enhanced decoder 20 can display only information to be displayed, but not display private data codewords.

<Fourth Manner Using Private Data Codewords>

Figure 25:
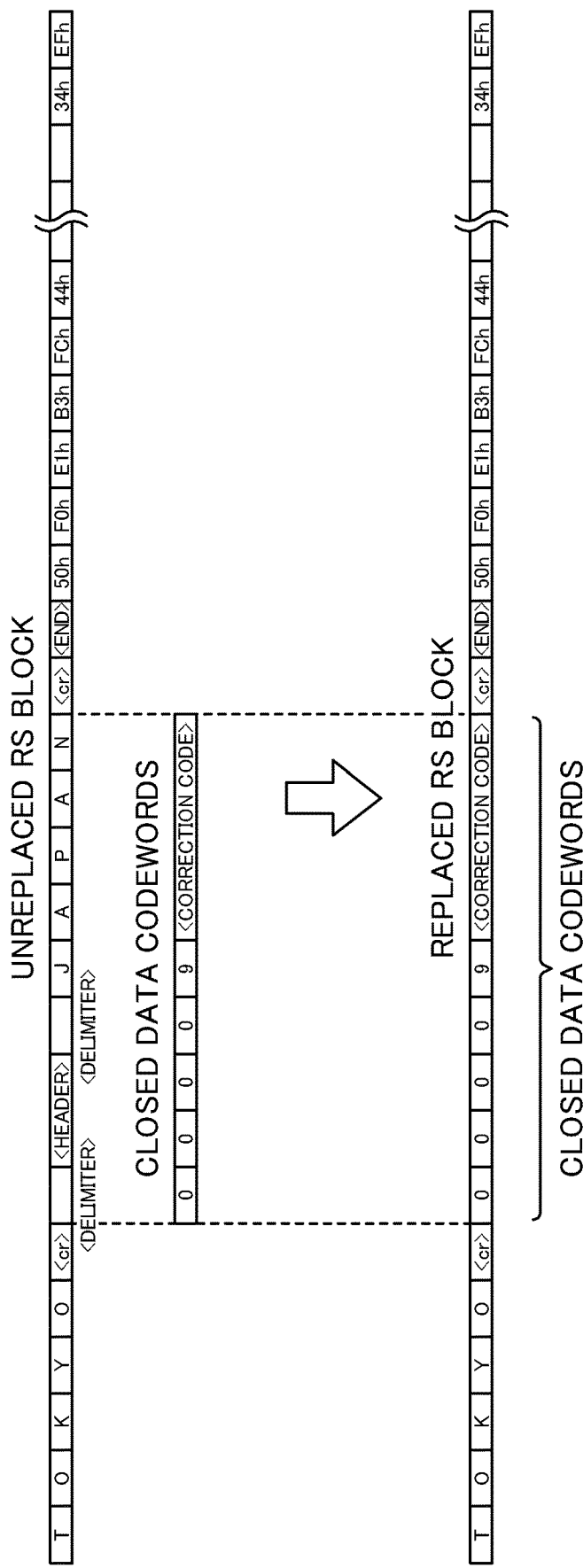
FIG. 25 is a diagram illustrating how to replace a part of a RS block in a procedure according to the fourth manner using private data codewords.

FIG. 25 is a diagram illustrating how to replace a part of a RS block in a procedure according to the fourth manner using private data codewords. FIG. 25 shows an unreplaced RS block, private data codewords and a replaced RS block.

In the fourth manner, the original data of the unreplaced RS block contains header data codewords. Delimiters (each indicated as "<DELIMITER>" in FIG. 25) are placed adjacent to the header data codewords on both sides of the header data codewords. These delimiters separate, in the original data, information to be displayed and the header data codewords.

In order to generate the foregoing unreplaced RS block, in the fourth manner, the enhanced encoder 10 generates original data, which includes information to be displayed, header data codewords, and delimiters. The header data codewords contain the placement information of the private data codewords. The enhanced encoder 10 generates the correction codewords based on the original data (including padding codewords, if any). And, the enhanced encoder 10 generates the unreplaced RS block.

Next, the enhanced encoder 10 replaces a part of the unreplaced RS block with the private data codewords. The replacement position are positions corresponding to the placement information contained in the header data codewords. The enhanced encoder 10 generates the replaced RS block. Subsequently, the enhanced encoder 10 generates a QR code symbol based on the replaced RS block.

Next, a decoding procedure will be described. The enhanced decoder 20 according to the fourth manner reads a QR code symbol generated as mentioned above, and expands a replaced RS block. Then, the enhanced decoder 20 corrects the replaced RS block based on the correction-code words included in the unreplaced RS block, acquiring an unreplaced RS block. The unreplaced RS block includes the header data codewords separated by the delimiters, as mentioned above. Based on the placement information included in the header data codewords, the enhanced decoder 20 identifies the positions of the private data codewords and extracts the private data codewords from the replaced RS block. The extracted private data codewords may be corrected using the correction-code words which are included in the private data codewords.

As mentioned above, the header data codewords containing the placement information of the private data codewords are replaced with the private data codewords, and the replaced RS block is consequently generated. This makes it difficult to identify the positions of the private data codewords in the replaced RS block. This can make it more difficult for a third party to extract the private data codewords.

In the fourth manner, concerning whether the read QR code symbol is a common QR code symbol or not, the judgment can be made based on whether or not the unreplaced RS block which has been read-out includes header data codewords. That is, since the unreplaced RS block according to the fourth manner includes header data codewords, the enhanced decoder 20 can display private data codewords. On the other hand, since a common QR code symbol does not include header data codewords, the enhanced decoder 20 can display only information to be displayed, but not display private data codewords.

<Fifth Manner Using Private Data Codewords>

Figure 26:
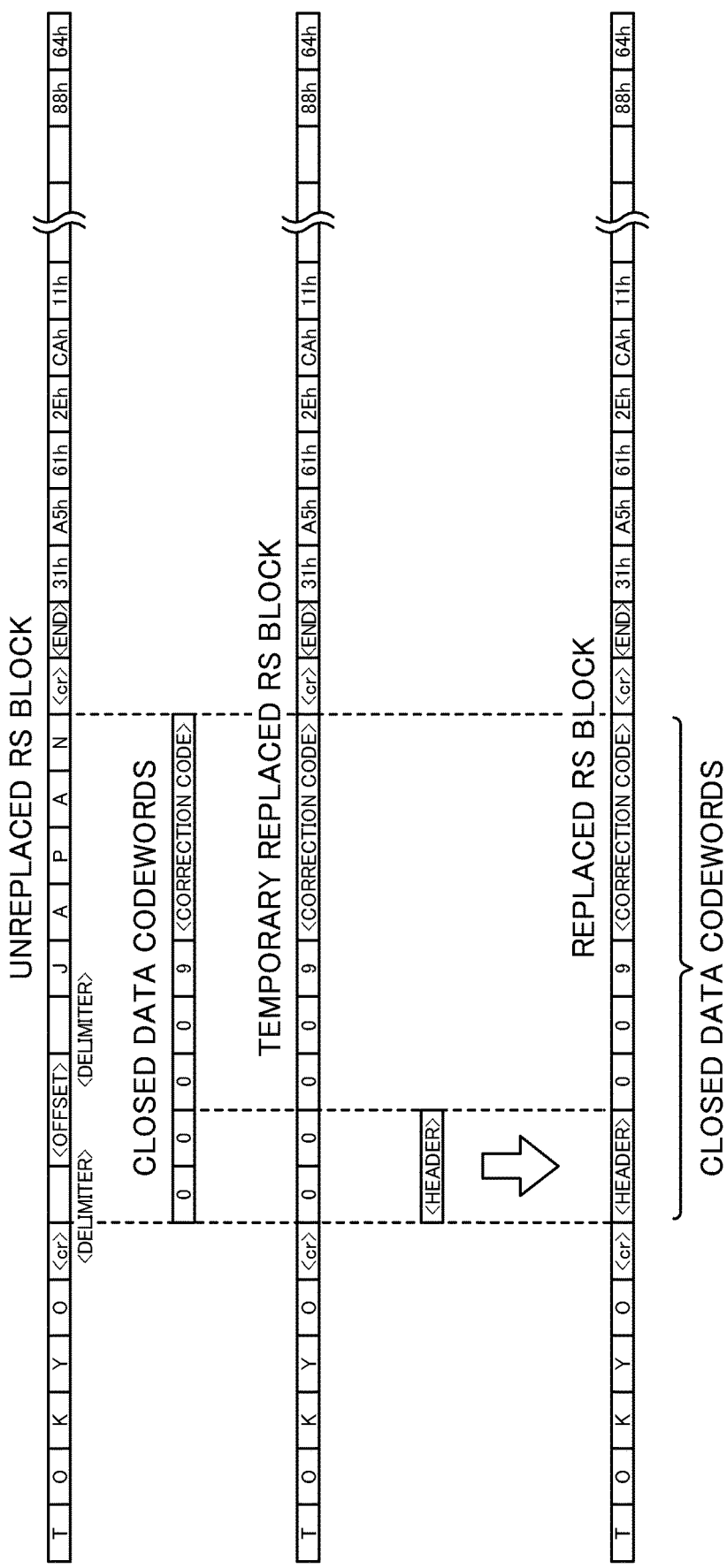
FIG. 26 is a diagram illustrating how to replace a part of a RS block in a procedure according to the fifth manner using private data codewords.

FIG. 26 is a diagram illustrating how to replace a part of a RS block in a procedure according to the fifth manner using private data codewords. FIG. 26 shows an unreplaced RS block, private data codewords, header data codewords and a replaced RS block.

In the fifth manner, the original data of the unreplaced RS block contains header-offset-position-information words, which contain the position information of the header data codewords (indicated as "<OFFSET>" in FIG. 26). Delimiters are respectively placed adjacent to the header-offset-position-information words on both sides of the header-offset-position-information words. These delimiters separate, in the original data, information to be displayed and the header-offset-position-information words.

In order to generate the foregoing unreplaced RS block, in the fifth manner, the enhanced encoder 10 generates original data, which includes information to be displayed, header-offset-position-information words, and delimiters. The enhanced encoder 10 generates the correction codewords based on the original data (including padding codewords, if any). And, the enhanced encoder 10 generates the unreplaced RS block.

Next, the enhanced encoder 10 replaces a part of the unreplaced RS block with private data codewords. The replacement positions are positions corresponding to the placement information of the private data codewords, the placement information being contained in the header data codewords. In this example, the placement information of private data codewords contains information that replacement with the private data codewords starts at the 7th word of the RS block, and that the length of the private data codewords is 9 words. And, the enhanced encoder 10 generates a temporary replaced RS block.

Next, the enhanced encoder 10 replaces a part of the private data codewords in the temporary replaced RS block with the header data codewords. The replacement positions are positions corresponding to the position information of the header data codewords, the position information being contained in the header-offset-position-information words. In this example, the header-offset-position-information words contain information that replacement is performed from the seventh word of the RS block. The length of the header data codewords is set to two words in advance. Based on these pieces of information, the enhanced encoder 10 replaces the RS block with the header data codewords, and the enhanced encoder 10 generates the replaced RS block.

Subsequently, the enhanced encoder 10 generates a QR code symbol based on the replaced RS block.

Next, a decoding procedure will be described. The enhanced decoder 20 according to the fifth manner reads a QR code symbol generated as mentioned above, and expands a replaced RS block. Then, the enhanced decoder 20 corrects the replaced RS block based on correction-code words included in the RS block, acquiring an unreplaced RS block. The unreplaced RS block includes the header-offset-position-information words separated by the delimiters, as mentioned above.

Based on the header-offset-position-information words, the enhanced decoder 20 identifies the position of the header data codewords in the replaced RS block. The enhanced decoder 20 reads-out the header data codewords from the identified positions in the replaced RS block, acquiring the placement information of the private data codewords.

The enhanced decoder 20 extracts the private data codewords from the replaced RS block based on the placement information of the private data codewords. However, a part of the private data codewords is replaced with the header data codewords. Accordingly, the enhanced decoder 20 performs correction based on the correction-code words contained in the private data codewords. Consequently, the private data codewords before being replaced with the header data codewords can be acquired. This makes it possible to acquire appropriately private data codewords.

Further, the enhanced decoder 20 acquires information words which are obtained by removing the header-offset-position-information words and delimiters from the original data of the unreplaced RS block.

Thus, the header-offset-position-information words, which indicate the position of the header data codewords, are contained in the original data. In addition, the header-offset-position-information words are replaced with the private data codewords. These make it more difficult to identify the positions of the private data codewords. Accordingly, it can make it more difficult for a third party to extract the private data codewords.

The header data codewords contain the placement information of the private data codewords. As in the foregoing second manner, based on the placement information, the RS block may be replaced at any position with the private data codewords and may be replaced with the private data codewords which are divided into multiple parts. Also, It is possible to encrypt or interleave the private data codewords, based on information of the header data codewords.

Though, in this example, the position of the header data codewords is identified based on "offset", the position of the header data codewords may be identified in another procedure.

In the fifth manner, as in the second manner, concerning whether the read QR code symbol is a common QR code symbol or not, the judgment can be made based on whether or not the extracted private data codewords include header data codewords. That is, since a QR code symbol according to the fifth manner contains header data codewords, the enhanced decoder 20 can display private data codewords. On the other hand, since a common QR code symbol does not contain header data codewords, the enhanced decoder 20 can display only information to be displayed, but not display the private data codewords.

<Sixth Manner Using Private Data Codewords>

Figure 27:
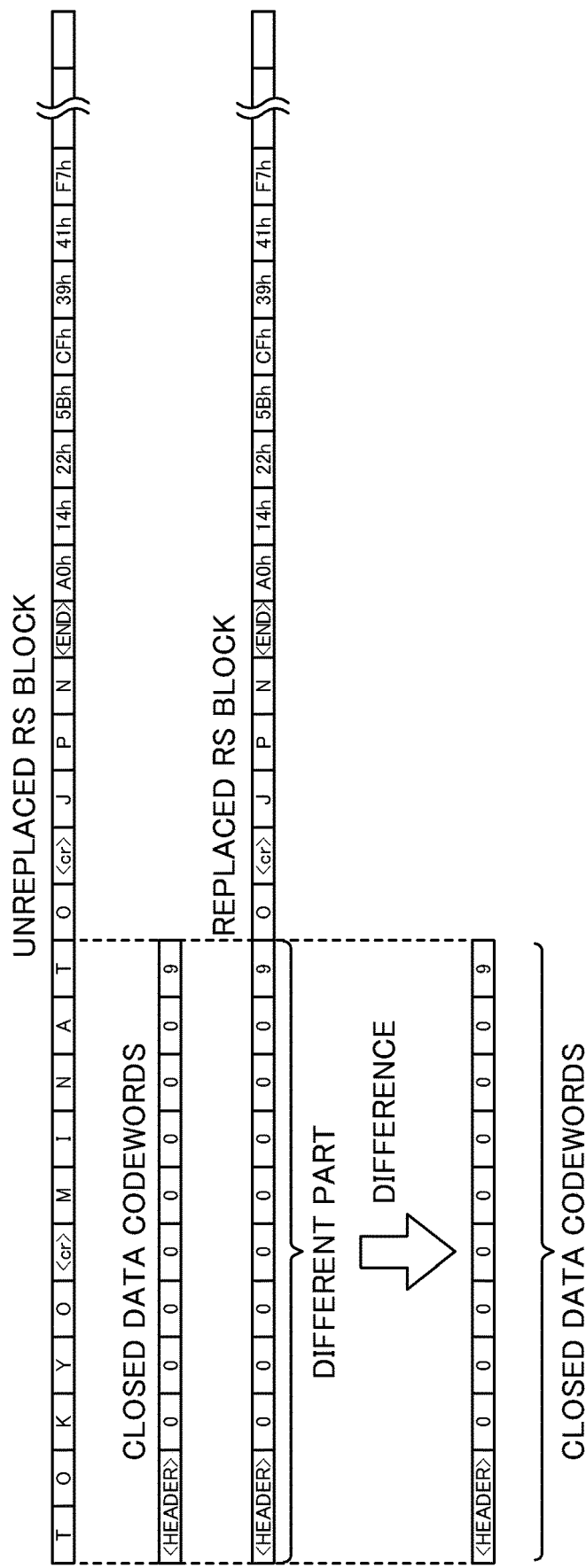
FIG. 27 is a first diagram illustrating how to replace a part of a RS block in a procedure according to the sixth manner using private data codewords.

FIG. 27 is a first diagram illustrating how to replace a part of a RS block in a procedure according to the sixth manner using private data codewords. FIG. 27 shows an unreplaced RS block, private data codewords and a replaced RS block.

In the sixth manner, the enhanced encoder 10 generates the correction codewords based on original data (including padding codewords, if any). And, the enhanced encoder 10 generates the unreplaced RS block. Next, the enhanced encoder 10 replaces a part of the unreplaced RS block with the private data codewords. Then, the enhanced encoder 10 generates the replaced RS block, and generates a QR code symbol based on the replaced RS block. Thus, in the sixth manner, a method for generating a QR code symbol has almost the same procedure as in the first manner.

Next, a decoding procedure will be described. The enhanced decoder 20 according to the sixth manner reads the QR code symbol generated as mentioned above, and expands the replaced RS block. The enhanced decoder 20 corrects the replaced RS block based on the correction-code words included in the RS block, acquiring the unreplaced RS block.

The enhanced decoder 20 compares the unreplaced RS block with the replaced RS block. Then, the enhanced decoder 20 reads-out a part of the replaced RS block, the part being different from the unreplaced RS block. The information words which have been read-out as mentioned above serve as the private data codewords. The original data is read-out from the unreplaced RS block. Since a terminator is placed in the unreplaced RS block between the original data and the correction-code words, the decoder 20 can separate, according to the terminator, the original data and the correction-code words.

This makes it possible to read-out the private data codewords and the original data. With the sixth manner, it is sufficient that a comparison is merely made between the unreplaced RS block and the replaced RS block, reading-out a part having a difference. Advantageously, this makes it unnecessary to provide the placement information of the private data codewords. That is, if the header data codewords are used, the number of the header data codewords can decrease.

Figure 28:
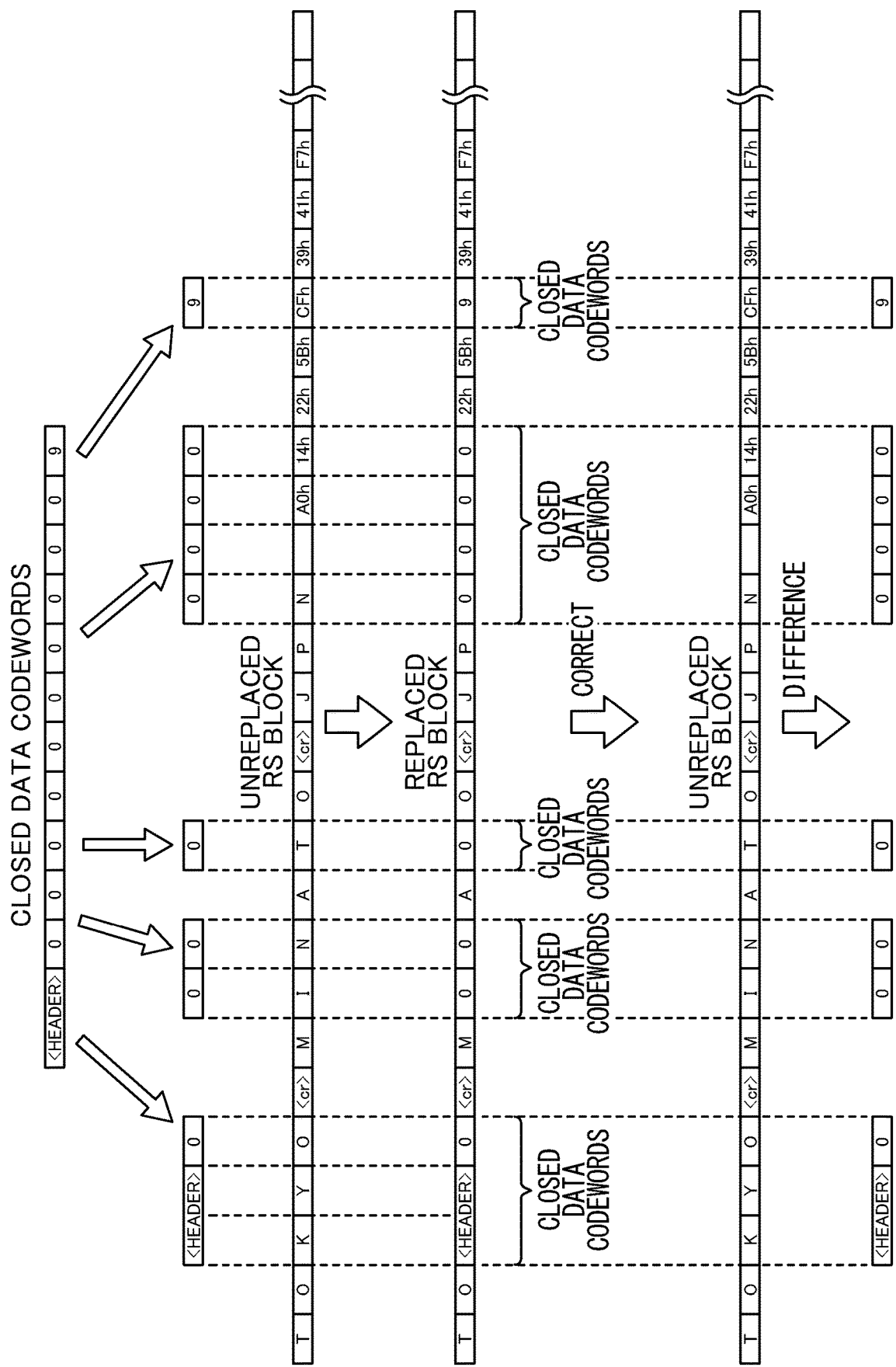
FIG. 28 is a second diagram illustrating how to replace a part of a RS block in a procedure according to the sixth manner using private data codewords.

FIG. 28 is a second diagram illustrating how to replace a part of a RS block in a procedure according to the sixth manner using private data codewords. In this example, parts of the RS block are replaced with the private data codewords which are divided into multiple parts.

For example, as shown in FIG. 28, the private data codewords can be divided into five parts and parts of the RS block can be replaced with them. In this case, since the number of the private data codewords is smaller than the number of words which can be corrected with the RS code, it is possible to appropriately acquire the unreplaced RS block by performing correction. In this case, it is possible to acquire the private data codewords by obtaining the difference between the unreplaced RS block and the replaced RS block. And, the original data can be acquired by reading-out the data words from the identified-in-advance position in the unreplaced RS block.

The foregoing procedure in which the private data codewords are extracted based on the difference is effective, in particular, in the cases in which a QR code symbol and its RS blocks are less likely to be contaminated. For example, assuming the case in which an image data file of a QR code symbol is generated and then the file is retrieved to read-out the private data codewords. In this case, the QR code symbol will not be contaminated because there is no chance that the QR code symbol is exposed outside.

The foregoing procedure has an advantage that private data codewords can be identified without using a header data codeword or the like. This makes it possible to replace a RS block with more private data codewords.

As in the first manner, the codewords which have been read as private data codewords are judged whether or not they are private data codewords as follow. If the ratio of the difference between a RS block before correction and a RS block after correction exceeds a predetermined value, it is able to be judged that the codewords which have been read are private data codewords (that is, it is able to be judged that the QR code symbol is a QR code symbol according to the sixth manner). If the ratio of the difference does not exceed the predetermined value, it is able to be judged that the codewords are not private data codewords (that is, it is able to be judged that the QR code symbol is a common QR code symbol), and accordingly it is possible not to display private data codewords. This is because the ratio of difference between an unreplaced RS block and a replaced RS block always exceeds a predetermined value if replacement with private data codewords is performed.

In decoding based on the difference in the foregoing procedure, a certain part of an unreplaced data block to be replaced with private data codewords could accidentally identical to the corresponding part of the replaced data block. Though this case is extremely rare, this causes a problem that the certain part of the unreplaced data block is not read-out as a difference. In this case, the words contained in header data codewords and in private data codewords have to be replaced without being separated.

Figure 29:
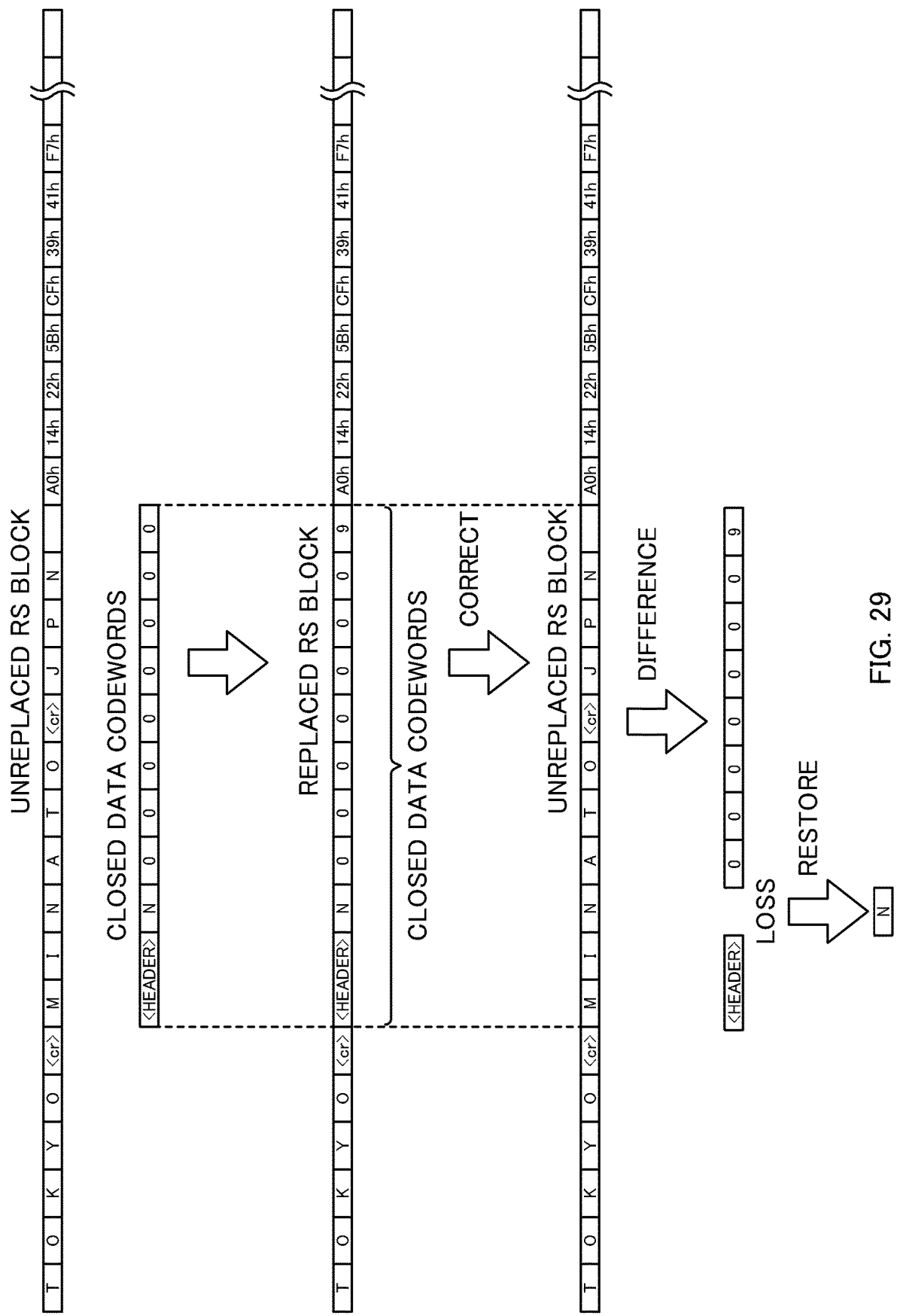
FIG. 29 is a third diagram illustrating how to replace a part of a RS block in a procedure according to the sixth manner using private data codewords.

FIG. 29 is a third diagram illustrating how to replace a part of a RS block in a procedure according to the sixth manner using private data codewords. In this example, applied is the rule that the header data codewords and the private data codewords are placed continuously. Because of this rule, these words are always replaced continuously. Accordingly, even if accidentally-identical words are lost, the information can be restored by filling the lost part with the accidentally-identical words.

It is sufficient that, if codewords located at positions except the ends of a RS block are lost, the lost parts are filled with the data codewords located at the corresponding positions. However, if codewords located at an end of a RS block are lost, it is difficult to identify whether the loss has occurred at the initial end or at the final end. In this case, several restorations and their verifications are performed for the end, as to be mentioned below.

Figure 30:
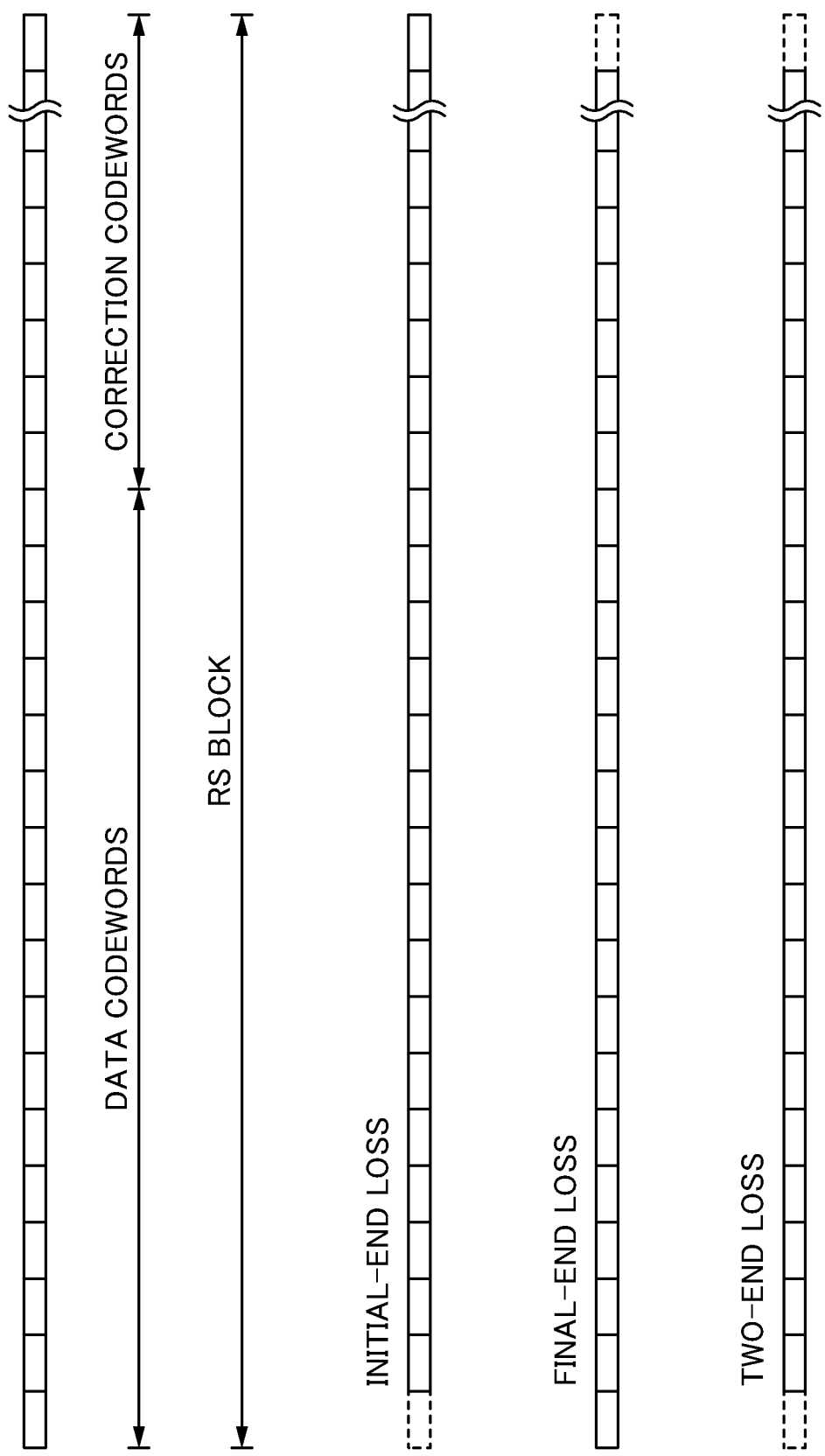
FIG. 30 is a diagram illustrating RS blocks having a data loss.

FIG. 30 is a diagram illustrating RS blocks which are partially lost. FIG. 30 shows the following four types of RS blocks: a RS block without any loss; a RS block having a loss at the initial end of the data codewords (hereinafter referred to as an initial-end-loss RS block); a RS block having a loss at the final end of correction codewords (hereinafter referred to as a final-end-loss RS block); and a RS block having losses at both ends (hereinafter referred to as a two-end-loss RS block). For the purpose of explanation, there is no codeword in each cell. In the figure, the lost codewords are indicated by dashed lines. Thus, three types of case are provided in which loss occurs at an end or ends of a RS block.

For the initial end and the final end of such a RS block, there are possible combinations of restoration patterns. All restoration combinations are verified: (1) whether correction can be processed for the restored RS block; and (2) if the correction is processed, whether a result of the correction has a correct block syntax.

Figure 31:
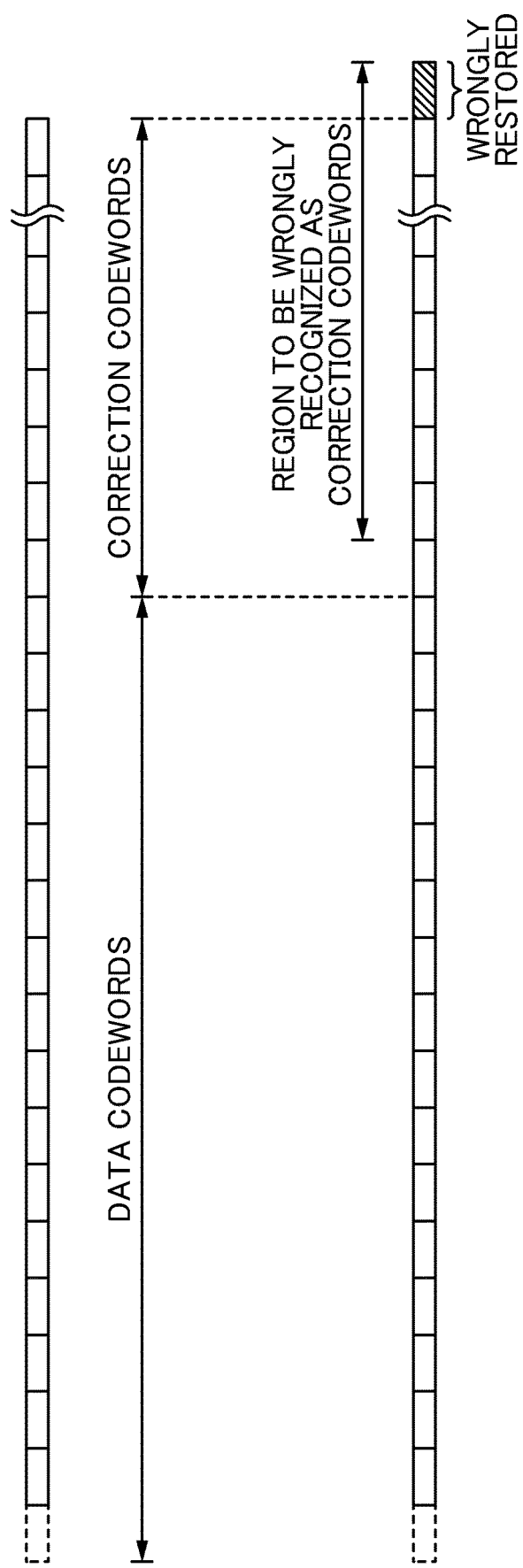
FIG. 31 is a diagram illustrating how to restore an initial-end-loss RS block.

FIG. 31 is a diagram illustrating how to restore an initial-end-loss RS block. FIG. 31 shows the initial-end-loss RS block which is wrongly restored. In the initial-end-loss RS block, the initial end of the RS block should be restored. But, whether the loss occurs at the initial end or at the final end cannot be judged from the appearance of a RS block having a loss. Accordingly, a RS block whose initial end is restored is generated, and also a RS block whose final end is restored is generated. These two RS blocks which have been restored will undergo correction using correction codewords.

Since the RS block whose initial end is restored is a correct RS block, correction is appropriately processed, and a result of the correction has a correct block syntax.

On the other hand, as shown in FIG. 31, in a RS block whose final end is restored, the positions of correction codewords are estimated based on the expected length of words. As a result, the wrong positions are identified as the positions of correction codewords. Correction is performed based on the codewords in a region which is wrongly recognized as correction codewords in the foregoing way. Accordingly, correction is not appropriately processed.

In this example, it is assumed that a loss of one codeword occurs. But, even if a plurality of codewords are lost, the wrong positions are identified as the positions of correction codewords. Accordingly, correction is not appropriately processed.

Figure 32:
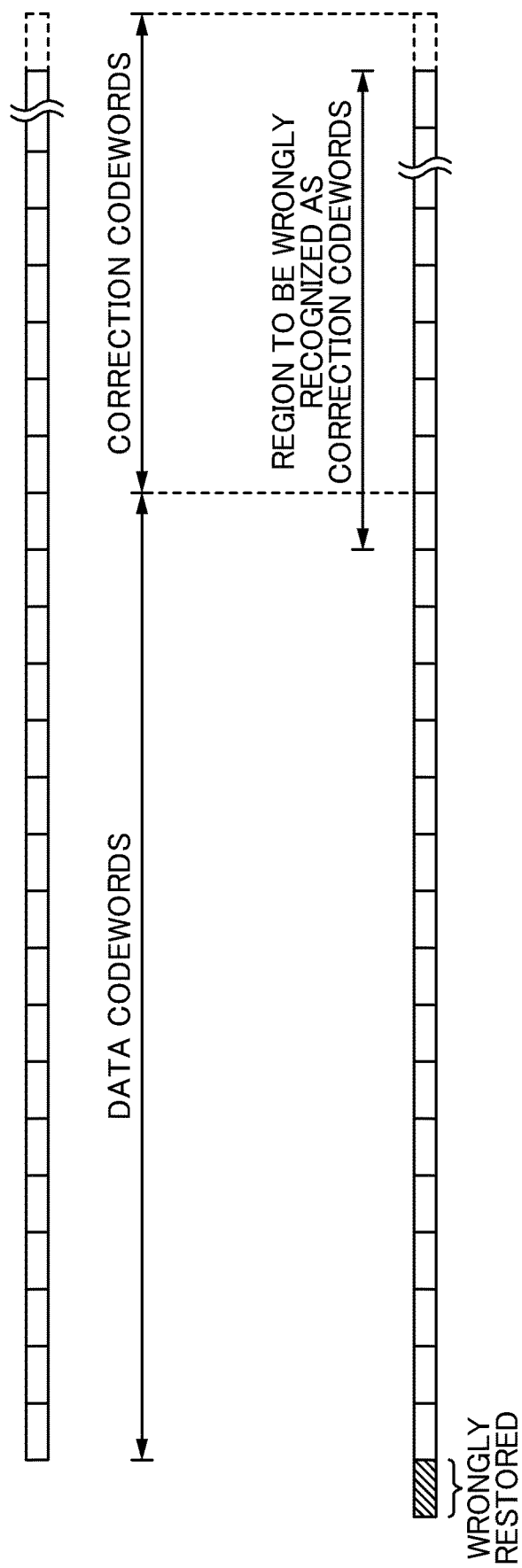
FIG. 32 is a diagram illustrating how to restore a final-end-loss RS block.

FIG. 32 is a diagram illustrating how to restore the final-end-loss RS block. FIG. 32 shows the final-end-loss RS block which is wrongly restored. In the final-end-loss RS block, the final end of the RS block should be restored. But, whether the loss occurs at the initial end or at the final end cannot be judged from the appearance of a RS block having a loss. Also in this case, a RS block whose initial end is restored is generated, and a RS block whose final end is restored is generated. These two RS blocks which have been restored will undergo correction using correction codewords.

Since the RS block whose final end is restored a correct RS block, correction is appropriately processed, and a result of the correction has a correct block syntax.

On the other hand, as shown in FIG. 32, in a RS block whose initial end is restored, the positions of correction codewords are estimated based on the expected length of words. As a result, the wrong positions are identified as the positions of correction codewords. Correction is performed based on the codewords in a region which is wrongly recognized as correction codewords in the foregoing way. Accordingly, correction is not appropriately processed.

In this example, it is assumed that a loss of one codeword occurs. But, even if a plurality of codewords are lost, the wrong positions are identified as the positions of correction codewords. Accordingly, correction is not appropriately processed.

Figure 33:
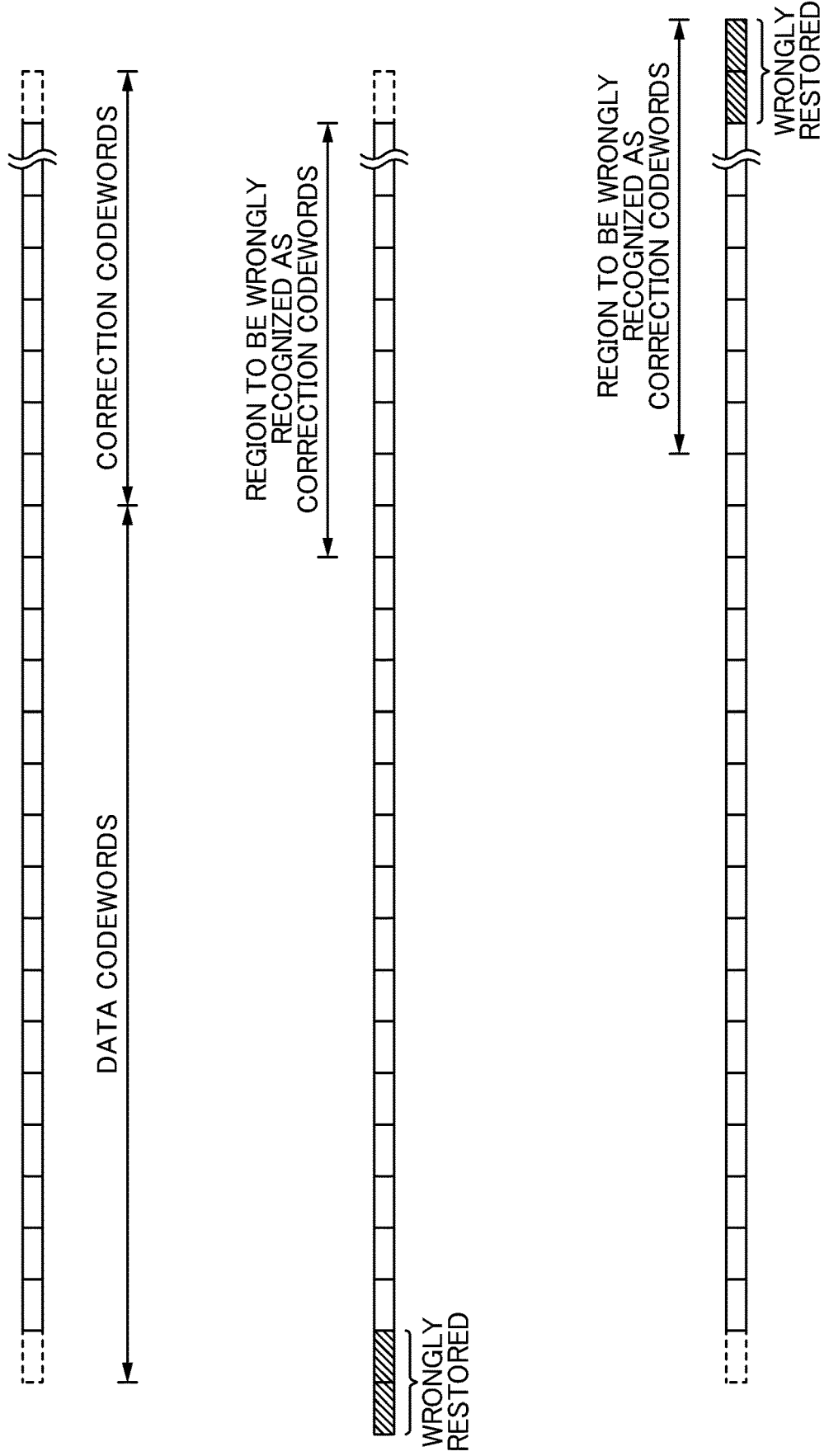
FIG. 33 is a diagram illustrating how to restore a two-end-loss RS block.

FIG. 33 is a diagram illustrating how to restore the two-end-loss RS block. FIG. 33 shows two-end-loss RS blocks which are wrongly restored. In this example, it is assumed that a loss of one codeword occurs at each end. In the two-end-loss RS block of these types, each of one-word losses at the initial end and at the final end should be restored. But, also in this case, it cannot be judged where the loss has occurred, from the appearance of a RS block having losses.

Accordingly, in this case, the following RS blocks are generated: a RS block in which two words at the initial end are restored; a RS block in which two words at the final end are restored; and a RS block in which two words respectively located at the initial and final ends are restored. For each of the restored RS blocks, correction is performed using a correcting block. A method for verification, which is subsequently performed, is the same as in a case in which the initial-end-loss RS block is restored and as in a case in which the final-end-loss RS block is restored. The description thereof will therefore be omitted.

As mentioned above, by restoring in all possible patterns and verifying the restoring, it is possible to acquire a RS block which has been appropriately restored.

In this example, though the foregoing three types of the cases are described, the number of times of verifications changes depending on the number of lost data codewords.

For example, if one data codeword is lost as mentioned above, there are two possible cases: a case in which one codeword at the initial end is lost; and a case in which one codeword at the final end is lost.

If two data codewords are lost, there are three possible cases: a case in which two codewords at the initial end are lost; a case in which one codeword at the initial end lost and one codeword at the final end is lost; and a case in which two codewords at the final end are lost.

If three data codewords are lost, there are four possible cases: a case in which three data codewords at the initial end are lost; a case in which two codewords at the initial end are lost and one codeword at the final end is lost; a case in which one codeword at the initial end is lost and two codewords at the final end are lost; a case in which three data codewords at the final end are lost.

According to this regularity, if N codewords are lost at the ends in total, (N+1) types of verifications are performed. As a result of (N+1) types of verifications, it is possible to employ a RS block which has been appropriately corrected.

Thus, even if a case in which loss occurs at the initial end or at the final end, it is possible to appropriately restore the correct RS block by generating and verifying RS blocks which have been restored corresponding to the case. There is extremely rarely possible that a RS block which has been wrongly restored is corrected without trouble. In this case, however, the corrected block has a problem such that it is not satisfy the predetermined format. Accordingly, based on this, it can be judged that the block is not appropriately restored.

<Seventh Manner Using Private Data Codewords>

In the seventh manner using private data codewords, when an unreplaced RS block is replaced with private data codewords, the replacement position is identified based on the foregoing mask pattern reference MPR.

In the seventh manner using private data codewords, an unreplaced RS block is replaced with private data codewords, and this point is the same as in the first manner using private data codewords. But, in the seventh manner, the replacement position changes according to a mask pattern reference MPR. Since a mask pattern reference MPR is thus used for identifying the replacement position of the private data codewords, it is more difficult for a third party to extract the private data codewords.

A method for generating an enhanced QR code will be described with reference to FIG. 4 in the first embodiment.

In this example, the difference from the first embodiment is that, between step S110 and step S112, replacement with private data codewords is performed at a position determined according to the mask pattern reference MPR. Specifically, the replacement with the private data codewords is performed at a position (a replacement position) which the mask pattern reference MPR identifies. In this example, the replacement with the private data codewords is performed from the position which is of the word corresponding to the mask pattern reference MPR from the initial word of the unreplaced RS block. For example, if the value of the mask pattern reference is "0", the unreplaced RS block is replaced from its initial word with the private data codewords. As mentioned above, the value of the mask pattern reference MPR ranges from 0 to 7. Accordingly, the mask pattern reference MPR can identify 8 types of position as the replacement position of the private data codewords.

Figure 34:
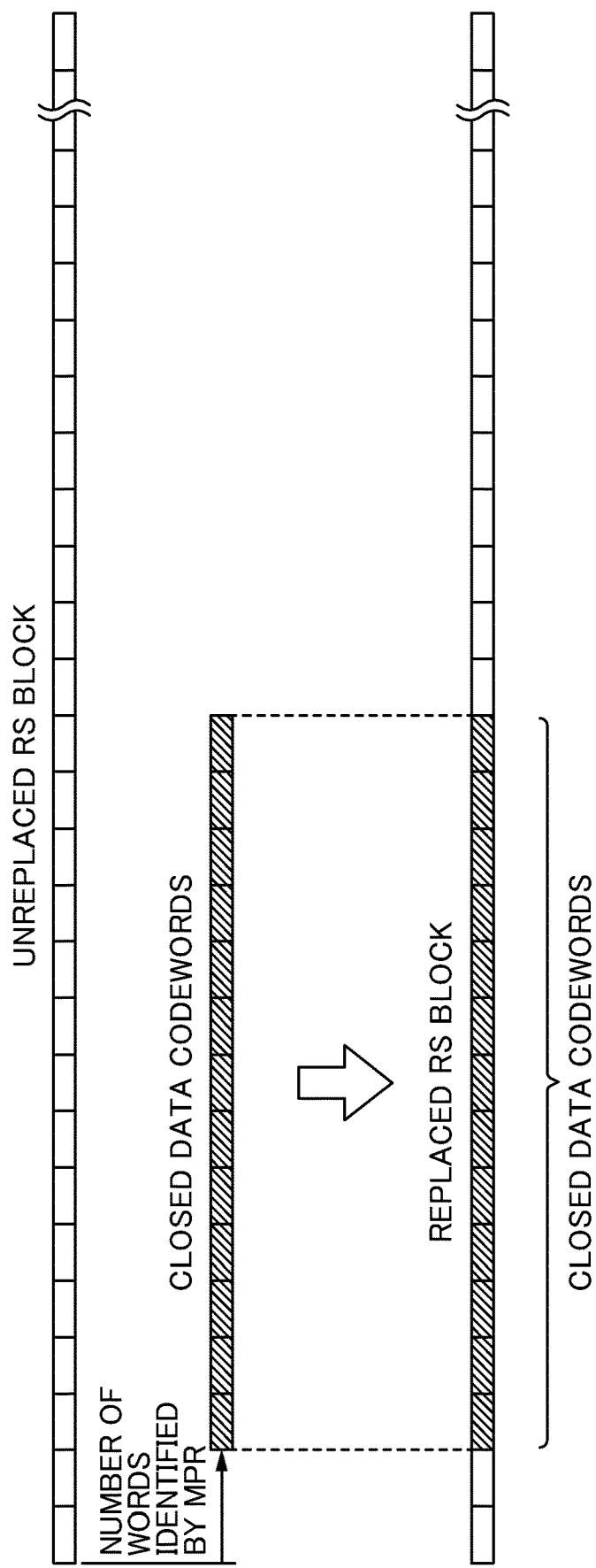
FIG. 34 is a diagram illustrating how to replace a part of a RS block in a procedure according to the seventh manner using private data codewords.

FIG. 34 is a diagram illustrating a procedure for replacing a part of a RS block in the seventh manner using private data codewords. FIG. 34 shows a case in which the value of the mask pattern reference MPR is "2" and in which the unreplaced RS block is replaced with the private data codewords at a position offset by third words from the start of the unreplaced RS block (since the value "0" corresponds to replacement from the first word, the value of the MPR corresponds to replacement from MPR+1)$^{th}$ word).

There is a procedure in which the replacement position with private data codewords is a position of the word corresponding to the value of mask pattern reference MPR, and the procedure is one of the simplest procedure for identifying the replacement position by the mask pattern reference MPR. However, the embodiment is not limited thereto. The replacement position may be identified based on a position which is predetermined according to the value of the mask pattern reference MPR.

The subsequent processes are the same as in the first embodiment, and the description thereof will be omitted.

Accordingly, the mask pattern reference MPR is used to identify the position in the RS block at which the replacement with private data codewords is performed. Since there are 8 types of standard mask pattern, the value of the mask pattern reference MPR can have 8 types of number. Depending on the applied standard mask pattern, it is therefore possible to change the replacement position of the private data codewords. This makes it difficult for a third party to identify the position of the private data codewords, and therefore it can be further difficult to extract the private data codewords.

In the seventh manner, until the evaluation in step S122 is conducted on all of the QR code symbols that have generated using different values of the mask pattern reference MPRs from 0 to 7, it is impossible to determine the optimal QR code symbol among the QR code symbols having private data codewords at different positions. Accordingly, until the evaluation in step S122, it is impossible to determine which QR code symbol is employed among the QR code symbols in which replacement with private data codewords are conducted at different positions. Thus, since the replacement position with private data codewords cannot be determined in advance, it is difficult to identify the position of the private data codewords. This can make it be further difficult to extract the private data codewords.

Next, a method for reading an enhanced QR code will be described with reference to FIG. 7 in the first embodiment.

In this example, the difference from the first embodiment is that, between step S212 and step S214, private data codewords are extracted at a position determined according to the mask pattern reference MPR. In this example, as mentioned above, the private data codewords are extracted from the replaced RS block at a position offset by the number of words of the mask pattern reference MPR.

This makes it possible to appropriately extract the private data codewords based on the mask pattern reference MPR.

As mentioned above, the position of the private data codewords is defined based on the mask pattern reference MPR. Also, the position of the private data codewords may be defined using the version information of a QR code symbol. The version of the QR codes ranges from version 1 to version 40 in JIS. Accordingly, based on the combination of 8 types of the mask pattern reference MPR and 40 types of the version, the position of the private data codewords can be determined in a different manner of 320 types in total.

In addition to the foregoing combination, the information of the error correction level of the QR code symbol may be combined. In JIS, there are four error correction levels: "level L", "level M", "level Q", and "level H". Accordingly, based on the additional combination with these four types, the position of the private data codewords can be determined in a different manner of 1280 types in total.

In this example, private data codewords are replaced continuously from the identified position. But, private data codewords may be replaced separately as in the FIG. 19.

In the foregoing description, in order to identify the replacement position with private data codewords, the mask pattern reference MPR is used. But, it is also acceptable that, by introducing the concept of the foregoing second manner using private data codewords, the position of the header data codewords is identified using the foregoing mask pattern reference MPR. This makes it difficult for a third party to identify the position of the header data codewords. Since the position of the private data codewords is identified using the header data codewords, it is more difficult to extract the private data codewords.

<Eighth Manner Using Private Data Codewords>

In the eighth manner using private data codewords, when an unreplaced RS block is replaced with private data codewords, the replacement position is identified based on correction codewords (a RS code).

In the eighth manner using private data codewords, an unreplaced RS block is replaced with private data codewords, and this point is the same as in the first manner using private data codewords. But, in the eighth manner, the replacement position changes according to correction codewords.

A method for generating an enhanced QR code will be described with reference to FIG. 4 in the first embodiment.

In this example, the difference from the first embodiment is that, between step S110 and step S112, replacement with private data codewords is performed at a position determined according to the correction codewords (the RS code). That is, replacement with the private data codewords is performed at the positions (replacement positions) identified by the correction codewords (the RS code).

Figure 35:
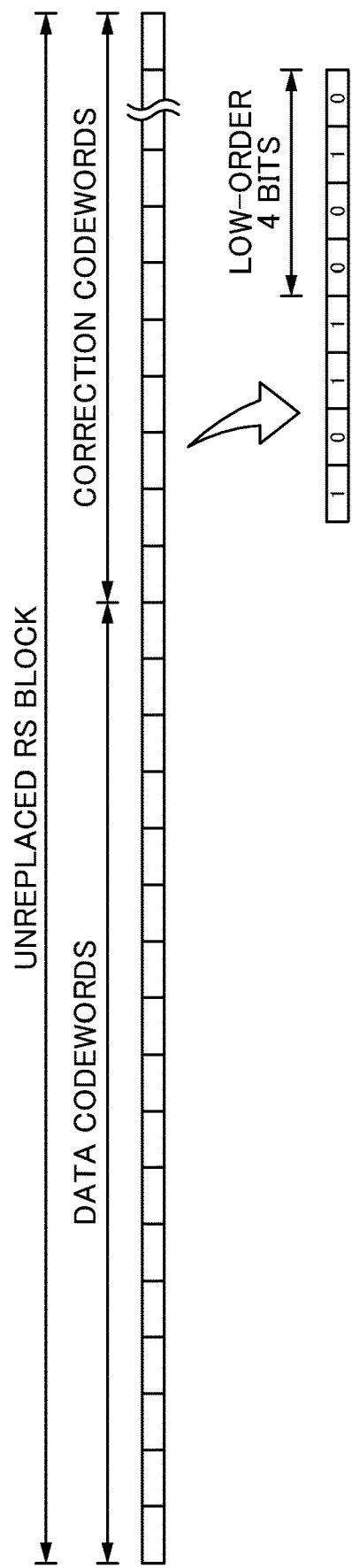
FIG. 35 is a first diagram illustrating how to replace a part of a RS block in a procedure according to the eighth manner using private data codewords.

FIG. 35 is a first diagram illustrating how to replace a part of a RS block in the eighth manner using private data codewords. FIG. 35 shows an unreplaced RS block. In the eighth manner, the replacement positions with the private data codewords are identified based on multiple bits of a specific byte in the correction codewords. Specifically, in this example, the third byte of the correction codewords is extracted, and low-order 4 bits are extracted from the byte. The replacement positions with the private data codewords are indicated by the values of these low-order 4 bits. FIG. 35 shows the digits "0010" as information of the low-order 4 bits. The digits "0010" mean "2" in decimal form. But, in this example, since "0" means a first position, "0010" means the third position from the initial word. Next, replacement with private data codewords is performed based on the replacement positions.

Figure 36:
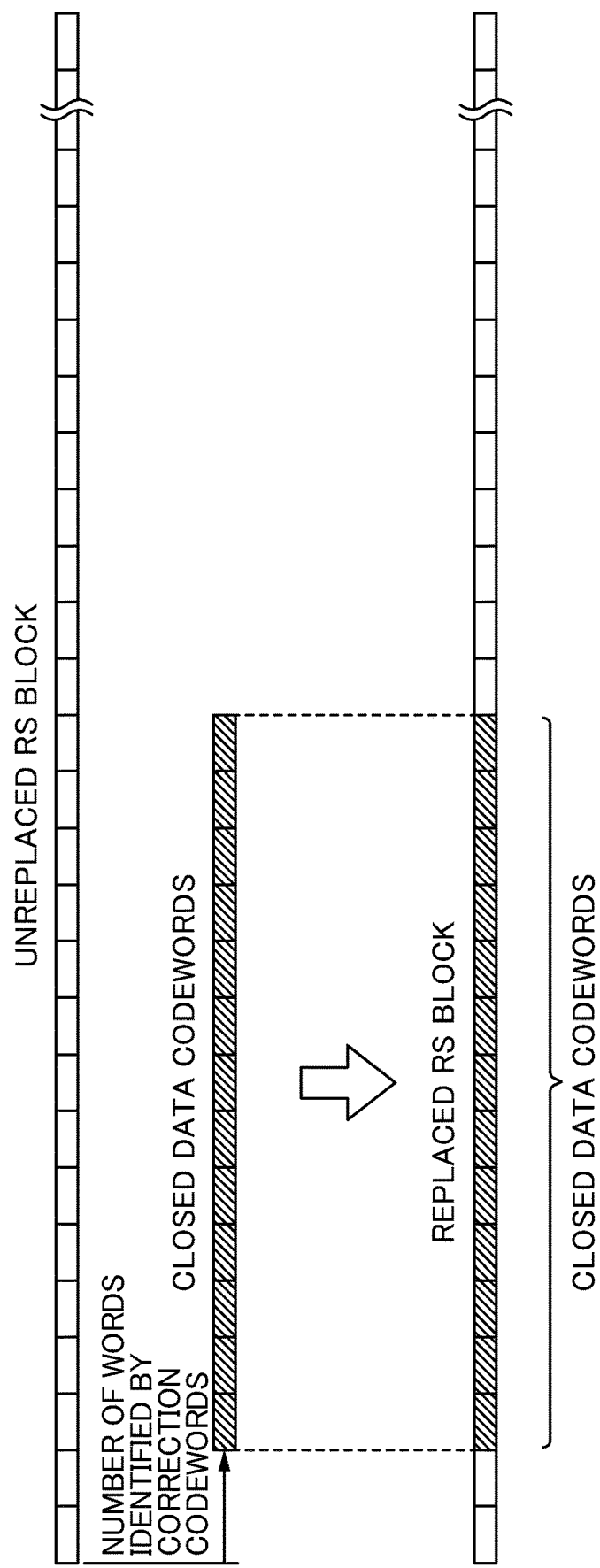
FIG. 36 is a second diagram illustrating how to replace a part of a RS block in a procedure according to the eighth manner using private data codewords.

FIG. 36 is a second diagram illustrating how to replace a part of a RS block in the eighth manner using private data codewords. FIG. 36 shows replacement with the private data codewords from the position which is of the third byte (the position of the third word) from the initial word of the unreplaced RS block. As mentioned above, the replacement positions of the private data codewords are identified based on the correction codewords, performing replacement with the private data codewords.

There is a procedure in which the replacement positions with private data codewords is positions which are of the words corresponding to the value of correction codewords (a RS code), and the procedure is one of the simplest procedure for identifying the replacement positions by the correction codewords (the RS code). However, the embodiment is not limited thereto. The replacement positions may be identified based on a position which is predetermined according to the value of the correction codewords (the RS code).

The subsequent processes are the same as in the first embodiment, and the description thereof will be omitted.

Next, a method for reading an enhanced QR code will be described with reference to FIG. 7 of the first embodiment.

In this example, the difference from the first embodiment is that, between step S212 and step S214, private data codewords are extracted at a position determined according to the correction codewords (the RS code). That is, the replacement positions with the private data codewords in the replaced RS block are identified based on a bit of a specific byte in the correction codewords. In this example, the third byte of the correction codewords is extracted as mentioned above, and low-order 4 bits are extracted from the byte. The replacement positions with the private data codewords are identified based on the values of these low-order 4 bits. This makes it possible to appropriately identify the positions of the private data codewords, extracting the private data codewords.

When the replaced RS block is subsequently corrected using the correction codewords, the public data codewords can be appropriately extracted.

When a part of the unreplaced RS block is replaced with private data codewords, there is a possibility that the bytes of the correction codewords for identifying the replacement positions are replaced. In this case, the replaced RS block may be corrected in advance using the correction codewords. Since this makes it possible to acquire the unreplaced RS block, it is possible to appropriately extract the bytes of the correction codewords for identifying the replacement positions.

In the foregoing description, the third byte of the correction codewords is used. No matter of course, another byte of the correction codewords may be used. Using low-order 4 bits makes it possible to indicate 16 patterns of the positions, and, by using 5 or more bits, it is possible to increase the number of the position patterns which can be indicated.

In the eighth manner, a part of an unreplaced code block (an unreplaced RS block) is replaced with private data codewords, at a replacement position determined according to error correction codewords (a RS code). The replacement position is identified based on the error correction codewords (the RS code), acquiring the private data codewords.

The error correction codewords (the RS code) are not things to be displayed, and therefore they are information which is difficult to acquire. Further, the error correction codewords (the RS code) is obtained by complicated computations based on the data codewords, and therefore it is difficult to estimate the codewords as a result of the computations. This characteristic of the error correction codewords (the RS code) enables to make it difficult to identify the private data codewords. Accordingly, it is possible to more appropriately protect hidden-object information using a 2D barcode.

<Ninth Manner Using Private Data Codewords>

In the ninth manner using private data codewords, an unreplaced RS block is replaced with the foregoing header data codewords containing the placement information of the private data codewords, and positions at which replacement is performed are identified based on correction codewords (a RS code).

In the ninth manner using private data codewords, an unreplaced RS block is replaced with header data codewords, and this point is the same as in the second manner using private data codewords. But, whereas, in the second manner, the replacement position of the header data codeword is determined in advance, in the ninth manner, the replacement position changes according to correction codewords.

Similarly to the eighth manner, in the ninth manner, the replacement positions with the header data codewords are identified based on multiple bits of a specific byte in the correction codewords (see FIG. 35). Specifically, in this example, the third byte of the correction codewords is extracted, and low-order 4 bits are extracted from the byte. The replacement positions with the header data codewords are indicated by the values of these low-order 4 bits. FIG. 35 shows the digits "0010" as information of the low-order 4 bits. The digits "0010" mean "2" in decimal form. But, in this example, since "0" means a first position, "0010" means the third position from the initial word. Next, replacement with header data codewords is performed based on the replacement positions.

Figure 37:
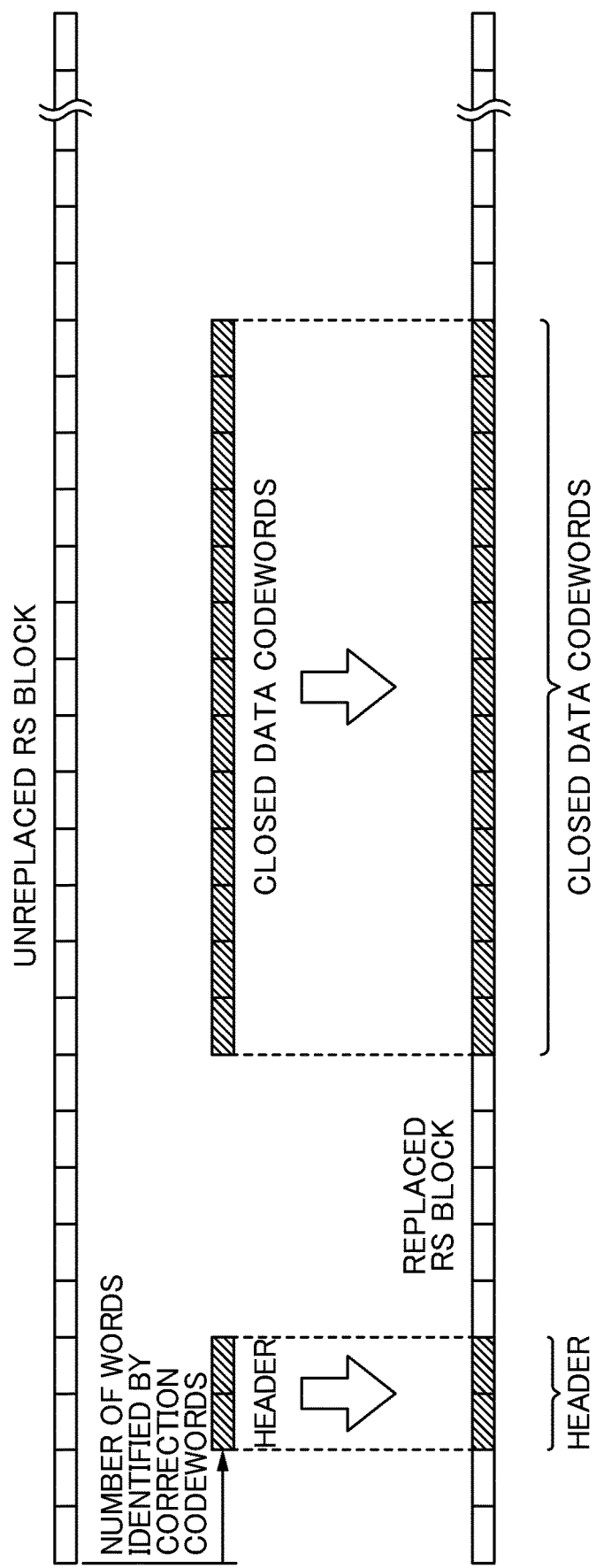
FIG. 37 is a diagram illustrating how to replace a part of a RS block in a procedure according to the ninth manner using private data codewords.

FIG. 37 is a diagram illustrating how to replace a part of a RS block according to the ninth manner using the private data codewords. FIG. 37 shows replacement with the header data codewords from the position which is of the third byte (the position of the third word) from the initial word of the unreplaced RS block. As mentioned above, the replacement positions of the header data codewords are identified based on the correction codewords, performing replacement.

There is a procedure in which the replacement positions with header data codewords is positions which are of the words corresponding to the value of correction codewords (a RS code), and the procedure is one of the simplest procedure for identifying the replacement position by the correction codewords (the RS code). However, the embodiment is not limited thereto. The replacement positions may be identified based on a position which is predetermined according to the value of the correction codewords (the RS code).

In a method for reading an enhanced QR code, header data codewords are extracted at a position determined according to the correction codewords (the RS code). That is, the replacement positions with the header data codeword in the replaced RS block are identified based on a bit of a specific byte in the correction codewords. In this example, the third byte of the correction codewords is extracted as mentioned above, and low-order 4 bits are extracted from the byte. The replacement positions with the header data codewords are identified based on the values of these low-order 4 bits. This makes it possible to appropriately identify the positions of the header data codewords, extracting the header data codewords.

As mentioned above, the private data codewords are extracted based on the placement information of the header data codewords.

When the replaced RS block is subsequently corrected using the correction codewords, the public data codewords can be appropriately extracted.

In the ninth manner, when obtaining a replaced code block (a replaced RS block), a part of an unreplaced code block (an unreplaced RS block) is replaced with header data codewords which contain private data codewords and the placement information of the private data codewords. When replacing with the header data codewords, the replacement is performed at a replacement position determined according to error correction codewords (a RS code) (that is, the replacement position at which a part of the unreplaced code block is replaced with the header data codewords is determined according to the error correction codewords (the RS code)).

The replacement position is identified based on the error correction codewords (the RS code), acquiring the header data codewords. When extracting the private data codewords, the private data codewords are extracted from the replaced code block (the replaced RS block) based on the placement information contained in the header data codewords.

The error correction codewords (the RS code) are not things to be displayed, and therefore they are information which is difficult to acquire. Further, the error correction codewords (the RS code) are obtained by complicated computations based on the data codewords, and therefore it is difficult to estimate the codewords as a result of the computations. This characteristic of the error correction codewords (the RS code) enables to make it difficult to identify the header data codewords, making it difficult to identify the private data codewords. Accordingly, it is possible to more appropriately protect hidden-object information using a 2D barcode.

Note that the description "a part of the unreplaced code block is replaced with a header data codeword that contains the private data codeword and the placement information of the private data codeword" also means an example in which replacement of a part of an unreplaced code block with header data codewords is performed using private data codewords, that is an example according to the third manner using private data codewords (FIG. 24). That is, the replacement position of the header data codewords in the third manner may be determined according to correction codewords, and this is also within the scope of the present invention.

<Tenth Manner Using Private Data Codewords>

In the tenth manner using private data codewords, the foregoing protection block (the reference block) contains the placement information of private data codewords.

That is, whereas, in the ninth manner, the placement information of the private data codewords is contained in the header data codewords, in the tenth manner, the placement information is contained in the protection block described in the third embodiment instead of the header data codewords (in other words, in the tenth manner, no header data codeword is used).

Figure 38:
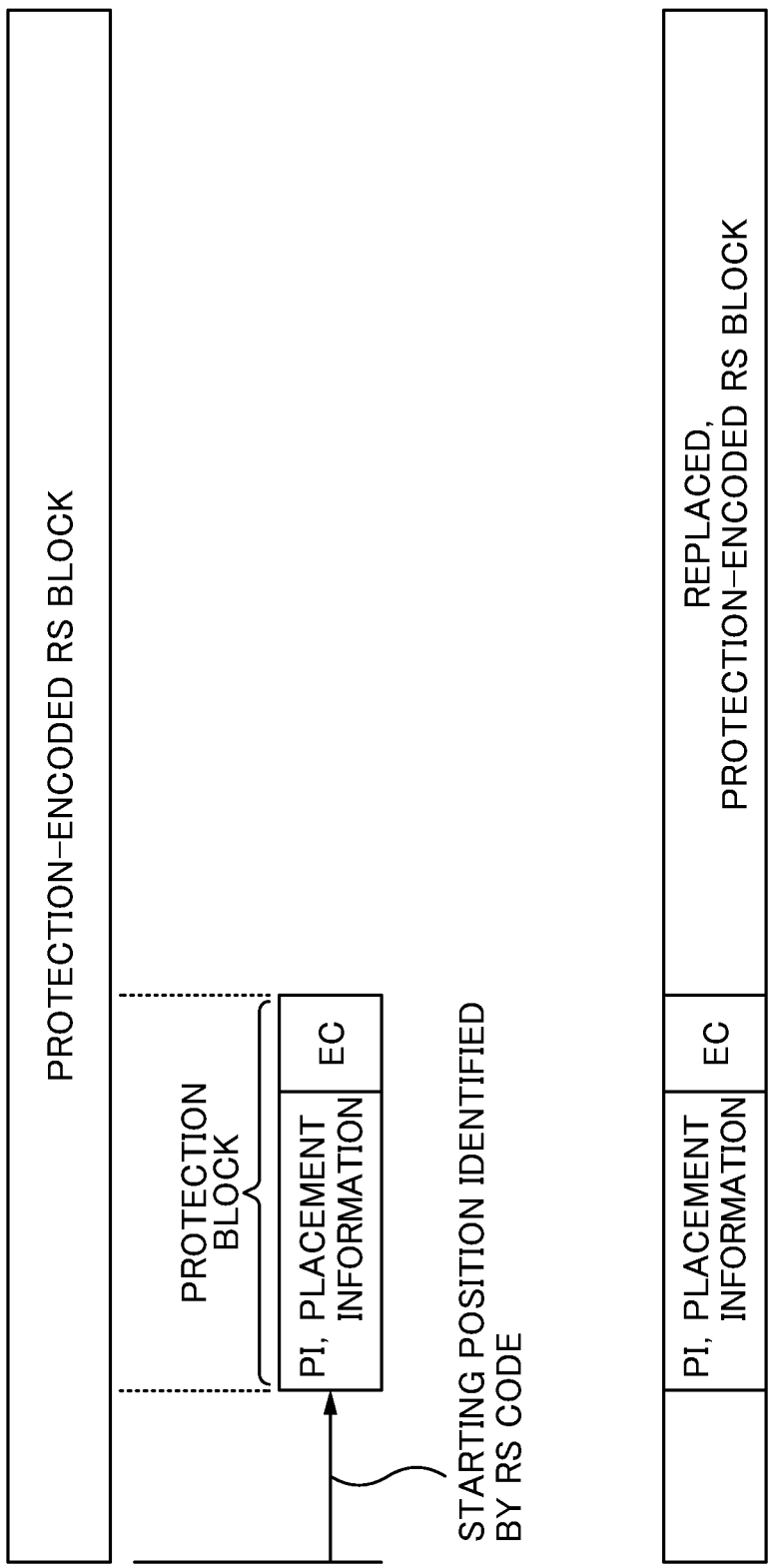
FIG. 38 is a diagram illustrating how to replace a part of a RS block in a procedure according to the tenth manner using private data codewords.

FIG. 38 is a diagram corresponding to FIG. 10, and illustrating how to replace a part of a RS block according to the tenth manner using private data codewords. As shown in FIG. 38, the placement information of private data codewords is stored in a protection block together with a protection ID. In similar to the ninth manner in which a position (replacement position) of header data codewords (having the placement information) is determined according to error correction codewords (a RS code), a position (replacement position) of a protection block (having the placement information) is determined according to error correction codewords (a RS code).

That is, in the tenth manner, a replaced code block (a replaced RS block) is obtained by replacing a part of an unreplaced code block (an unreplaced RS block) that has public data codewords and error correction codewords with private data codewords. The protection block (the reference block) contains the placement information of the private data codewords, and the replacement position of the protection block (the reference block) is determined according to error correction codewords.

When extracting the public data codewords, the public data codewords are extracted from the replaced code block (the replaced RS block) using the error correction codewords. On the other hand, when extracting the private data codewords, the private data codewords are extracted from the replaced code block based on the placement information contained in the protection block (the reference block).

The error correction codewords (the RS code) are not things to be displayed, and therefore they are information which is difficult to acquire. Further, the error correction codewords (the RS code) is obtained by complicated computations based on the data codewords, and therefore it is difficult to estimate the codewords as a result of the computations. This characteristic of the error correction codewords (the RS code) enables to make it difficult to identify the placement information contained in the protection block, making it difficult to identify the private data codewords. Accordingly, it is possible to more appropriately protect hidden-object information using a 2D barcode.

In the tenth manner, a protection block is used as a storage for the placement information, and therefore advantageously it is not necessary to prepare header data codewords separately, compared to the ninth manner.

As shown in FIG. 38, in the tenth manner, a correction code is added. The correction code is for correcting the protection ID and the placement information, and in other words, the correction code is added for the protection ID and for the placement information. Concerning the positions of the protection ID and the placement information in the protection block, it can be predetermined in such a manner that the initial five bits are for protection ID and bits on and after the sixth bit are for the placement information, for example.

<Eleventh Manner Using Private Data Codewords>

Figure 39:
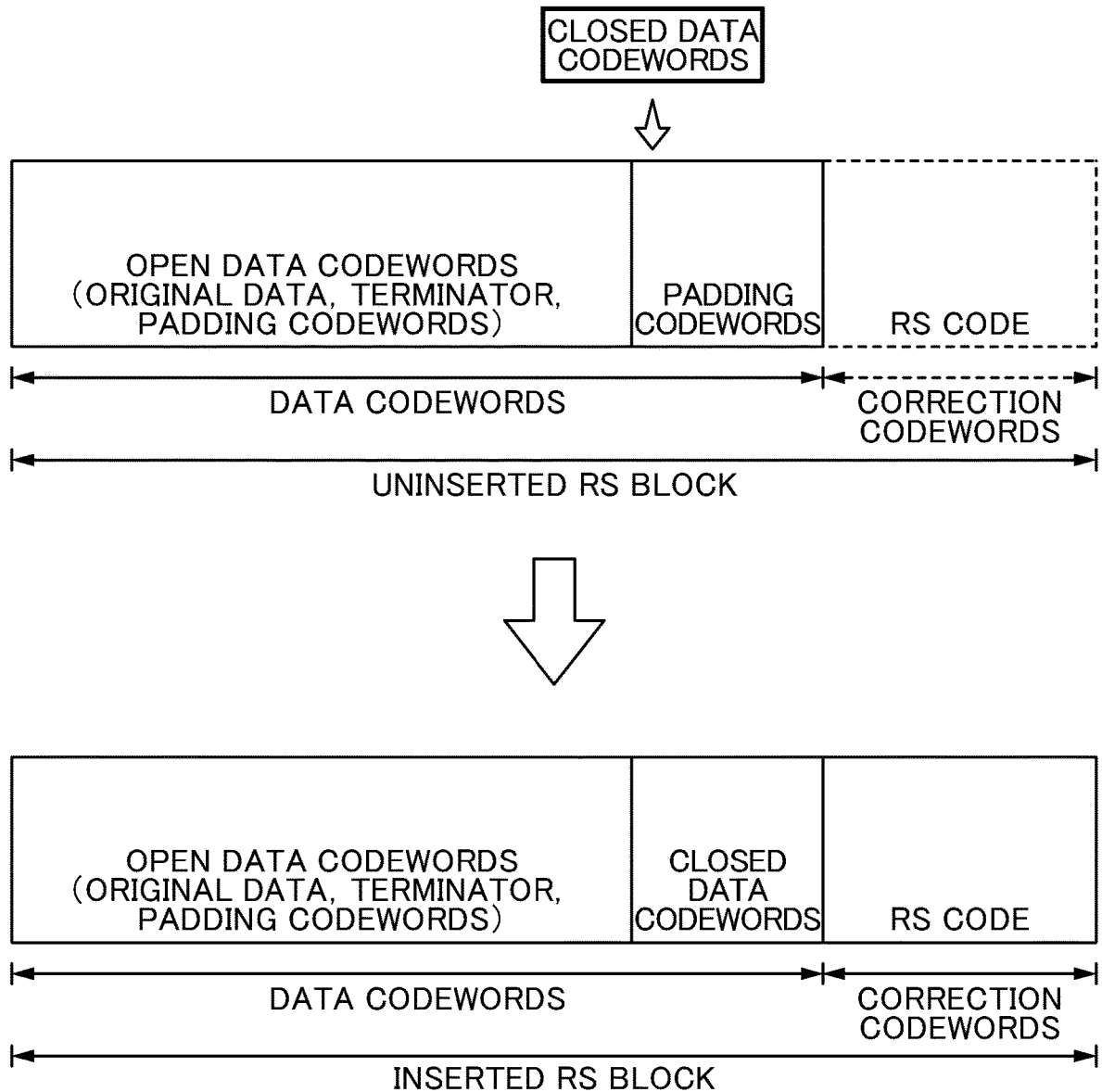
FIG. 39 is a schematic diagram of a RS block according to the eleventh manner using private data codewords.

It is possible to embed private information in a RS block as follow. FIG. 39 is a schematic diagram of a RS block according to the eleventh manner using private data codewords. FIG. 39 shows private information, public data codewords (original data and a terminator), padding codewords and a RS code. However, FIG. 39 is different from the foregoing embodiments in that the padding codewords are replaced with the private information, and in that the RS code is generated after embedding the private information.

If the total number of the obtained data codewords in a RS block does not reach the capacity of the RS block in conformance with JIS, a terminator, which indicates the end of the codewords of the original data, is placed at the end of the codewords. In addition, padding codewords which does not represent data are placed in empty positions in the codeword region (the upper figure of FIG. 39). In the eleventh manner, the private information is changed to a part or the whole of padding codes and is placed after the terminator (the lower figure of FIG. 39). Afterward, the RS code, which serves as the correction codewords, is generated.

An inserted RS block is generated in the foregoing manner (in order to clarify the difference from the "replaced RS block", it is referred to as an "inserted RS block" in this example). A common decoder neglects the inserted RS block, and the codewords after the terminator is interpreted and discarded as padding codes not presenting data. And, only the original data can be read-out. On the other hand, an enhanced decoder which supports this format can extract, as private information, data following the terminator.

Other Embodiments

The above-described embodiments are merely for facilitating the understanding of the invention, but is not meant to be interpreted in a manner limiting the scope of the invention. The invention can of course be altered and improved without departing from the gist thereof, and equivalents are intended to be embraced therein. In particular, the following embodiments are also included in the invention.

In the foregoing embodiments, a 2D barcode is exemplified by a QR code. However, the invention is not limited thereto. Any other types of 2D barcode may be employed as long as an error correction codeword is used in the 2D barcode. As other types of 2D barcode, there is provided a DataMatrix (ISO/IEC 16022:2006, JIS X-0512:2015) and a PDF417 (ISO/IEC 15438:2006, JIS X-0508:2010). The invention is applicable to any type of 2D barcode in which an error correction codeword is used.

However, DataMatrix and PDF417 do not include a standard mask pattern (a mask pattern reference MPR), and therefore, the seventh manner, in which the private data codeword is used, is not applied.

In the foregoing embodiments, the error correction level is selected. However, the invention is not limited thereto. For example, if a 2D barcode is a DataMatrix, the error correction level is not selected, and error correction level is automatically determined according to the size of the code symbol (the size corresponds to the version of a QR code).

Depending on the type of 2D barcode, it is possible to appropriately change objects which undergo protection-encoding (parts of 2D barcode which are to be protection-encoded).

For example, in DataMatrix, a finder pattern and a timing pattern which are located in the periphery of a code symbol (collectively referred to as an alignment pattern) are function patterns. Accordingly, it goes without saying that these patterns are not subject to protection-encoding. In a RS block, the word indicating being in Structured Append format (one word at the initial end) does not undergo protection-encoding. If the word indicates being in Structured Append format (E9h, 233 in decimal form), four words from the initial end have information associated with Structured Append format. Accordingly, these words are not subject to protection-encoding.

In PDF417, a start pattern and a stop pattern are function patterns. Accordingly, it goes without saying that these patterns are not subject to protection-encoding. In addition, a row left codeword and a row right codeword are information associated with function pattern, and therefore they are not subject to protection-encoding. The symbol length descriptor in the RS block (one word at the initial end) does not undergo protection-encoding. If a barcode in PDF417 is in a so-called Macro PDF417 (corresponding to Structure Append format of QR code and DataMatrix), "Macro PDF417 Control Block containing control information" associated with Structure Append format, in the RS block, is not subject to protection-encoding.

Ad mentioned above, objects which undergo protection-encoding slightly change depending on the type of 2D barcode, but the present invention may be applied to the foregoing types of 2D barcode. Also, similarly to a QR code, in the foregoing types of 2D barcode, a RS code (error correction codewords) used for generating a protection-encoding pattern is not subject to protection-encoding.

REFERENCE SIGNS LIST

1 QR code symbol,
10 enhanced encoder,
11 control section, 11a operation section, 11b storage section,
13 display device, 14 printing device, 15 input device,
20 enhanced decoder,
21 control section, 21a operation section, 21b storage section,
22 imaging device, 23 display device, 24 printing device, 25 input device

The invention claimed is:

1. A method for generating a 2D barcode, comprising:
obtaining a protection-encoding pattern based on an error correction codeword;
obtaining a protection-encoded code block by protection-encoding a code block comprising a data codeword by using the protection-encoding pattern; and
generating a 2D barcode based on the protection-encoded code block.

2. The method for generating a 2D barcode according to claim 1, wherein the protection-encoding is part of XORing the code block with the protection-encoding pattern on a bit-by-bit basis.

3. The method for generating a 2D barcode according to claim 1, wherein the obtaining the protection-encoding pattern is based on the error correction codeword and a reference, the reference being different from the error correction codeword, and wherein the obtaining the protection-encoded code block comprises obtaining an unreplaced-and-protection-encoded code block by protection-encoding using the protection-encoding pattern the code block comprising the data codeword, wherein the method further comprises obtaining a replaced-and-protection-encoded code block by replacing a part of the unreplaced-and-protection-encoded code block with a reference block containing the reference, wherein the generating the 2D barcode based on the protection-encoded code block is based on the replaced-and-protection-encoded code block.

4. The method for generating a 2D barcode according to claim 3, wherein the obtaining the replaced-and-protection-encoded code block comprises replacing a part of the unreplaced-and-protection-encoded code block with the reference block at a replacement position determined according to the error correction codeword.

5. The method for generating a 2D barcode according to claim 1, wherein the method further comprises obtaining a replaced code block, the replaced code block being obtained by replacing a part of an unreplaced code block that comprises a public data codeword and the error correction codeword with a private data codeword, and the code block is the replaced code block.

6. The method for generating a 2D barcode according to claim 5, wherein the obtaining the replaced code block comprises replacing the part of the unreplaced code block with the private data codeword at a replacement position determined according to the error correction codeword.

7. The method for generating a 2D barcode according to claim 5, wherein the obtaining the replaced code block comprises replacing a part of the unreplaced code block with a header data codeword that contains the private data codeword and the placement information of the private data codeword, and the replacing a part of the unreplaced code block with the header data codeword is performed at a replacement position determined according to the error correction codeword.

8. The method for generating a 2D barcode according to claim 4, wherein the method further comprises obtaining a replaced code block by replacing a part of an unreplaced code block that comprises a public data codeword and the error correction codeword with a private data codeword, the code block is the replaced code block, and the reference block contains placement information of the private data codeword.

9. A device for generating a 2D barcode, comprising:
an encoder in which a protection-encoding pattern is obtained based on an error correction codeword, the encoder performing the following:
obtaining a protection-encoded code block by protection-encoding a code block comprising a data codeword using the protection-encoding pattern; and
generating a 2D barcode based on the protection-encoded code block.

10. A non-transient medium containing a program causing a computer to perform the following processes:
obtaining a protection-encoding pattern based on an error correction codeword;
obtaining a protection-encoded code block by protection-encoding a code block comprising a data codeword by using the protection-encoding pattern; and
generating a 2D barcode based on the protection-encoded code block.

11. A 2D barcode generated by performing the following processes:
obtaining a protection-encoding pattern based on an error correction codeword;
obtaining a protection-encoded code block by protection-encoding a code block comprising a data codeword by using the protection-encoding pattern; and
generating a 2D barcode based on the protection-encoded code block.

12. A method for reading a 2D barcode, comprising:
reading a 2D barcode, the 2D barcode being generated by a method comprising:
obtaining a protection-encoding pattern based on an error correction codeword;
obtaining a protection-encoded code block by protection-encoding a code block comprising a data codeword by using the protection-encoding pattern; and
in which
generating the 2D barcode based on the protection-encoded code block;
the method for reading a 2D barcode further comprising:
obtaining the protection-encoded code block from the 2D barcode;
obtaining the protection-encoding pattern based on the error correction codeword contained in the 2D barcode;
obtaining the code block by protection-decoding the protection-encoded code block using the protection-encoding pattern; and
extracting the data codeword from the code block.

13. The method for reading a 2D barcode according to claim 12, wherein the protection-decoding is part of XORing the protection-encoded code block with the protection-encoding pattern on a bit-by-bit basis.

14. The method for reading a 2D barcode according to claim 12, wherein in reading the 2D barcode:
the obtaining the protection-encoding pattern of the method of generating the 2D barcode is based on a reference different from the error correction codeword;

the method of generating the 2D barcode comprises obtaining an unreplaced-and-protection-encoded code block by protection-encoding the code block comprising the data codeword using the protection-encoding pattern:

the method of generating the 2D barcode comprises obtaining a replaced-and-protection-encoded code block by replacing a part of the unreplaced-and-protection-encoded code block with a reference block containing the reference: and the method of generating the 2D barcode, wherein the 2D barcode is generated based on the replaced-and-protection-encoded code block:

wherein the obtaining the protection-encoded code block from the 2D barcode comprises obtaining the replaced-and-protection-encoded code block from the 2D barcode;

wherein the obtaining the protection-encoding pattern based on the error correction codeword comprises obtaining the reference that is contained in the 2D barcode;

wherein the obtaining the code block comprises obtaining the replaced-and-protection-encoded code block;

wherein the extracting the data codeword from the code block is based on using the error correction codeword.

15. The method for reading a 2D barcode according to claim 14, the method of generating the 2D barcode comprising replacing a part of the unreplaced-and-protection-encoded code block with the reference block at a replacement position, the replacement position is determined according to the error correction codeword;

wherein the obtaining the protection-encoding pattern based on the error correction codeword comprises identifying the replacement position based on the error correction codeword: and wherein the method for reading a 2D barcode further comprises acquiring the reference.

16. The method for reading a 2D barcode according to claim 12, wherein the obtaining the code block obtained by protection-decoding the protection-encoded code block comprises replacing a part of an unreplaced code block that comprises a public data codeword and replacing the error correction codeword with a private data codeword so that a replaced code block is formed;

wherein the extracting the data codeword comprises:
extracting the public data codeword is extracted as the data codeword from the replaced code block using the error correction codeword; and
extracting the private data codeword is extracted from the replaced code block.

17. A method for reading a 2D barcode according to claim 16, wherein the replacing the part of the unreplaced code block comprises replacing the part of the unreplaced code block with the private data codeword at a replacement position, the replacement position is determined according to the error correction codeword; and wherein the extracting the private data codeword comprises identifying the replacement position based on the error correction codeword;

the method for reading a 2D barcode further comprises acquiring the private data codeword.

18. The method for reading a 2D barcode according to claim 16, wherein the code block is a replaced code block obtained by replacing the part of the unreplaced code block comprising a header data codeword, the header data codeword containing the private data codeword and the placement information of the private data codeword, the part of the unreplaced code block is replaced with the header data codeword at a replacement position, the replacement position is determined according to the error correction codeword, the replacement position is identified based on the error correction codeword;

the method for reading a 2D barcode further comprising:
acquiring the header data codeword, wherein the extracting the private data codeword comprises extracting the private data codeword from the replaced code block based on the placement information contained in the header data codeword.

19. A method for reading a 2D barcode according to claim 15, wherein the code block obtained by protection-decoding the protection-encoded code block is a replaced code block obtained by replacing a part of an unreplaced code block that comprises a public data codeword and the error correction codeword with a private data codeword, the reference block contains the placement information of the private data codeword;

wherein the extracting the data codeword comprises:
extracting the public data codeword as the data codeword from the replaced code block using the error correction codeword; and
extracting the private data codeword from the replaced code block based on the placement information which is contained in the reference block.

20. A device for reading a 2D barcode, comprising:
a decoder in which a 2D barcode is read, wherein the 2D barcode being generated by a method comprising:
obtaining a protection-encoding pattern based on an error correction codeword;
obtaining a protection-encoded code block by protection-encoding using the protection-encoding pattern a code block comprising having a data codeword;
generating the 2D barcode based on the protection-encoded code block;
the protection-encoded code block is obtained from the 2D barcode,
the protection-encoding pattern is obtained based on the error correction codeword contained in the 2D barcode,
the code block is obtained by protection-decoding the protection-encoded code block using the protection-encoding pattern,
the data codeword is extracted from the code block.

21. A transient medium containing a program causing a computer to perform the following processes:
reading a 2D barcode, the 2D barcode being generated by a method comprising:
obtaining a protection-encoding pattern based on an error correction codeword;
obtaining a protection-encoded code block by protection-encoding using the protection-encoding pattern a code block comprising a data codeword; and
generating the 2D barcode based on the protection-encoded code block;
obtaining the protection-encoded code block from the 2D barcode;
obtaining the protection-encoding pattern based on the error correction codeword contained in the 2D barcode;
obtaining the code block by protection-decoding the protection-encoded code block using the protection-encoding pattern; and
extracting the data codeword from the code block.

22. An administration system for a 2D barcode, comprising:
- a 2D barcode generator, wherein the generator:
    - obtains a protection-encoding pattern based on an error correction codeword;
    - obtains a protection-encoded code block by protection-encoding a code block comprising a data codeword by using the protection-encoding pattern; and
    - generates the 2D barcode based on the protection-encoded code block; and
- a reader that reads the 2D barcode, wherein the reader:
    - the generated 2D barcode;
    - obtains the protection-encoded code block from the 2D barcoded;
    - obtains the protection-encoding pattern based on the error correction codeword contained in the 2D barcode;
    - obtains the code block by protection-decoding the protection-encoded code block using the protection-encoding pattern; and
    - extracts the data codeword from the code block.

\* \* \* \* \*

UNITED STATES PATENT AND TRADEMARK OFFICE
CERTIFICATE OF CORRECTION

PATENT NO.         : 10,789,439 B2
APPLICATION NO.    : 15/777477
DATED              : September 29, 2020
INVENTOR(S)        : Tsutao Nishizaki It is certified that error appears in the above-identified patent and that said Letters Patent is hereby corrected as shown below:

In the Claims

In Column 42, Claim 14, Line 67, delete ":" and insert in its place --;--.

In Column 43, Claim 14, Line 5, delete ":" and insert in its place --;--.

In Column 43, Claim 14, Line 10, delete ":" and insert in its place --;--.

In Column 43, Claim 14, Line 13, delete ":" and insert in its place --;--.

In Column 43, Claim 15, Line 35, delete ":" and insert in its place --;--.

In Column 43, Claim 16, Line 47, delete "is extracted".

In Column 43, Claim 16, Line 50, delete "is extracted".

In Column 44, Claim 20, Line 35, delete "having".

In Column 44, Claim 20, Line 37, at end of line after ";", insert --and--.

In Column 45, Claim 22, Line 14, delete "barcoded;" and insert in its place "barcode;".

Signed and Sealed this
Fifteenth Day of December, 2020

Andrei Iancu
*Director of the United States Patent and Trademark Office*